(12) United States Patent
Leather

(10) Patent No.: US 7,205,999 B2
(45) Date of Patent: Apr. 17, 2007

(54) METHOD AND APPARATUS FOR ENVIRONMENT-MAPPED BUMP-MAPPING IN A GRAPHICS SYSTEM

(75) Inventor: Mark M. Leather, Saratoga, CA (US)

(73) Assignee: Nintendo Co., Ltd., Kyoto (JP)

( * ) Notice: Subject to any disclaimer, the term of this patent is extended or adjusted under 35 U.S.C. 154(b) by 238 days.

(21) Appl. No.: 10/953,436

(22) Filed: Sep. 30, 2004

(65) Prior Publication Data

US 2005/0046639 A1    Mar. 3, 2005

(51) Int. Cl.
*G09G 5/00*    (2006.01)
(52) U.S. Cl. .................................. 345/584; 345/582
(58) Field of Classification Search ............... 345/420, 345/422, 426, 506, 522, 582–586
See application file for complete search history.

(56) References Cited

U.S. PATENT DOCUMENTS

| | | | |
|---|---|---|---|
| 4,275,413 A | 6/1981 | Sakamoto et al. |
| 4,357,624 A | 11/1982 | Greenberg |
| 4,388,620 A | 6/1983 | Sherman |
| 4,425,559 A | 1/1984 | Sherman |
| 4,463,380 A | 7/1984 | Hooks, Jr. |
| 4,491,836 A | 1/1985 | Collmeyer et al. |
| 4,570,233 A | 2/1986 | Yan et al. |
| 4,586,038 A | 4/1986 | Sims et al. |
| 4,600,919 A | 7/1986 | Stern |
| 4,615,013 A | 9/1986 | Yan et al. |
| 4,625,289 A | 11/1986 | Rockwood |
| 4,653,012 A | 3/1987 | Duffy et al. |
| 4,658,247 A | 4/1987 | Gharachorloo |
| 4,692,880 A | 9/1987 | Merz et al. |
| 4,695,943 A | 9/1987 | Keeley et al. |
| 4,710,876 A | 12/1987 | Cline et al. |
| 4,725,831 A | 2/1988 | Coleman |
| 4,768,148 A | 8/1988 | Keeley et al. |
| 4,785,395 A | 11/1988 | Keeley |
| 4,790,025 A | 12/1988 | Inoue et al. |

(Continued)

FOREIGN PATENT DOCUMENTS

CA    2070934    12/1993

(Continued)

OTHER PUBLICATIONS

GDC 2000: Advanced OpenGL Game Development "A Practical and Robust Bump-mapping Technique for Today's GPUs", by Mark Kilgard, Jul. 5, 2000, www.nvidia.com.

(Continued)

*Primary Examiner*—Mark Zimmerman
*Assistant Examiner*—Greg F. Cunningham
(74) *Attorney, Agent, or Firm*—Nixon & Vanderhye P.C.

(57) ABSTRACT

Apparatus and example methods for environment-mapped style of bump-mapping (EMBM) are provided that use a pre-computed bump-map texture accessed as an indirect texture along with pre-computed object surface normals (i.e., the Normal, Tangent and Binormal vectors) from each vertex of rendered polygons to effectively generate a new perturbed Normal vector per vertex. The perturbed new Normal vectors are then used to look up texels in an environment map. A specialized bump map texture data/coordinate processing "bump unit" is provided in the graphics pipeline for performing predetermined matrix multiplication operations on retrieved lookup data from the indirect-texture bump map.

18 Claims, 37 Drawing Sheets

Logical Block Diagram of Indirect Texture Processing

U.S. PATENT DOCUMENTS

| | | |
|---|---|---|
| 4,808,988 A | 2/1989 | Burke et al. |
| 4,812,988 A | 3/1989 | Duthuit et al. |
| 4,817,175 A | 3/1989 | Tenenbaum et al. |
| 4,829,295 A | 5/1989 | Hiroyuki |
| 4,829,452 A | 5/1989 | Kang et al. |
| 4,833,601 A | 5/1989 | Barlow et al. |
| 4,855,934 A | 8/1989 | Robinson |
| 4,862,392 A | 8/1989 | Steiner |
| 4,866,637 A | 9/1989 | Gonzalez-Lopez et al. |
| 4,888,712 A | 12/1989 | Barkans et al. |
| 4,897,806 A | 1/1990 | Cook et al. |
| 4,901,064 A | 2/1990 | Deering |
| 4,907,174 A | 3/1990 | Priem |
| 4,914,729 A | 4/1990 | Omori et al. |
| 4,918,625 A | 4/1990 | Yan |
| 4,935,879 A | 6/1990 | Ueda |
| 4,945,500 A | 7/1990 | Deering |
| 4,965,751 A | 10/1990 | Thayer et al. |
| 4,974,176 A | 11/1990 | Buchner et al. |
| 4,974,177 A | 11/1990 | Nishiguchi |
| 4,975,977 A | 12/1990 | Kurosu et al. |
| 4,989,138 A | 1/1991 | Radochonski |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,056,044 A | 10/1991 | Frederickson et al. |
| 5,062,057 A | 10/1991 | Blacken et al. |
| 5,086,495 A | 2/1992 | Gray et al. |
| 5,091,967 A | 2/1992 | Ohsawa |
| 5,097,427 A | 3/1992 | Lathrop et al. |
| 5,136,664 A | 8/1992 | Bersack et al. |
| 5,144,291 A | 9/1992 | Nishizawa |
| 5,163,126 A | 11/1992 | Einkauf et al. |
| 5,170,468 A | 12/1992 | Shah et al. |
| 5,179,638 A | 1/1993 | Dawson et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,307,450 A | 4/1994 | Grosssman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,392,385 A | 2/1995 | Evangelisti et al. |
| 5,392,393 A | 2/1995 | Deering |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,421,028 A | 5/1995 | Swanson |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,457,775 A | 10/1995 | Johnson, Jr. et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,504,917 A | 4/1996 | Austin |
| 5,506,604 A | 4/1996 | Nally et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,561,756 A | 10/1996 | Miller et al. |
| 5,563,989 A | 10/1996 | Billyard |
| 5,566,285 A | 10/1996 | Okada |
| 5,573,402 A | 11/1996 | Gray |
| 5,579,456 A | 11/1996 | Cosman |
| 5,586,234 A | 12/1996 | Sakuraba et al. |
| 5,593,350 A | 1/1997 | Bouton et al. |
| 5,594,854 A | 1/1997 | Baldwin et al. |
| 5,600,763 A | 2/1997 | Greene et al. |
| 5,606,650 A | 2/1997 | Kelley et al. |
| 5,607,157 A | 3/1997 | Nagashima |
| 5,608,424 A | 3/1997 | Takahashi et al. |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,678,037 A | 10/1997 | Osugi et al. |
| 5,682,522 A | 10/1997 | Huang et al. |
| 5,684,941 A | 11/1997 | Dye |
| 5,687,304 A | 11/1997 | Kiss |
| 5,687,357 A | 11/1997 | Priem |
| 5,691,746 A | 11/1997 | Shyu |
| 5,694,143 A | 12/1997 | Fielder et al. |
| 5,696,892 A | 12/1997 | Redmann et al. |
| 5,701,444 A | 12/1997 | Baldwin |
| 5,703,806 A | 12/1997 | Puar et al. |
| 5,706,481 A | 1/1998 | Hannah et al. |
| 5,706,482 A | 1/1998 | Matsushima et al. |
| 5,714,981 A | 2/1998 | Scott-Jackson et al. |
| 5,721,947 A | 2/1998 | Priem et al. |
| 5,724,561 A | 3/1998 | Tarolli et al. |
| 5,726,689 A | 3/1998 | Negishi et al. |
| 5,726,947 A | 3/1998 | Yamazaki et al. |
| 5,727,192 A | 3/1998 | Baldwin |
| 5,734,386 A | 3/1998 | Cosman |
| 5,739,819 A | 4/1998 | Bar-Nahum |
| 5,740,343 A | 4/1998 | Tarolli et al. |
| 5,740,383 A | 4/1998 | Nally et al. |
| 5,740,406 A | 4/1998 | Rosenthal et al. |
| 5,742,749 A | 4/1998 | Foran et al. |
| 5,742,788 A | 4/1998 | Priem et al. |
| 5,745,118 A | 4/1998 | Alcorn et al. |

| | | | | | | |
|---|---|---|---|---|---|---|
| 5,745,125 A | 4/1998 | Deering et al. | | 5,887,155 A | 3/1999 | Laidig |
| 5,748,199 A | 5/1998 | Palm | | 5,890,190 A | 3/1999 | Rutman |
| 5,748,986 A | 5/1998 | Butterfield et al. | | 5,892,517 A | 4/1999 | Rich |
| 5,751,291 A | 5/1998 | Olsen et al. | | 5,892,974 A | 4/1999 | Koizumi et al. |
| 5,751,292 A | 5/1998 | Emmot | | 5,894,300 A | 4/1999 | Takizawa |
| 5,751,295 A | 5/1998 | Becklund et al. | | 5,900,881 A | 5/1999 | Ikedo |
| 5,751,930 A | 5/1998 | Katsura et al. | | 5,903,283 A | 5/1999 | Selwan et al. |
| 5,754,191 A | 5/1998 | Mills et al. | | 5,909,218 A | 6/1999 | Naka et al. |
| 5,757,382 A | 5/1998 | Lee | | 5,909,225 A | 6/1999 | Schinnerer et al. |
| 5,758,182 A | 5/1998 | Rosenthal et al. | | 5,912,675 A | 6/1999 | Laperriere |
| 5,760,783 A | 6/1998 | Migdal et al. | | 5,912,676 A | 6/1999 | Malladi et al. |
| 5,764,228 A | 6/1998 | Baldwin | | 5,914,721 A | 6/1999 | Lim |
| 5,764,237 A | 6/1998 | Kaneko | | 5,914,725 A | 6/1999 | Mcinnnis et al. |
| 5,764,243 A | 6/1998 | Baldwin | | 5,914,729 A | 6/1999 | Lippincott |
| 5,767,856 A | 6/1998 | Peterson et al. | | 5,917,496 A | 6/1999 | Fujita et al. |
| 5,767,858 A | 6/1998 | Kawase et al. | | 5,920,326 A | 7/1999 | Rentschler et al. |
| 5,768,626 A | 6/1998 | Munson et al. | | 5,920,876 A | 7/1999 | Ungar et al. |
| 5,768,629 A | 6/1998 | Wise et al. | | 5,923,332 A | 7/1999 | Izawa |
| 5,774,133 A | 6/1998 | Neave et al. | | 5,923,334 A | 7/1999 | Luken |
| 5,777,623 A | 7/1998 | Small | | 5,926,182 A | 7/1999 | Menon et al. |
| 5,777,629 A | 7/1998 | Baldwin | | 5,926,647 A | 7/1999 | Adams et al. |
| 5,781,927 A | 7/1998 | Wu et al. | | 5,933,150 A | 8/1999 | Ngo et al. |
| 5,791,994 A | 8/1998 | Hirano et al. | | 5,933,154 A | 8/1999 | Howard et al. |
| 5,798,770 A | 8/1998 | Baldwin | | 5,933,155 A | 8/1999 | Akeley |
| 5,801,706 A | 9/1998 | Fujita et al. | | 5,933,529 A | 8/1999 | Kim |
| 5,801,711 A | 9/1998 | Koss et al. | | 5,936,641 A | 8/1999 | Jain et al. |
| 5,801,716 A | 9/1998 | Silverbrook | | 5,940,086 A | 8/1999 | Rentschler et al. |
| 5,801,720 A | 9/1998 | Norrod et al. | | 5,940,089 A | 8/1999 | Dilliplane |
| 5,805,175 A | 9/1998 | Priem | | 5,940,538 A | 8/1999 | Spiegel et al. |
| 5,805,868 A | 9/1998 | Murphy | | 5,943,058 A | 8/1999 | Nagy |
| 5,808,619 A | 9/1998 | Choi et al. | | 5,943,060 A | 8/1999 | Cosman et al. |
| 5,808,630 A | 9/1998 | Pannell | | 5,945,997 A | 8/1999 | Zhao et al. |
| 5,809,219 A | 9/1998 | Pearce et al. | | 5,949,421 A | 9/1999 | Ogletree et al. |
| 5,809,278 A | 9/1998 | Watanabe et al. | | 5,949,423 A | 9/1999 | Olsen |
| 5,815,165 A | 9/1998 | Blixt | | 5,949,424 A | 9/1999 | Cabral et al. |
| 5,815,166 A | 9/1998 | Baldwin | | 5,949,428 A | 9/1999 | Toelle et al. |
| 5,818,456 A | 10/1998 | Cosman et al. | | 5,949,440 A | 9/1999 | Krech, Jr. et al. |
| 5,819,017 A | 10/1998 | Akeley et al. | | 5,956,042 A | 9/1999 | Tucker et al. |
| 5,821,940 A | 10/1998 | Morgan et al. | | 5,956,043 A | 9/1999 | Jensen |
| 5,821,949 A | 10/1998 | Deering | | 5,958,020 A | 9/1999 | Evoy et al. |
| 5,822,516 A | 10/1998 | Krech, Jr. | | 5,959,640 A | 9/1999 | Rudin et al. |
| 5,828,382 A | 10/1998 | Wilde | | 5,963,220 A | 10/1999 | Lee et al. |
| 5,828,383 A | 10/1998 | May et al. | | 5,963,683 A | 10/1999 | Lin |
| 5,828,907 A | 10/1998 | Wise et al. | | 5,966,134 A | 10/1999 | Arias |
| 5,831,624 A | 11/1998 | Tarolli et al. | | 5,969,726 A | 10/1999 | Rentschler et al. |
| 5,831,625 A | 11/1998 | Rich et al. | | 5,977,979 A | 11/1999 | Clough et al. |
| 5,831,640 A | 11/1998 | Wang et al. | | 5,977,984 A | 11/1999 | Omori |
| 5,835,096 A | 11/1998 | Baldwin | | 5,982,376 A | 11/1999 | Abe et al. |
| 5,835,792 A | 11/1998 | Wise et al. | | 5,982,390 A | 11/1999 | Stoneking et al. |
| 5,838,334 A | 11/1998 | Dye | | 5,986,659 A | 11/1999 | Gallery et al. |
| 5,844,576 A | 12/1998 | Wilde et al. | | 5,986,663 A | 11/1999 | Wilde |
| 5,850,229 A | 12/1998 | Edelsbrunner et al. | | 5,986,677 A | 11/1999 | Jones et al. |
| 5,852,451 A | 12/1998 | Cox et al. | | 5,987,567 A | 11/1999 | Rivard et al. |
| 5,856,829 A | 1/1999 | Gray, III et al. | | 5,990,903 A | 11/1999 | Donovan |
| 5,859,645 A | 1/1999 | Latham | | 5,995,120 A | 11/1999 | Dye |
| 5,861,888 A | 1/1999 | Dempsey | | 5,995,121 A | 11/1999 | Alcokrn et al. |
| 5,861,893 A | 1/1999 | Sturgess | | 5,999,189 A | 12/1999 | Kajiya et al. |
| 5,867,166 A | 2/1999 | Myhrvold et al. | | 5,999,196 A | 12/1999 | Storm et al. |
| 5,870,097 A | 2/1999 | Snyder et al. | | 5,999,198 A | 12/1999 | Horan et al. |
| 5,870,098 A | 2/1999 | Gardiner | | 6,002,407 A | 12/1999 | Fadden |
| 5,870,102 A | 2/1999 | Tarolli et al. | | 6,002,409 A | 12/1999 | Harkin |
| 5,870,109 A | 2/1999 | McCormack et al. | | 6,002,410 A | 12/1999 | Battle |
| 5,870,587 A | 2/1999 | Danforth et al. | | 6,005,582 A | 12/1999 | Gabriel et al. |
| 5,872,902 A | 2/1999 | Kuchkuda et al. | | 6,005,583 A | 12/1999 | Morrison |
| 5,874,969 A | 2/1999 | Storm et al. | | 6,005,584 A | 12/1999 | Kitamura et al. |
| 5,877,741 A | 3/1999 | Chee et al. | | 6,007,428 A | 12/1999 | Nishiumi et al. |
| 5,877,770 A | 3/1999 | Hanaoka | | 6,008,820 A | 12/1999 | Chauvin et al. |
| 5,877,771 A | 3/1999 | Drebin et al. | | 6,011,562 A | 1/2000 | Gagne et al. |
| 5,880,736 A | 3/1999 | Peercy et al. | | 6,011,565 A | 1/2000 | Kuo et al. |
| 5,880,737 A | 3/1999 | Griffen et al. | | 6,014,144 A | 1/2000 | Nelson et al. |
| 5,883,638 A | 3/1999 | Rouet et al. | | 6,016,150 A | 1/2000 | Lengyel et al. |
| 5,886,701 A | 3/1999 | Chauvin et al. | | 6,016,151 A | 1/2000 | Lin |
| 5,886,705 A | 3/1999 | Lentz | | 6,018,350 A | 1/2000 | Lee et al. |

| | | | | | | |
|---|---|---|---|---|---|---|
| 6,020,931 | A | 2/2000 | Bilbrey et al. | 6,144,387 | A | 11/2000 | Liu et al. |
| 6,021,417 | A | 2/2000 | Massarksy | 6,151,602 | A | 11/2000 | Hejlsberg et al. |
| 6,022,274 | A | 2/2000 | Takeda et al. | 6,155,926 | A | 12/2000 | Miyamoto et al. |
| 6,023,261 | A | 2/2000 | Ugajin | 6,157,387 | A | 12/2000 | Kotani |
| 6,023,738 | A | 2/2000 | Priem et al. | 6,163,319 | A | 12/2000 | Peercy et al. |
| 6,025,853 | A | 2/2000 | Baldwin | 6,166,748 | A | 12/2000 | Van Hook et al. |
| 6,026,182 | A | 2/2000 | Lee et al. | 6,172,678 | B1 | 1/2001 | Shiraishi |
| 6,028,608 | A | 2/2000 | Jenkins | 6,173,367 | B1 | 1/2001 | Aleksic et al. |
| 6,028,611 | A | 2/2000 | Anderson et al. | 6,177,944 | B1 | 1/2001 | Fowler et al. |
| 6,031,542 | A | 2/2000 | Wittig | 6,181,352 | B1 | 1/2001 | Kirk et al. |
| 6,035,360 | A | 3/2000 | Doidge et al. | 6,191,794 | B1 | 2/2001 | Priem et al. |
| 6,037,948 | A | 3/2000 | Liepa | 6,198,488 | B1 | 3/2001 | Lindholm et al. |
| 6,037,949 | A | 3/2000 | DeRose et al. | 6,200,253 | B1 | 3/2001 | Nishiumi et al. |
| 6,038,031 | A | 3/2000 | Murphy | 6,204,851 | B1 | 3/2001 | Netschke et al. |
| 6,038,348 | A | 3/2000 | Carley | 6,215,496 | B1 | 4/2001 | Szeliski et al. |
| 6,040,843 | A | 3/2000 | Monroe et al. | 6,215,497 | B1 | 4/2001 | Leung |
| 6,040,844 | A | 3/2000 | Yamaguchi et al. | 6,226,012 | B1 | 5/2001 | Priem et al. |
| 6,041,010 | A | 3/2000 | Puar et al. | 6,226,713 | B1 | 5/2001 | Mehrotra |
| 6,043,804 | A | 3/2000 | Greene | 6,229,553 | B1 | 5/2001 | Duluk et al. |
| 6,043,821 | A | 3/2000 | Sprague et al. | 6,232,981 | B1 | 5/2001 | Gossett |
| 6,046,746 | A | 4/2000 | Deering | 6,236,413 | B1 | 5/2001 | Gossett et al. |
| 6,046,747 | A | 4/2000 | Saunders et al. | 6,239,810 | B1 | 5/2001 | Van Hook et al. |
| 6,046,752 | A | 4/2000 | Kirkland et al. | 6,252,610 | B1 | 6/2001 | Hussain |
| 6,049,337 | A | 4/2000 | Van Overveld | 6,262,608 | B1 | 6/2001 | Snyder et al. |
| 6,049,338 | A | 4/2000 | Anderson et al. | 6,259,460 | B1 | 7/2001 | Gossett et al. |
| 6,052,125 | A | 4/2000 | Gardiner et al. | 6,264,558 | B1 | 7/2001 | Nishiumi et al. |
| 6,052,126 | A | 4/2000 | Sakuraba et al. | 6,268,861 | B1 | 7/2001 | Sanz-Pastor et al. |
| 6,052,127 | A | 4/2000 | Vaswani et al. | 6,275,235 | B1 | 8/2001 | Morgan, III |
| 6,052,129 | A | 4/2000 | Fowler et al. | 6,285,779 | B1 | 9/2001 | Lapidous et al. |
| 6,052,133 | A | 4/2000 | Kang | 6,292,194 | B1 | 9/2001 | Powll, III |
| 6,054,993 | A | 4/2000 | Devic et al. | 6,329,997 | B1 | 12/2001 | We et al. |
| 6,054,999 | A | 4/2000 | Strandberg | 6,331,856 | B1 | 12/2001 | Van Hook et al. |
| 6,057,847 | A | 5/2000 | Jenkins | 6,337,689 | B1 | 1/2002 | Hochmuth et al. |
| 6,057,849 | A | 5/2000 | Haubner et al. | 6,339,428 | B1 | 1/2002 | Fowler et al. |
| 6,057,851 | A | 5/2000 | Luken et al. | 6,342,892 | B1 | 1/2002 | Van Hook et al. |
| 6,057,852 | A | 5/2000 | Krech, Jr. | 6,353,438 | B1 | 3/2002 | Van Hook |
| 6,057,859 | A | 5/2000 | Handelman et al. | 6,356,497 | B1 | 3/2002 | Puar et al. |
| 6,057,861 | A | 5/2000 | Lee et al. | 6,384,824 | B1 | 5/2002 | Morgan et al. |
| 6,057,862 | A | 5/2000 | Margulis | 6,408,362 | B1 | 6/2002 | Arimilli et al. |
| 6,057,863 | A | 5/2000 | Olarig | 6,411,301 | B1 * | 6/2002 | Parikh et al. ............... 345/522 |
| 6,061,462 | A | 5/2000 | Tostevin et al. | 6,417,858 | B1 | 7/2002 | Bosch et al. |
| 6,064,392 | A | 5/2000 | Rohner | 6,426,747 | B1 | 7/2002 | Hoppe et al. |
| 6,067,098 | A | 5/2000 | Dye | 6,437,781 | B1 | 8/2002 | Tucker et al. |
| 6,070,204 | A | 5/2000 | Poisner | 6,452,600 | B1 | 9/2002 | Parikh |
| 6,072,496 | A | 6/2000 | Guenter et al. | 6,459,429 | B1 | 10/2002 | Deering |
| 6,075,543 | A | 6/2000 | Akeley | 6,466,223 | B1 | 10/2002 | Dorbie et al. |
| 6,075,546 | A | 6/2000 | Hussain et al. | 6,469,707 | B1 | 10/2002 | Voorhies |
| 6,078,311 | A | 6/2000 | Pelkey | 6,476,808 | B1 | 11/2002 | Kuo et al. |
| 6,078,333 | A | 6/2000 | Wittig et al. | 6,476,822 | B1 | 11/2002 | Burbank |
| 6,078,334 | A | 6/2000 | Hanaoka et al. | 6,496,187 | B1 | 12/2002 | Deering et al. |
| 6,078,338 | A | 6/2000 | Horan et al. | 6,501,479 | B1 | 12/2002 | Root et al. |
| 6,081,274 | A | 6/2000 | Shiraishi | 6,580,430 | B1 | 6/2003 | Hollis |
| 6,088,035 | A | 7/2000 | Sudarsky et al. | 6,593,923 | B1 | 7/2003 | Donovan et al. |
| 6,088,042 | A | 7/2000 | Handelman et al. | 6,597,363 | B1 | 7/2003 | Duluk, Jr. et al. |
| 6,088,487 | A | 7/2000 | Kurashige | 6,618,048 | B1 | 9/2003 | Leather |
| 6,088,701 | A | 7/2000 | Whaley et al. | 6,636,214 | B1 | 10/2003 | Leather |
| 6,091,431 | A | 7/2000 | Saxena et al. | 6,639,595 | B1 | 10/2003 | Drebin |
| 6,092,124 | A | 7/2000 | Priem et al. | 6,664,958 | B1 | 12/2003 | Leather |
| 6,092,158 | A | 7/2000 | Harriman et al. | 6,664,962 | B1 | 12/2003 | Komsthoeft |
| 6,094,200 | A | 7/2000 | Olsen et al. | 6,672,963 | B1 | 1/2004 | Link |
| 6,097,435 | A | 8/2000 | Stanger et al. | 6,700,586 | B1 | 3/2004 | Demers |
| 6,097,437 | A | 8/2000 | Hwang | 6,707,458 | B1 | 3/2004 | Leather |
| 6,104,415 | A | 8/2000 | Gossett | 6,717,577 | B1 | 4/2004 | Cheng et al. |
| 6,104,417 | A | 8/2000 | Nielsen et al. | | | | |
| 6,105,094 | A | 8/2000 | Lindeman | | | | |
| 6,108,743 | A | 8/2000 | Debs et al. | | | FOREIGN PATENT DOCUMENTS | |
| 6,111,582 | A | 8/2000 | Jenkins | EP | 0 637 813 A2 | 2/1995 | |
| 6,111,584 | A | 8/2000 | Murphy | EP | 1 074 945 | 2/2001 | |
| 6,115,047 | A | 9/2000 | Deering | EP | 1 075 146 | 2/2001 | |
| 6,115,049 | A | 9/2000 | Winner et al. | EP | 1 081 649 | 3/2001 | |
| 6,118,462 | A | 9/2000 | Margulis | EP | 1 189 172 | 3/2002 | |
| 6,128,026 | A | 10/2000 | Brothers, III | JP | 9-330230 | 12/1997 | |
| 6,144,365 | A | 11/2000 | Young et al. | JP | 11053580 | 2/1999 | |

| | | |
|---|---|---|
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-182077 | 6/2000 |
| JP | 2000-207582 | 7/2000 |
| JP | 2000-215325 | 8/2000 |
| JP | 2000-156875 | 6/2002 |
| WO | WO/93/04429 | 3/1993 |
| WO | WO 94/10641 | 5/1994 |

OTHER PUBLICATIONS

U.S. Appl. No. 09/726,215, filed Nov. 28, 2000, entitled "Method and Apparatus for Buffering Graphics Data in a Graphics System".
U.S. Appl. No. 09/722,419, filed Nov. 28, 2000, entitled "Graphics Pipeline Token Synchronization".
U.S. Appl. No. 09/722,382, filed Nov. 28, 2000, entitled "Method And Apparatus For Direct and Indirect Texture Processing In A Graphics System".
U.S. Appl. No. 09/722,367, filed Nov. 28, 2000, entitled "Recirculating Shade Tree Blender For A Graphics System".
U.S. Appl. No. 09/726,218, filed Nov. 28, 2000, entitled "Method And Apparatus For Efficient Generation Of Texture Coordinate Displacements For Implementing Emboss-Style Bump Mapping In A Graphics Rendering System".
U.S. Appl. No. 09/726,226, filed Nov. 28, 2000, entitled "Method And Apparatus For Anti-Aliasing In a Graphics System".
U.S. Appl. No. 09/722,380, filed Nov. 28, 2000, entitled "Graphics System With Embedded Frame Buffer Having Reconfigurable Pixel Formats".
U.S. Appl. No. 09/585,329, filed Jun. 2, 2000, entitled "Variable Bit Field Color Encoding".
U.S. Appl. No. 09/726,212, filed Nov. 28, 2000, entitled "Method And Apparatus For Providing Non-Photorealistic Cartoon Outlining Within A Graphics System".
U.S. Appl. No. 09/722,664, filed Nov. 28, 2000, entitled "Controller Interface For A Graphics System".
U.S. Appl. No. 09/722,667, filed Nov. 28, 2000, entitled "Method And Apparatus For Pre-Caching Data In Audio Memory".
U.S. Appl. No. 09/722,663, filed Nov. 28, 2000, entitled "Graphics System With Copy Out Conversions Between Embedded Frame Buffer And Main Memory".
U.S. Appl. No. 09/722,665, filed Nov. 28, 2000, entitled "Method and Apparatus for Accessing Shared Resources".
U.S. Appl. No. 09/723,335, filed Nov. 28, 2000, entitled "External Interfaces For A 3D Graphics and Audio Coprocessor".
U.S. Appl. No. 09/726,220, filed Nov. 28, 2000, entitled "Graphics Processing System With Enhanced Memory Controller".
Whitepapers: "Texture Addressing," Sim Dietrich, Jan. 6, 2000, www.nvidia.com.
White paper, Huddy, Richard, "The Efficient Use of Vertex Buffers," (Nov. 1, 2000).
White paper, Spitzer, John, et al., "Using GL_NV_array_range and GL_NV_Fence on GEForce Products and Beyond" (Aug. 1, 2000).
White paper, Rogers, Douglas H., "Optimizing Direct3D for the GeForce 256" (Jan. 3, 2000).
Hook, Brian, "An Incomplete Guide to Programming DirectDraw and Direct3D Immediate Mode (Release 0.46)," printed from web site: www.wksoftware.com, 42 pages.
Thompson, Tom, "Must-See 3-D Engines," Byte Magazine, printed from web site www.byte.com, 10 pages (Jun. 1996).
Thompson, Nigel, "Rendering with Immediate Mode," Microsoft Interactive Developer Column: Fun and Games, printed from web site msdn.microsoft.com, 8 pages (Mar. 1997).
"HOWTO: Animate Textures in Direct3D Immediate Mode," printed from web site support.microsoft.com, 3 pages (last reviewed Dec. 15, 2000).
INFO: Rendering a Triangle Using an Execute Buffer, printed from web site support.microsoft.com, 6 pages (last reviewed Oct. 20, 2000).
Datasheet, SGS-Thomson Microelectronics, nVIDIA™, RIVA 128™ 128-Bit 3D Multimedia Accelerator (Oct. 1997).
Product Presentation, "RIVA128™ Leadership 3D Acceleration," 2 pages.
ZDNet Reviews, from PC Magazine, "Other Enhancements," Jan. 15, 1999, wysiwyg://16/http://www4.zdnet.com...ies/reviews/0,4161,2188286,00.html.
ZDNet Reviews,.from PC Magazine, "Screen Shot of Alpha-channel Transparency," Jan. 15, 1999, wysiwyg://16/http://www4.zdnet.com...ies/reviews/0,4161,2188286,00.html.
Alpha (transparency) Effects, Future Technology Research Index, http://www.futuretech.vuurwerk.n1/alpha.html.
Blythe, David, 5.6 Transparency Mapping and Trimming with Alpha, http://toolbox.sgi.com/TasteOfDT/d...penGL/advanced98/notes/node41.html, Jun. 11, 1998.
10.2 Alpha Blending, http://www.sgi.com/software/opengl/advancedv/98/notes/node146.html.
10.3 Sorting, http://www.sgi.com/software/opengl/advancedv/notes/node147.html.
10.4 Using the Alpha Function, http://www.sgi.com/software/opengl/advanced98/notes/node148.html.
Winner, Stephanie, et al., "Hardware Accelerated Rendering Of Antialiasing Using A Modified A-buffer Algorithm," Computer Graphics Proceedings, Annual Conference Series, 1997, pp. 307-316.
Debevec, Paul, et al., "Efficient View-Dependent Image-Based Rendering with Projective Texture-Mapping," University of California at Berkeley.
Gibson, Simon, et al., "Interactive Rendering with Real-World Illumination," Rendering Techniques 2000; 11th Eurographics Workshop on Rendering, pp. 365-376 (Jun. 2000).
Segal, Mark, et al., "Fast Shadows and Lighting Effects Using Texture Mapping," Computer Graphics, 26, 2, pp. 249-252 (Jul. 1992).
White paper, Kilgard, Mark J., "Improving Shadows and Reflections via the Stencil Buffer" (Nov. 3, 1999).
"OpenGL Projected Textures," from web site:HTTP:// reality.sgi.com, 5 pages.
"5.13.1 How to Project a Texture," from web site: www.sgi.com, 2 pages.
Arkin, Alan, email, subject: "Texture distortion problem," from web site: HTTP://reality.sgi.com (Jul. 1997).
Moller, Tomas et al., "Real-Time Rendering," pp. 179-183 (AK Peters Ltd., 1999).
Williams, Lance, "Casting Curved Shadows on Curved Surfaces," Computer Graphics (SIGGRAPH '78 Proceedings), vol. 12, No. 3, pp. 270-274 (Aug. 1978).
Woo et al., "A Survey of Shadow Algorithms," IEEE Computer Graphics and Applications, vol. 10, No. 6, pp. 13-32 (Nov. 1990).
Heidrich et al., "Applications of Pixel Textures in Visualization and Realistic Image Synthesis," Proceedings 1999 Symposium On Interactive 3D Graphics, pp. 127-134 (Apr. 1999).
Michael McCool, "Shadow Volume Reconstruction from Depth Maps", ACM Transactions on Graphics, vol. 19, No. 1, Jan. 2000, pp. 1-26.
RenderMan Artist Tools, PhotoRealistic RenderMan 3.8 User's Manual, Pixar (Aug. 1998).
RenderMan Interface Version 3.2 (Jul. 2000).
White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).
Peter J. Kovach, Inside Direct 3D, "Alpha Testing," pp. 289-291 (1999).
Web site information, CartoonReyes, REM Infografica, http://www.digimotion.co.uk/cartoonreyes.htm.

Raskar, Ramesh et al., "Image Precision Silhouette Edges," Symposium on Interactive 3D Graphics1999, Atlanta, 7 pages, (Apr. 26-29, 1999).

Schlechtweg, Stefan et al., Rendering Line-Drawings with Limited Resources, Proceedings of GRAPHICON '96, 6th International Conference and Exhibition on Computer Graphics and Visualization in Russia, (St. Petersburg, Jul. 1-5, 1996) vol. 2, pp. 131-137.

Haeberli, Paul et al., "Texture Mapping as a Fundamental Drawing Primitive," Proceedings of the Fourth Eurographics Workshop on Rendering, 11pages, Paris, France (Jun. 1993).

Schlechtweg, Stefan et al., "Emphasising in Line-drawings," Norsk samarbeid innen grafisk databehandling: NORSIGD Info, medlemsblad for NORSIGD, Nr 1/95, pp. 9-10.

Markosian, Lee et al., "Real-Time Nonphotorealistic Rendering," Brown University site of the NSF Science and Technology Center for Computer Graphics and Scientific Visualization, Providence, RI, 5 pages (undated).

Feth, Bill, "Non-Photorealistic Rendering," wif3@cornell.edu, CS490—Bruce Land, 5 pages (Spring 1998).

Elber, Gershon, "Line Art Illustrations of Parametric and Implicit Forms," IEEE Transactions on Visualization and Computer Graphics, vol. 4, No. 1, Jan.-Mar. 1998.

Zeleznik, Robert et al."SKETCH: An Interface for Skectching 3D Scenes," Computer Graphics Proceedings, Annual Conference Series 1996, pp. 163-170.

Computer Graphics World, Dec. 1997.

Reynolds, Craig, "Stylized Depiction in Computer Graphics, Non-Photorealistic, Painterly and 'Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages, Jun. 1998, http://www.pixar.com/products/renderman/Toolkit/Toolkit/AppNotes/appnote.24.html.

Decaudin, Philippe, "Cartoon-Looking Rendering of 3D Scenes," Syntim Project Inria, 6 pages, http://www-syntim.inria.fr/syntim/recherche/decaudin/cartoon-eng.html.

Hachigian, Jennifer, "Super Cel Shader 1.00 Tips and Tricks," 2 pages, wysiwyg://thePage.13/http://members.xoom.com/_XMCM.jarvia/3D/celshade.html.

Digimation Inc., "The Incredible Comicshop," info sheet, 2 pages, http://www.digimation.com/asp/product/asp?product_id=33.

Softimage/3D Full Support, "Toon Assistant," 1998 Avid Technology, Inc., 1 page, http://www.softimage.com/3dsupport/techn...uments/3.8/features3.8/rel_notes.56.html.

Cambridge Animo—Scene III, info sheet, Cambridge Animation Systems, 2 pages, http://www.cam-ani.co.uk/casweb/products/software/SceneIII.htm.

Mulligan, Vikram, "Toon, " info sheet, 2 pages, http://digitalcarversguild.com/products/toon/toon.thml.

Toony Shaders, "Dang I'm tired of photorealism," 4 pages, http://www.visi.com/~mcdonald/toony.html.

"Cartoon Shading, Using Shading Mapping," 1 page, http://www.goat.com/alias/shaders.html#toonshad.

Web site information, CartoonReyes, http://www.zentertainment.com/zentrophy/review/cartoonreyes.html.

VIDI Presenter 3D Repository, "Shaders." 2 pages, http://www.webnation.com/vidirep/panels/renderman/shaders/toon.phtml.

The RenderMan Interface Version 3.1, (Sep. 1989).

Web site materials, "Renderman Artist Tools, PhotoRealistic RenderMan 3.8 User's Manual," Pixar.

NVIDIA.com, technical presentation, "AGDC Per-Pixel Shading" (Nov. 15, 2000).

NVIDIA.com, technical presentation, Introduction to DX8 Pixel Shaders (Nov. 10, 2000).

NVIDIA.com, technical presentation, "Advanced Pixel Shader Details" (Nov. 10, 2000).

"Developer's Lair, Multitexturing with the ATI Rage Pro," (7 pages) from ati.com web site (2000).

Slide Presentation, Sébastien Dominé, "nVIDIA Mesh Skinning, OpenGl".

Singh, Karan et al., "Skinning Characters using Surface-Oriented Free-Form Deformations," Toronto Canada.

"Hardware Technology," from ATI.com web site, 8 pages (2000).

"Skeletal Animation and Skinning," from ATI.com web site, 2 pages (Summer 2000).

Press Releases, "ATI's RADEON family of products delivers the most comprehensive support for the advance graphics features of DirectX 8.0," Canada, from ATI.com web site, 2 pages (Nov. 9, 2000).

"Ati Radeon Skinning and Tweening," from ATI.com web site, 1 page (2000).

Hart, Evan et al., "Vertex Shading with Direct3D and OpenGL," Game Developers Conference 2001, from ATI.com web site (2001).

Search Results for: skinning, from ATI.com web site, 5 pages (May 24, 2001).

Hart, Evan et al., "Graphics by rage," Game Developers Conference 2000, from ATI.com web site (2000).

Efficient Command/Data Interface Protocol For Graphics, IBM TDB, vol. 36, issue 9A, Sep. 1, 1993, pp. 307-312.

Shade, Jonathan et al., "Layered Depth Images," Computer Graphics Proceedings, Annnual Conference Series, pp. 231-242 (1998).

Videum Conference Pro (PCI) Specification, product of Winnov (Winnov), published Jul. 21, 1999.

Hoppe, Hugues, "Optimization of Mesh Locality for Transparent Vertex Caching," Proceedings of Siggraph, pp. 269-276 (Aug. 8-13, 1999).

Whitepaper: Implementing Fog in Direct3D, Jan. 3, 2000, www.nvidia.com.

Akeley, Kurt, "Reality Engine Graphics", 1993, Silicon Graphics Computer Systems, pp. 109-116.

Peter J. Kovach, "Inside Direct3D," pp. 249-262, Microsoft Press 2000.

McCool, M.D. et al., "Texture Shaders," Proceedings 1999 Eurographics/Siggraph Workshop on Graphics Hardware, Los Angeles, CA, Aug. 8-9, 1999, SIGGRAPH/Eurographics Workshop on Graphics Hardware, New York, NY: ACM, US, pp. 122-125, Figure 4 (Aug. 8, 1999).

Heidrich W. et al., "Illuminating micro geometry based on precomputed visibitly," Computer Graphics Proceedings, Siggraph 2000, Conference Proceedings, New Orleans, LA, USA, Jul. 27-28, 2000, pp. 455-464, New York, NY, USA, ACM.

Photograph of Sony PlayStation II System.

Photograph of Sega Dreamcast System.

Photograph of Nintendo 64 System.

Whitepaper: 3D Graphics Demystified, Nov. 11, 1999, www.nvidia.com.

Whitepaper: "Z Buffering, Interpolation and More W-Buffering", Doug Rogers, Jan. 31, 2000, www.nvidia.com.

Whitepaper: Using GL_NV_vertex_array and GL_NV_fence, posted Aug. 1, 2000, www.nvidia.com.

Whitepaper: Anisotropic Texture Filtering in OpenGL, posted Jul. 17, 2000, www.nvidia.com.

Whitepaper: Mapping Texels to Pixels in D3D, posted Apr. 5, 2000, www.nvidia.com.

Whitepaper: Guard Band Clipping, posted Jan. 31, 2000, www.nvidia.com.

Whitepaper: Cube Environment Mapping, posted Jan. 14, 2000, www.nvidia.com.

Whitepaper: Color Key in D3D, posted Jan. 11, 2000, www.nvidia.com.

Whitepaper: Vertex Blending Under DX7 for the GeForce 256, Jan. 5, 2000, www.nvidia.com.

Whitepaper: Optimizing Direct3D for the GeForce 256, Jan. 3, 2000, www.nvidia.com.

Whitepaper: Dot Product Texture Blending, Dec. 3, 1999, www.nvidia.com.

Whitepaper: Technical Brief: AGP 4X with Fast Writes, Nov. 10, 1999, www.nvidia.com.

Technical Brief: Transform and Lighting, Nov. 10, 1999, www.nvidia.com.

Technical Brief: What's New With Microsoft DirectX7, posted Nov. 10, 1999, www.nvidia.com.

Mitchell et al., "Multitexturing in DirectX6", Game Developer, Sep. 1998, www.gdmag.com.
VisionTek, "GeForce2 GS Graphics Processing Unit", ©2000 www.visiontek.com.
Jim Bushnell et al. "Advanced Multitexture Effects With Direct3D and OpenGL", Pyramid Peak Design & ATI Research, Inc., GameDevelopers Conference, ©1999.
Sony Playstation II Instruction Manual, Sony Computer Entertainment Inc., ©2000.
Stand and Be Judged, Next Generation, May 2000.
PlayStation II: Hardware Heaven or Hell?, Next Generation, Jan. 2000.
Chris Charla, "PlayStation II: The Latest News", Next Generation, Sep. 1999.
"First PlayStation II Gameplay Screens Revealed!", Next Generation, Sep. 1999.
Game Enthusiast Online Highlights, Mar. 18, 1999.
Game Enthusiast Online Highlights, Mar. 19, 1999.
Game Enthusiast Online Highlights, Mar. 17, 1999.
Game Enthusiast Online Highlights, Oct. 20, 1999.
Joel Easley, "PlayStation II Revealed", Game Week, Sep. 29, 1999.
Inside Sony's Next Generation Playstation, ©1999.
Press Releases, Mar. 18, 1999.
Chris Johnston, "PlayStation Part Deux", Press Start, ©1999.
Nikkei Shimbun, "Sony Making SME, Chemical and SPT into Wholly-Owned Subsidairies", Mar. 9, 1999.
AM News: Japanese Developers Not All Sold on PS2, Next Generation, Mar. 16, 1999.
Sony To Turn PlayStation Maker Into Wholly Owned Unit-Nikkei, Dow Jones News Service, Mar. 8, 1999.
Yumiko Ono, Sony Antes Up Its Chips In Bet On New Game System, Dow Jones News Service, Mar. 4, 1999.
MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.
A Microprocessor With a 128b CPU, 10 Floating-Point MAC's, 4 Floating-Point Dividers, and an MPEG2 Decoder, 1999 IEEE International Solid-State Circuits Conference, Feb. 16, 1999.
Dreamcast Instruction Manual, Sega Enterprises, Ltd., ©1998.
"Sega To Launch Video Camera for Dreamcast", Reuters Business News, Feb. 16, 2000.
David Pescovitz; "Dream On", Wired, Aug. 1999.
Randy Nelson, "Dreamcast 101: Everything You Ever Wanted To Know About Sega's Powerful New Console", Official Sega Dreamcast Magazine, Jun. 1999.
2D/3D Graphics Card User Manual, Guillemot ©1999.
Nintendo 64 Instruction Booklet, Nintendo of America, 1998.
Steven Levy, "Here Comes PlayStation II", Newsweek, Mar. 6, 2000.
David Sheff, "Sony Smackage: Test Driving The PlayStaion II", Wired, Nov. 1999.
Introducing The Next Generation PlayStation, Sony Computer Entertainment Inc., ©1999.
Leadtek GTS, Aug. 3, 2000, www.hexus.net.
Voodoo 5 5500 Review, Jul. 26, 2000, www.hexus.net.
ATI Radeon 64 Meg DDR OEM, Aug. 19, 2000, www.hexus.net.
Microsoft Xbox—The Future of Gaming, Microsoft Xbox Performance Sheet, www.xbox.com.
Robert L. Cook, "Shade Trees", Computer Graphics, vol. 18, No. 3, Jul. 1984.
Wang et al., "Second-Depth Shadow Mapping", Department of Computer Science, Univ. N.C, Chapel Hill, N.C. pp. 1-7.
Peercy et al., "Efficient Bump Mapping Hardware", Computer Graphics Proceedings, Annual Conference Series, 1997.
Gustavo Oliveira, "Refractive Texture Mappig, Part One", www.gamasutra.com, Nov. 10, 2000.
James F. Blinn, "Simulationof Wrinkled Surfaces," Calltech/JPL, pp. 286-292, SIGGRAPH 78 (1978).
Tomas Möller and Eric Haines "Real-Time Rendering", AK Peters, Ltd., ©1999, pp. 127-142.
Technical Presentation: Vertex Buffers, posted Jun. 12, 2000, www.nvidia.com.
Technical Presentation: Hardware Transform and Lighting, www.nvidia.com, posted Jun. 12, 2000.
Technical Presentation: Hardware Bump-mapping Choices and Concepts, Jun. 7, 2000, www.nvidia.com.
Technical Presentation: How to Bump Map a Skinned Polygonal Model, Jun. 7, 2000, www.nvidia.com.
Technical Presentation: Computations for Hardware Lighting and Shading, Mar. 17, 2000, www.nvidia.com.
Technical Presentation: Practical Bump-mapping for Today's GPUs, Mar. 17, 2000 www.nvidia.com.
Technical Presentation: Shadows, Transparency, & Fog, Mar. 17, 2000 www.nvidia.com.
Technical Presentation: GeForce 256 Register Combiners, Mar. 17, 2000,www.nvdia.com.
Technical Presentation: TexGen & The Texture Matrix, Mar. 15, 2000, www.nvidia.com.
Technical Presentation: Toon Shading, Mar. 15, 2000, www.nvidia.com.
Technical Presentation: D3D 7 Vertex Lighting, Mar. 15, 2000, www.nvidia.com.
Technical Presentation: Per-Pixel Lighting (by S. Dietrich) Mar. 14, 2000 www.nvidia.com.
Technical Presentation: GeForce 256 and RIVA TNT Combiners, Dec. 8, 1999, www.nvidia.com.
Technical Presentation: Vertex Cache Optimization, Nov. 12, 1999, www.nvidia.com.
Technical Presentation: Vertex Blending, Nov. 12, 1999, www.nvidia.com.
Technical Presentation: Hardware Transform and Lighting, Nov. 12, 1999, www.nvidia.com.
Technical Presentation: GeForce 256 Overview, Nov. 12, 1999, www.nvidia.com.
Technical Presentation: DirectX 7 and Texture Management, Nov. 12, 1999 www.nvidia.com.
Technical Presentation: Dot Product Lighting, Nov. 12, 1999, www.nvidia.com.
Technical Presentation: Texture Coordinate Generation, Nov. 3, 1999, www.nvidia.com.
Technical Presentation: Phong Shading and Lightmaps, Nov. 3, 1999, www.nvidia.com.
Technical Presentation: The ARB_multitexture Extension, Nov. 3, 1999 www.nvidia.com.
Technical Presentation: Multitexture Combiners, Nov. 3, 1999, www.nvidia.com.
Technical Presentation: Emboss Bump Mapping, Nov. 3, 1999, www.nvidia.com.
Technical Presentation: Hardware Accelerated Anisotropic Lighting, Nov. 3, 1999 www.nvidia.com.
Technical Presentation: Guard Band Clipping, Nov. 3, 1999, www.nvidia.com.
The RenderMan Interface, Stephan R. Keith, Version 3.1, Pixar Animation Studios, Sep. 1989.
Teh RenderMan Interface, Version 3.2, Pixar Animation Studios, Jul. 2000, www.pixar.com.
NVIDIA Product Overview, "GeForce2Ultra", NVIDIA Corporation, Aug. 21, 2000, www.nvidia.com.
Duke, "Dreamcast Technical Specs", Sega Dreamcast Review, Sega, Feb. 1999, www.game-revolution.com.
Marlin Rowley, "GeForce 1 & 2 GPU Speed Tests", May 11, 2000, www.g256.com.
"Dreamcast: The Full Story", Next Generation, Sep. 1998.
DirectX 7.0 Programmer's Reference, Microsoft Corporation, 1995-1999 (as part of the DirectX 7.0 SDK on the Companion CD included with "Inside Direct3D", Microsoft Programming Series, Peter J. Kovach, Microsoft Press, 1999).
"Inside Direct3D", Microsoft Programming Series, Peter J. Kovach, Microsoft Press, 1999.
"OpenGL Programming Guide, The Official Guide to Learning OpenGL, Release 1", Jackie Nieder, Tom David, Mason Woo, Addision-Wesley Publishing Co., 1993.
"Procedural Elements for Computer Graphics," Second Edition, David F.. Rogers, McGraw Hill, 1998.
"Real-Time Rendering," Tomas Molleir, Eric Haines, AK Peters, 1999.
"Computer Graphics, Principles and Practice," Second Edition, The Systems Programming Series, Foley, van Dam, Fiener, Hughes, Addison Wesley, 1990.
"Principles of Three-Dimensional Computer Animation", Revised Edition, Michael O'Rourke, W.W. Norton & Company, 1998.

* cited by examiner

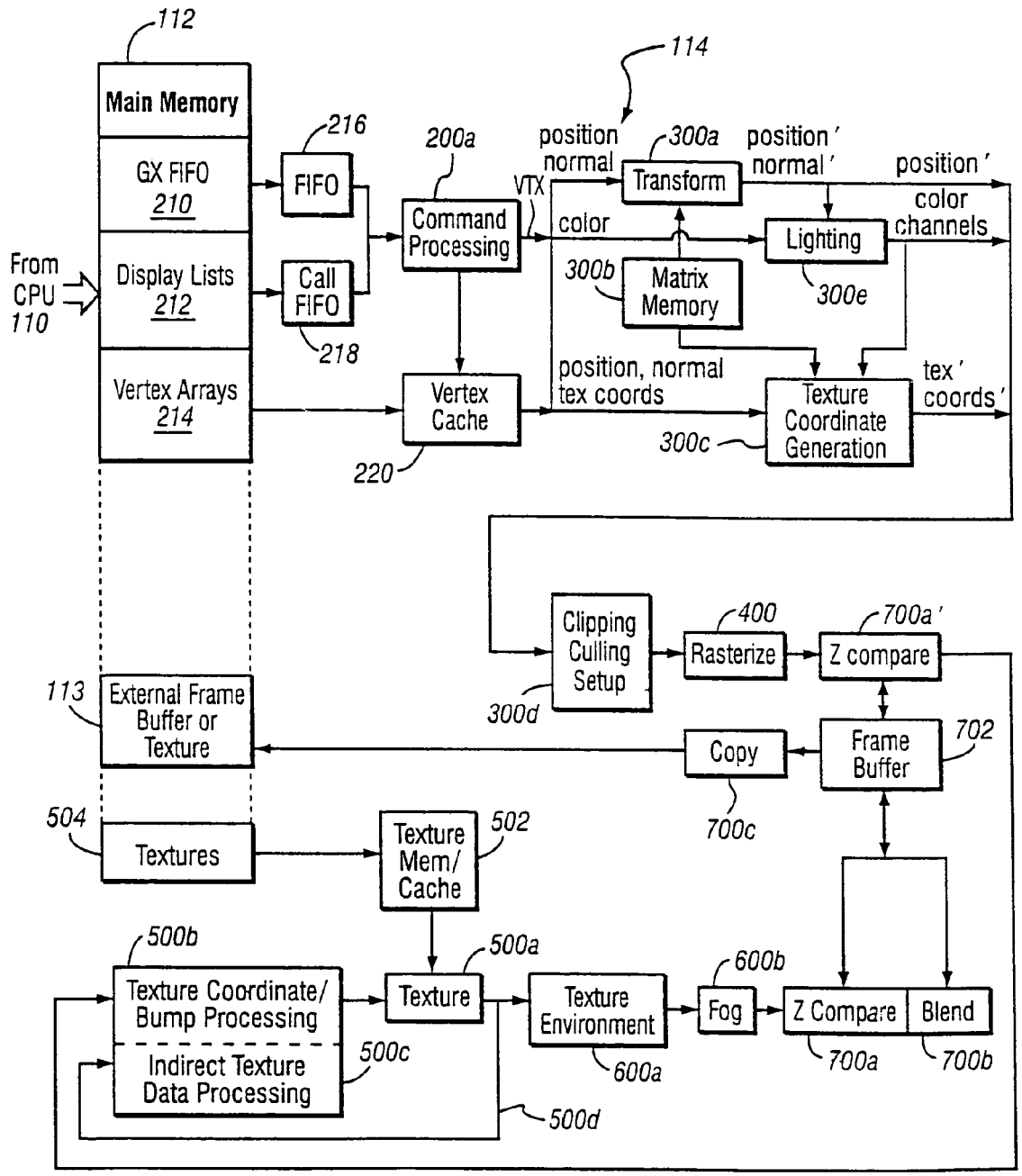
Fig. 5 EXAMPLE GRAPHICS PROCESSOR FLOW

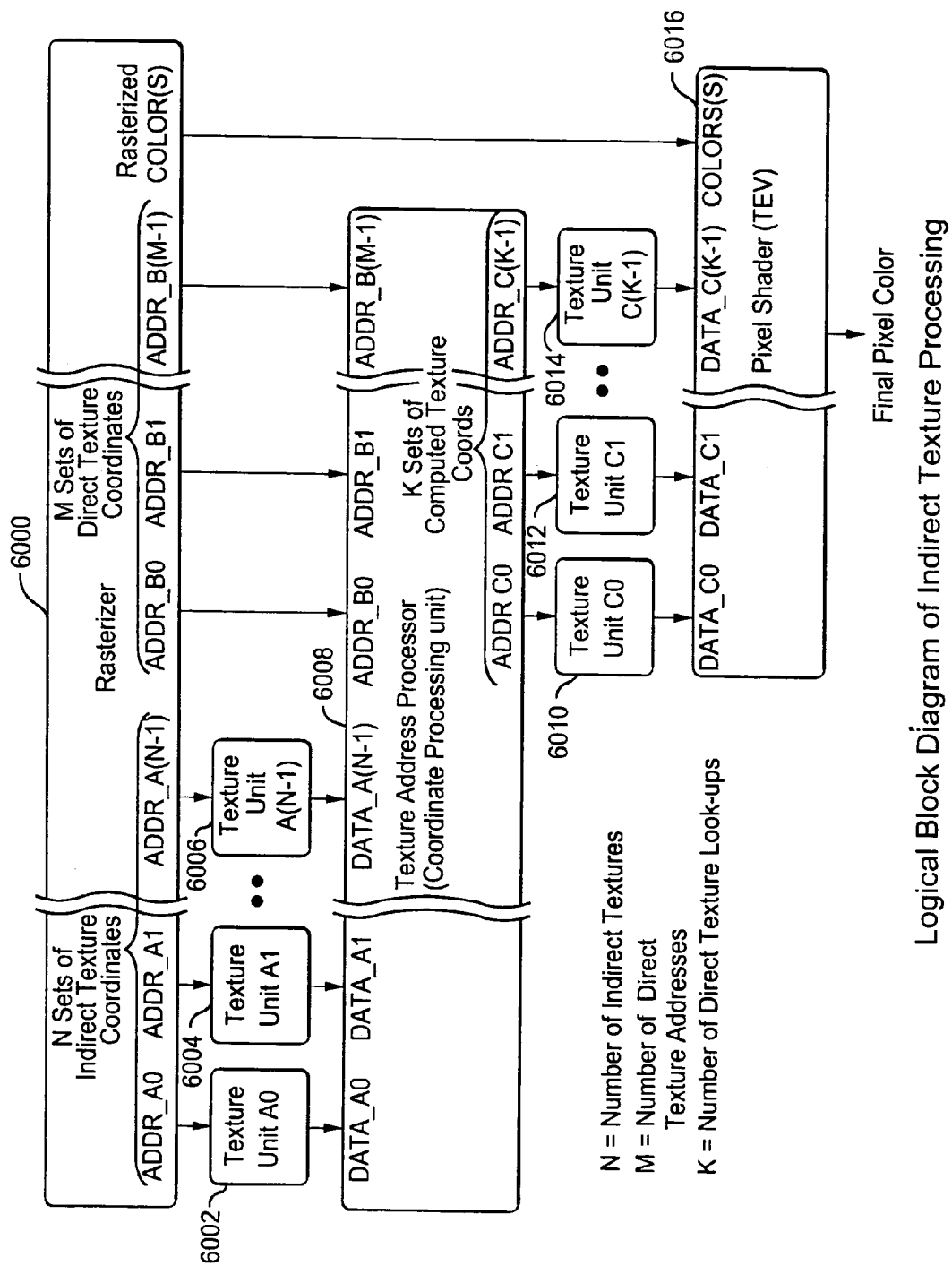

*REGULAR TEXTURE LOOKUP*

*INDIRECT TEXTURE LOOKUP*

Physical Block Diagram of Direct and Indirect Texture Processing

REGULAR (NON-INDIRECT) TEXTURE PROCESSING

REGULAR AND INDIRECT TEXTURE PROCESSING

EXAMPLE TEXTURE COORDINATE/BUMP PROCESSING UNIT

*EXAMPLE INDIRECT-TEXTURE LOOKUP DATA PROCESSING LOGIC*

$$\begin{pmatrix} s' \\ t' \end{pmatrix} = \overbrace{\begin{pmatrix} ma & mb \\ mc & md \\ me & mf \end{pmatrix}}^{M} \cdot \overbrace{\begin{pmatrix} s \\ t \\ u \end{pmatrix}}^{V}$$

Fig. 16A
EXAMPLE TEXTURE
STATIC OFFSET MATRIX

Matrix A
$$\begin{pmatrix} s/256 & t/256 \\ 0 & 0 \\ 0 & 0 \end{pmatrix}$$

Matrix B
$$\begin{pmatrix} 0 & 0 \\ s/256 & t/256 \\ 0 & 0 \end{pmatrix}$$

Fig. 16B
EXAMPLE TEXTURE
DYNAMIC OFFSET MATRICES

| | | | |
|---|---|---|---|
| MTXA$_i$ | s$_i$ (1:0) | mb$_i$ (10:0) | ma$_i$ (10:0) |
| MTXB$_i$ | s$_i$ (3:2) | md$_i$ (10:0) | mc$_i$ (10:0) |
| MTXC$_i$ | s$_i$ (5:4) | mf$_i$ (10:0) | me$_i$ (10:0) |
| CMDi | ▨ fb$_i$ ▨ tw$_i$ sw$_i$ | m$_i$ ▨ bias$_i$ | fmt$_i$ bt$_i$ |
| | ⋮ | | |
| | | imask (7:0) | |
| GEN MODE | ▨ nbmp | ntev | ntex |

Fig. 17
EXAMPLE CONTROL
LOGIC REGISTERS

EXAMPLE GENERAL ENVIRONMENT MAPPED
BUMP MAPPING PROCEDURE

METHOD 1: ENVIRONMENT-MAPPED
BUMP MAPPING (EMBM) - BASED ON PERTURBATIONS MODELED IN 3D(dXdYdZ)

EXAMPLE SIMPLIFIED FLAT SURFACE
ENVIRONMENT MAPPED BUMP MAPPING

EXAMPLE BUMP MAP

EXAMPLE FLAT SURFACE
BUMP MAP TEXTURE

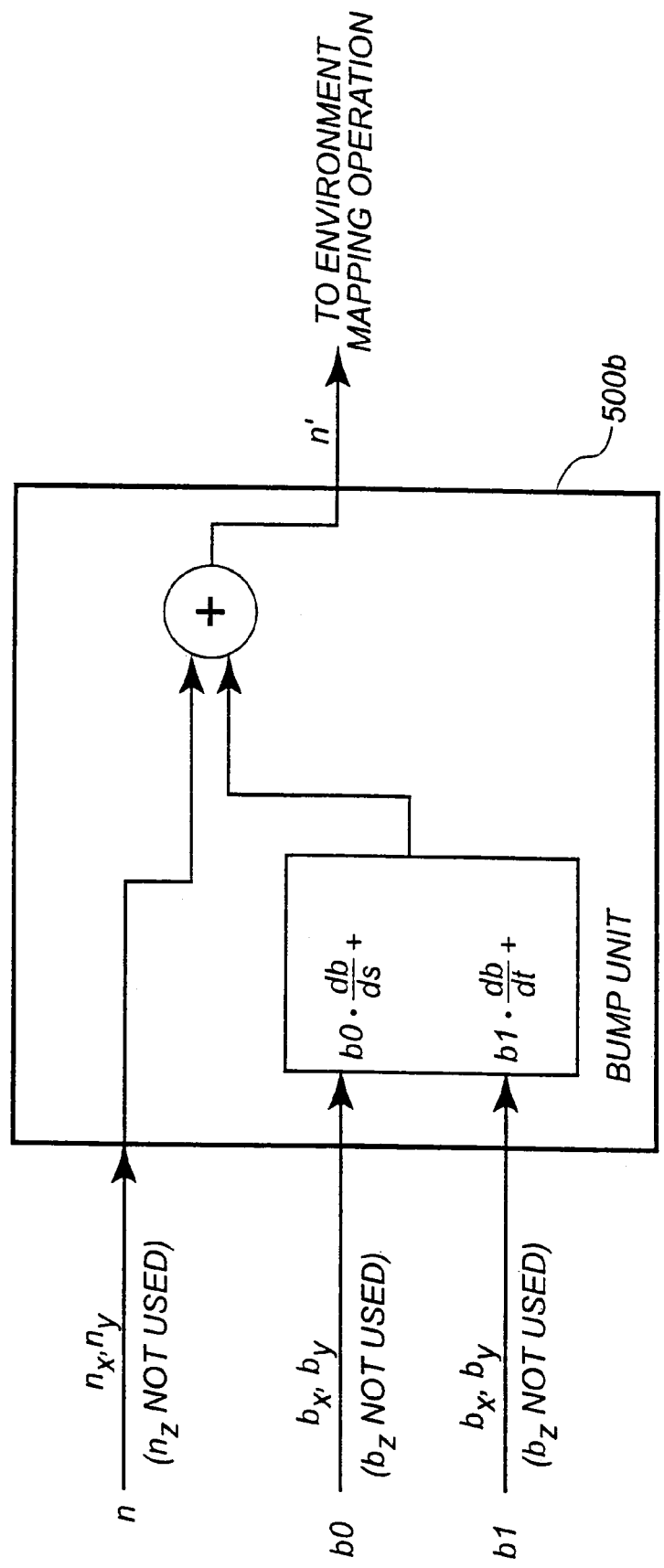
FIG. 23  EXAMPLE BUMP MAPPING FOR FLAT SURFACE EXAMPLE (dSdT)

METHOD 2: ENVIRONMENT - MAPPED BUMP MAPPING (EMBM) - BASED ON BINORMALS AND MODELED PERTURBATIONS (dSdT)

EXAMPLE PROCESS FOR
EMBM USING FLAT SURFACE (dSdT)
MODELED PERTURBATIONS

EXAMPLE EMBM (dSdT) PROCESS STEPS

*DETAILED EXAMPLE EMBM (dSdT) PROCESS STEPS*

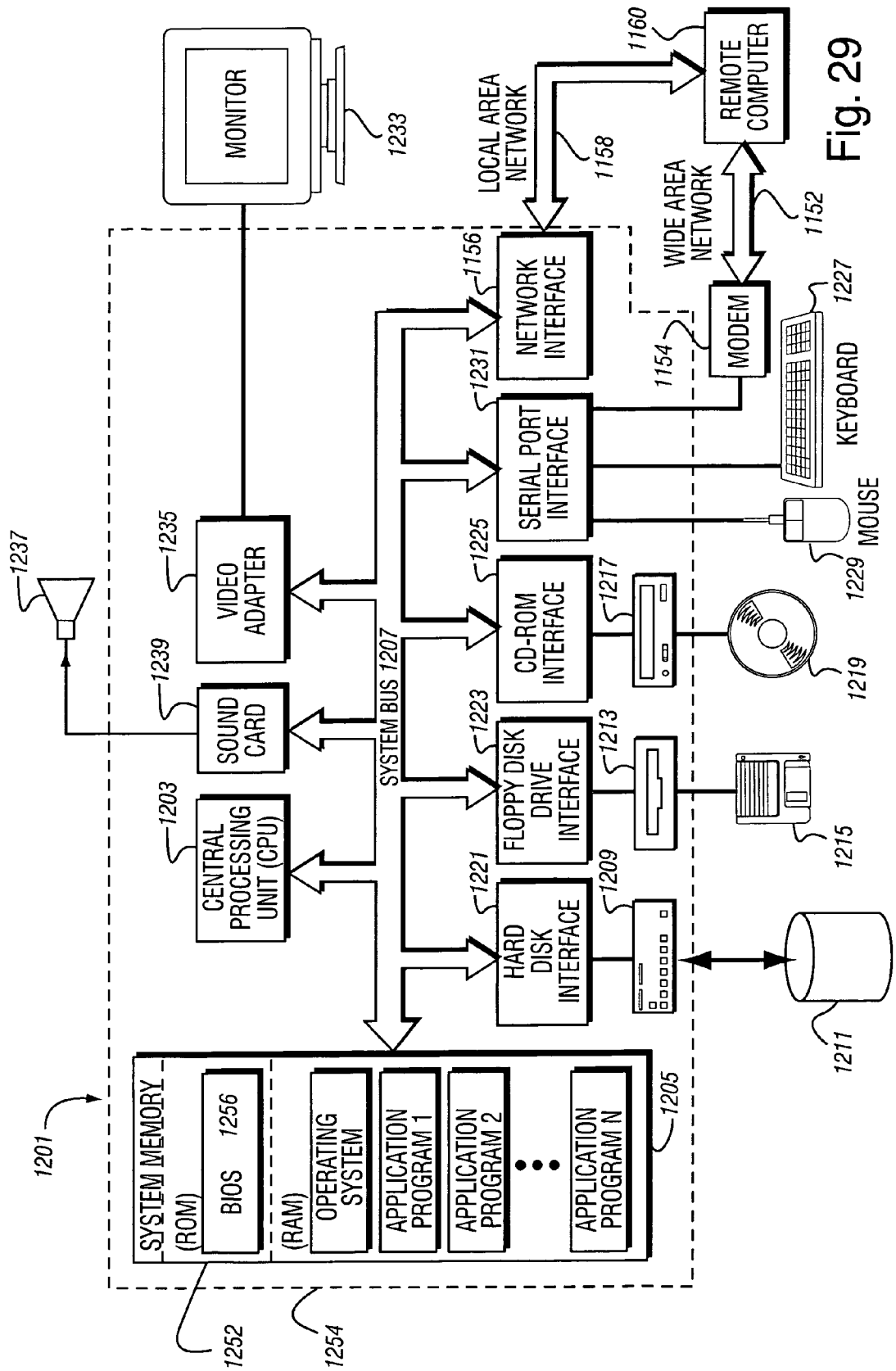

METHOD AND APPARATUS FOR ENVIRONMENT-MAPPED BUMP-MAPPING IN A GRAPHICS SYSTEM

RELATED APPLICATIONS

This application claims the benefit of U.S. application Ser. No. 09/722,381, filed Nov. 28, 2000, and U.S. Provisional Application Ser. No. 60/226,893, filed Aug. 23, 2000, the entire contents of which are hereby incorporated by reference.

FIELD OF THE INVENTION

The present invention relates to computer graphics, and more particularly to interactive graphics systems such as home video game platforms. Still more particularly this invention relates to a method and apparatus for performing environment mapped bump-mapping in a graphics system.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

One problem graphics system designers confronted in the past was how to create realistic looking surface detail on a rendered object without resorting to explicit modeling of the desired details with polygons or other geometric primitives. Although surface details can be simulated, for example, using myriad small triangles with interpolated shading between vertices, as the desired detail becomes finer and more intricate, explicit modeling with triangles or other primitives places high demands on the graphics system and becomes less practical. An alternative technique pioneered by E. Catmull and refined by J. F. Blinn and M. E. Newell is to "map" an image, either digitized or synthesized, onto a surface. (See "A Subdivision Algorithm for Computer Display of Curved Surfaces" by E. Catmull, Ph.D. Thesis, Report UTEC-CSc-74-133, Computer Science Department, University of Utah, Salt Lake City, Utah, December 1994 and "Texture and Reflection in Computer Generated Images" by J. F. Blinn and M. E. Newell, CACM, 19(10), October 1976, 452–457). This approach is known as texture mapping (or pattern mapping) and the image is called a texture map (or simply referred to as a texture). Alternatively, the texture map may be defined by a procedure rather than an image.

Typically, the texture map is defined within a 2D rectangular coordinate space and parameterized using a pair of orthogonal texture coordinates such, as for example, (u, v) or (s, t). Individual elements within the texture map are often called texels. At each rendered pixel, selected texels are used either to substitute for or to scale one or more material properties of the rendered object surface. This process is often referred to as texture mapping or "texturing."

Although most 3-D graphics rendering systems now include a texturing subsystem for retrieving textures from memory and mapping the textures onto a rendered object surface, another problem confronting graphics system designers is how to texture a 3D object with realistic-looking surface characteristics that react to various lighting conditions in a manner similar to the surface of an actual object having, for example, random surface flaws, irregularities, roughness, bumps or other slight non-planar surface variations. Regular texture mapping does not provide such realism because texture images are generally two-dimensional and can not react or change in appearance in response to changes in position or direction of the lighting within a rendered scene. While in some instances such minute surface characteristics might be actually modeled, the time required for translating and rendering a 3D object with such a complex surface would be prohibitive for most real-time or interactive gaming applications. Consequently, various solutions to this problem were offered. For example, a technique generally known as "bump-mapping" was developed which allowed one to approximate the effect that non-planar surface variations would produce on lighted object. See, for example, J. F. Blinn "Simulation of Wrinkled Surfaces" Computer Graphics, (SIGRAPH '78 Proceedings), vol. 12, No. 3, pp. 286–292 (August 1978) and "Models of Light Reflection for Computer Synthesized Pictures", Proc. 4th Conference on Computer Graphics and Instructive Techniques, 1977.

Basically, bump-mapping allows a graphics application programmer to add realism to the surface of an object without using a lot of geometry by modeling small surface variations as height differences and then applying those difference values over a surface as perturbations to a surface Normal vector used in computing surface lighting effects. Effectively, a bump-map modifies the shading of a polygon (or primitive) by perturbing the surface Normal on a per-pixel basis. The shading makes the surface appear bumpy, even though the underlying geometry is relatively flat.

Although conventional bump-mapping techniques offer some improvement, a further problem confronting graphics system designers is that conventional approaches to simple forms of bump-mapping, such as the "emboss"-style of bump mapping, typically only consider the interaction between a bump map and a single diffuse light source. Moreover, in many cases, the bump map is inconveniently "tied" to a specific geometric shape in the sense that it should be constructed (i.e., parameterized) for an object having a particular surface geometry and only works well for geometrically similar surfaces. In addition, if the object is rotated, the bump map will not apply to the entire surface (e.g., newly visible surface regions after rotation).

Another known technique for providing realistic looking surface on a rendered object uses a method called "environment mapping". Environment mapping (EM), also called "reflection mapping", is a simple yet powerful method of generating approximations of reflections in curved surfaces. This technique was introduced by Blinn and Newell, "Texture and Reflection In Computer Generated Images," *Communications of the ACM*, Vol. 19, no. 10, pp. 542–547 (October 1976). Conventionally, methods start with a ray from the viewer to a point on the reflector. This ray is then reflected with respect to the normal at that point. Instead of finding the intersection with the closest surface, as is done in ray tracing processes, EM uses the direction of the reflection vector as an index to an image containing the environment. The environment mapping approximation assumes that the objects and lights being reflected with EM are far away, and that the reflector will not reflect itself. If these assumptions hold, then the environment around the reflector can be treated as a two-dimensional projection surrounding it.

The basic steps for environment mapping are as follows:
Generate a two-dimensional image of the environment (this is the environmental map).
For each pixel that contains a reflective object, compute the normal at the location on the surface of the object (if per-pixel EM is not available, then the normal is computed at polygon vertices).
Compute the reflection vector from the view vector and the normal.
Use the reflection vector to compute an index into the environment map that represents the objects in the reflection direction.
Use the data from the environment map to color the current pixel.

In addition, there are a variety of known "projector" functions that may be used to map the reflection vector into one or more textures. Blinn and Newell's algorithm and Grene's cubic environment mapping technique are classic mapping methods, although a sphere map is also commonly used.

While much work has been done in the past, further improvements are possible and desirable.

The present invention improves on prior techniques by providing an apparatus and example procedures for performing an environment-mapped bump-mapping (EMBM). In accordance with one aspect provided by this invention, environment mapped bump mapping in a graphics system is performed by generating texture coordinates from parameters of a surface; bump mapping to perturb the texture coordinates; environment mapping based on the perturbed texture coordinates; and displaying an image obtained from the environment mapping. The bump mapping may model surface perturbations using a three-dimensional model in modeling space, or it may model the surface perturbations in two dimensions in eye-space. These different modeling techniques provide different advantages and features.

In more detail, one environment mapped bump mapping technique uses a bump map to model surface perturbations in three dimensions. The output of the bump mapping operation is provided to a matrix multiplication operation that allows rotation in any direction. The resulting rotated values are combined with Normal vector values for environment mapping.

In another embodiment, the bump map models surface perturbations in two dimensions using partial derivatives. The bump map output is combined with Normal vector partial derivatives using a sum-of-product calculation to provide texture coordinates for environment mapping. The inverse of the transformation matrix is used for geometric transformations to transform the Normal vector partial derivatives.

In more detail, a first example EMBM procedure is provided that permits very fast processing of object surface Normal perturbations modeled in 3D (dXdYdZ) for specific object surface geometries using a pre-computed bump map stored in memory as a texture. A second example EMBM procedure is provided for Normal perturbations modeled with respect to a flat surface (dSdT) which frees the bump map from use with a particular surface geometry and allows it to be applied with environment mapping/lighting to a variety of different rendered object shapes.

The EMBM method provided by an aspect of the present invention uses a pre-constructed bump-map texture accessed as an indirect texture along with pre-computed object surface normals (i.e., the Normal, Tangent and Binormal vectors) from each vertex of rendered polygons to effectively generate a new perturbed Normal vector per vertex. The new perturbed Normal vectors are then used to look up an environment texture map. For example, the environment texture map may be a spherical reflection map of an environment surrounding a rendered object or a texture map containing lighting or other data for creating more complex surface lighting effects.

The example embodiment provides a specialized texture data/coordinate processing "bump unit" in the graphics pipeline for performing predetermined matrix multiplication operations (e.g., modeling-space to eye-space conversions) on retrieved lookup data from the indirect-texture bump map. The bump unit (e.g., see FIG. 15) uses a programmable 3×2 element multiplication matrix (M) and scaling circuits that also permits rotation of bump-mapped objects about multiple orthogonal axes. The bump unit is also provided with an output storage buffer (530) for reusing computed coordinate data output values in subsequent processing cycles.

In accordance with a further aspect provided by the invention, object surface Normal perturbations for one or more specific surface geometries are modeled in 3D using a pre-computed dXdYdZ bump map stored in memory as a texture prior to running a particular graphics application (i.e., texel values within an individual bump-map specify surface Normal vector offsets per vertex in 3D model space). A texturing pipeline implemented in hardware then performs an environment-mapped bump-mapped dXdYdZ texture lookup. In the disclosed example embodiment, this is implemented using an indirect texture look-up to obtain the dXdYdZ bump map data to compute a perturbed texture coordinate for lookup into, for example, a spherical reflection environment map. At runtime, the graphics application matches an object having a particular surface geometry with the pre-computed dXdYdZ bump-map texture for that geometry and accesses the bump-map as an "indirect" texture.

A programmable 3×2 multiplication matrix can be implemented by bump unit hardware to provide improved versatility when rendering and displaying such dXdYdZ bump-mapped objects. For example, the matrix may be programmably loaded with appropriate transform constants for allowing conversion of texture coordinate components to eye-space or dynamically loaded with texture coordinates for implementing dXdYdZ bump-mapped texturing while rotating an object about two or more orthogonal axes. The dXdYdZ bump-map indirect look-up data is then used along with per vertex Normal-generated texture coordinate components to compute the perturbed texture coordinates for the look-up into an environment map.

Although the dXdYdZ bump-map textures are custom parameterized for individual surface geometries and, consequently, are effectively "tied" to the particular object for which they were designed, this approach to EMBM is advantageous in that processing is very fast, requiring only a single texture coordinate processing stage corresponding to a single shading/color-blending stage. Moreover, in a preferred implementation of the present invention, the bump-mapped objects may be dynamically rotated about at least two orthogonal axes without disruption to the bump-mapped effect on the object surface.

In accordance with another aspect provided by the invention, object surface Normal perturbations are initially modeled with respect to a flat surface, then during application runtime, the Normal perturbations may be mapped to a rendered object surface having a different or arbitrary geometric configuration. A pre-computed bump dSdT map containing partial derivative data is stored in memory as a 2D texture and subsequently accessed as an "indirect" texture. The pre-computed dSdT bump map data may be derived, for example, by forward differencing the data from a conventional paint program 2D or other image. Basically, Normal, Tangent and Binormal vectors, which are specified per vertex as polygon vertex attributes of a modeled 3D object surface, are first rotated (transformed) into viewspace (eye-space/camera-space) and then used along with the precomputed bump map data to compute a perturbed Normal for each vertex. The perturbed Normal is then used to look up a light or environment map. In other words, Binormal- and Tangent-generated texture coordinate components are scaled (multiplied) by the pre-computed partial derivative dSdT bump map data (stored as an indirect texture) and then are combined with Normal vector generated texture coordinate components over several cycles/stages. The resulting computed texture coordinates correspond to an appropriately perturbed Normal vector, which is then used to look-up a light or environment map.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 5 is an example logical flow diagram of the FIG. 4 graphics processor;

FIG. 6 is block diagram illustrating a logical overview of indirect texture processing in accordance with the present invention;

FIGS. 16A and 16B show example texture offset matrices used by processing logic circuit (proc) of FIG. 15;

FIG. 17 is a block diagram illustrating example data field formats of control logic registers for controlling the operations within the processing circuitry of FIG. 15;

FIG. 23 a logical block diagram illustrating a simplified example of bump mapping for the flat surface (dSdT) embodiment;

FIGS. 28 and 29 show example alternative compatible implementations.

DETAILED DESCRIPTION OF EXAMPLE EMBODIMENTS OF THE INVENTION

Figure 1:
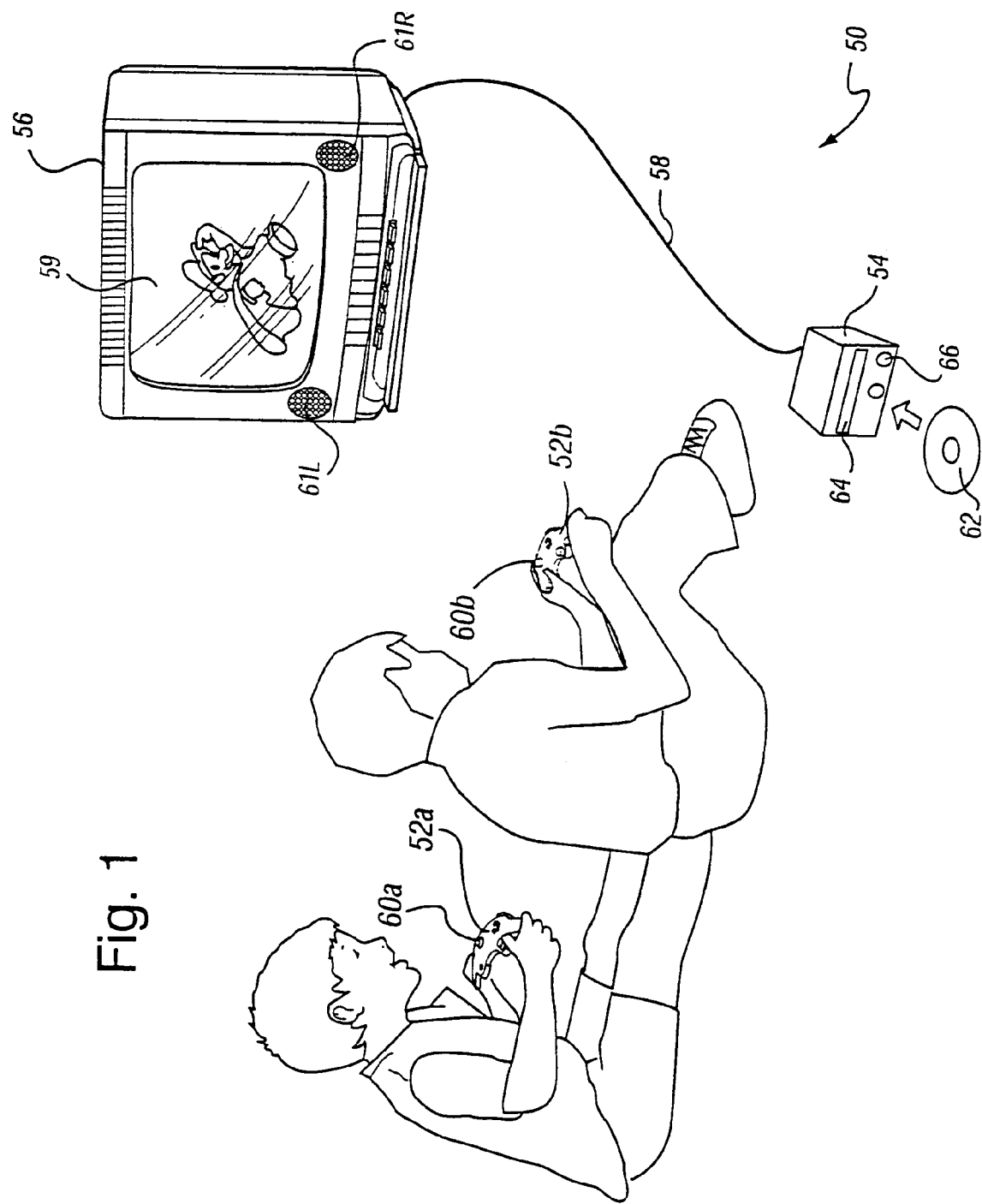
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
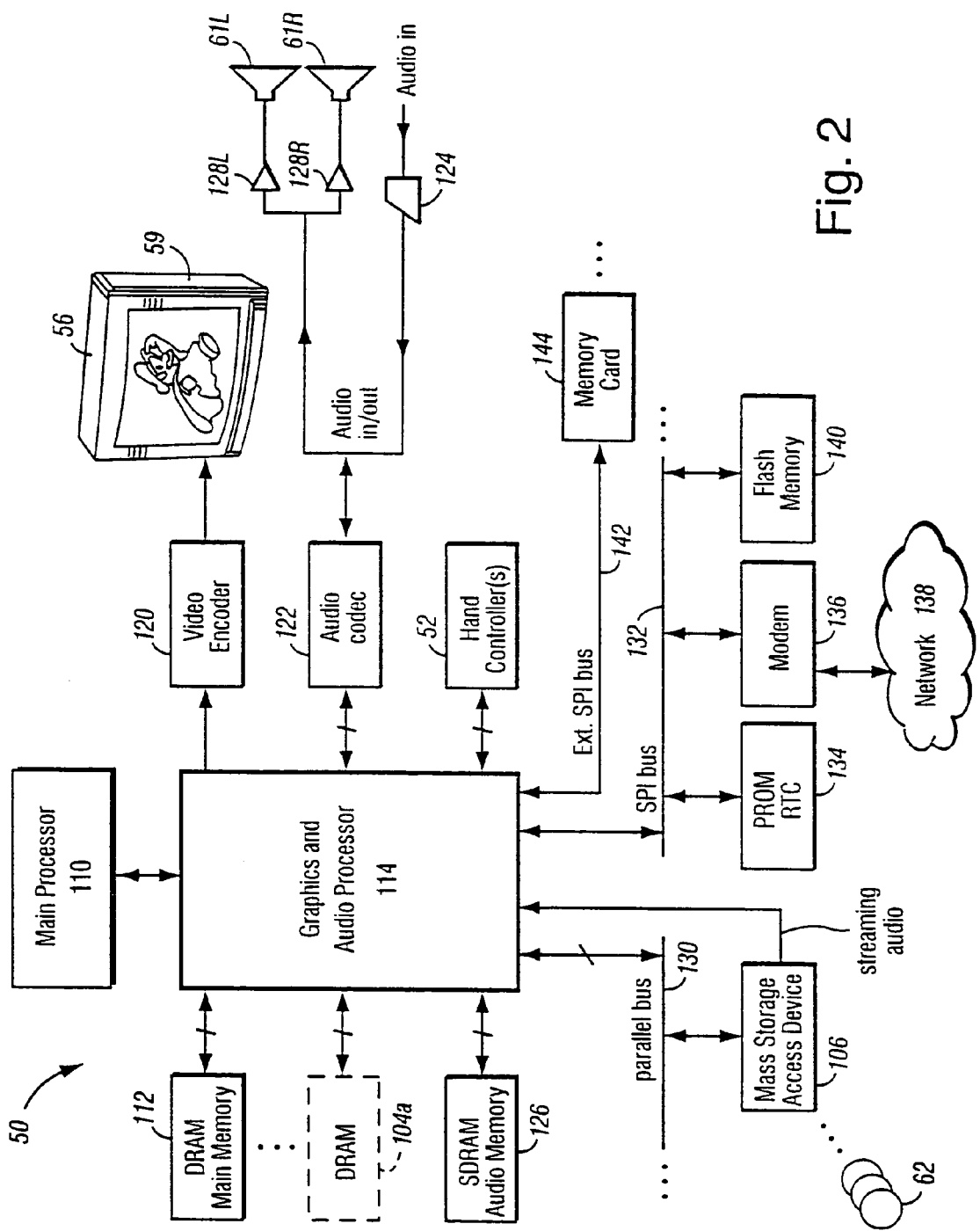
FIG. 2 is a block diagram of the FIG. 1 example computer graphics system.

FIG. 2 shows a block diagram of example components of system 50. The primary components include:
  a main processor (CPU) 110,
  a main memory 112, and
  a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
  a programmable read-only memory and/or real time clock 134,
  a modem 136 or other networking interface (which may in turn connect system 50 to a telecommunications network 138 such as the Internet or other digital network from/to which program instructions and/or data can be downloaded or uploaded), and
  flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
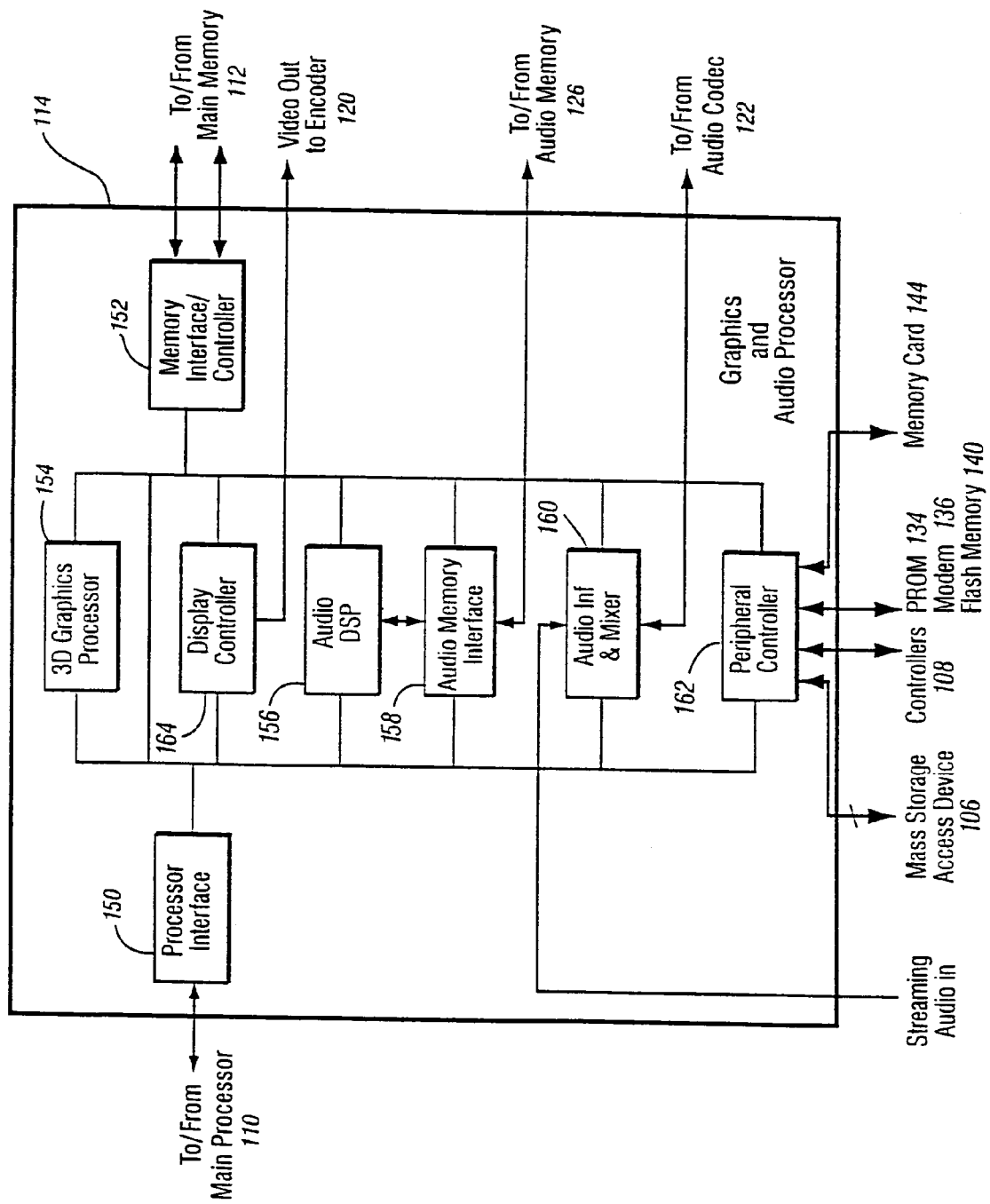
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:
  a processor interface 150,
  a memory interface/controller 152,
  a 3D graphics processor 154,
  an audio digital signal processor (DSP) 156,
  an audio memory interface 158,
  an audio interface and mixer 160,
  a peripheral controller 162, and
  a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
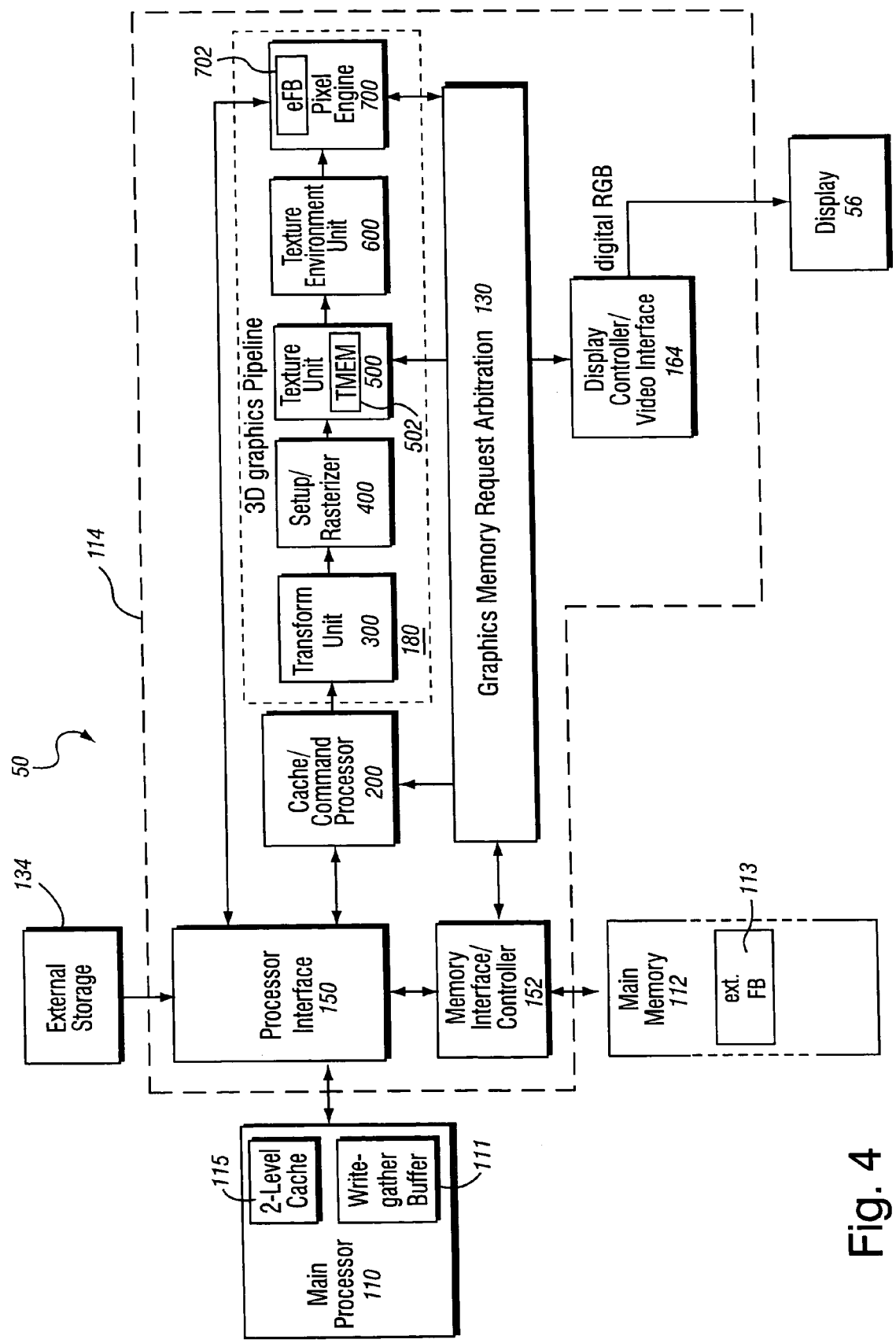
FIG. 4 is a block diagram of the example 3D graphics processor shown in FIG. 3.
Figure 7A:
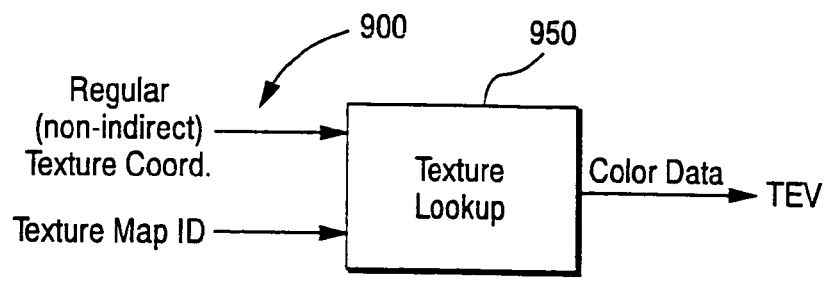
FIG. 7A is a functional block diagram illustrating a simple basic example of a regular (non-indirect) texture lookup.
Figure 7B:
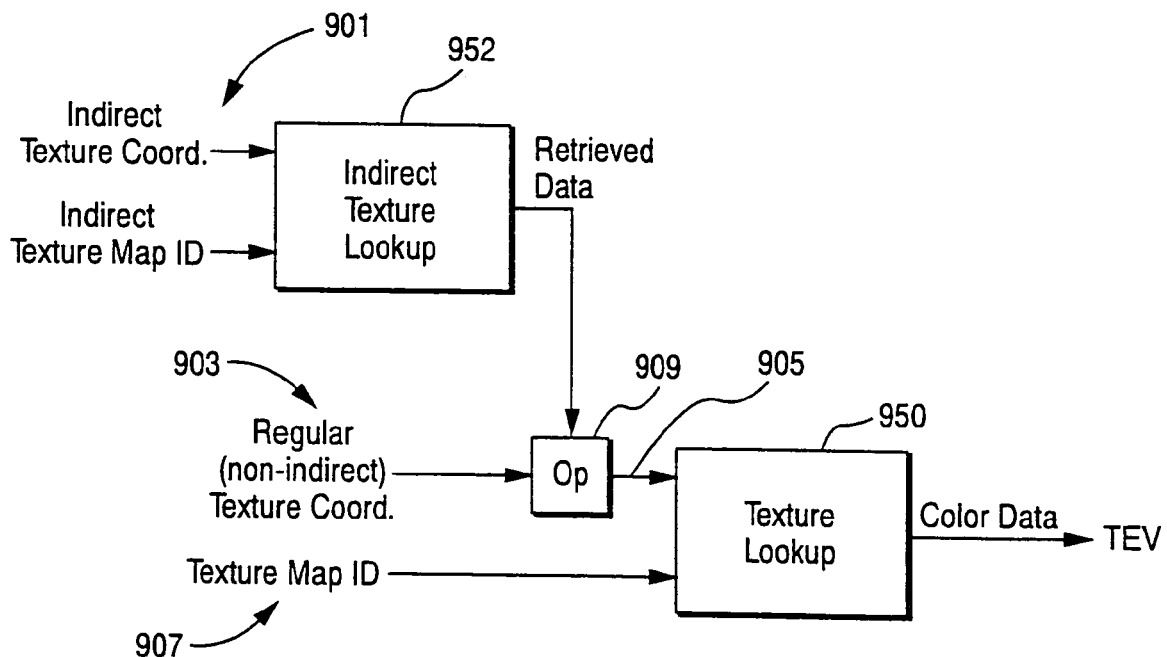
FIG. 7B is a functional block diagram illustrating a simple basic example of an indirect texture lookup in accordance with the present invention.
Figure 8:
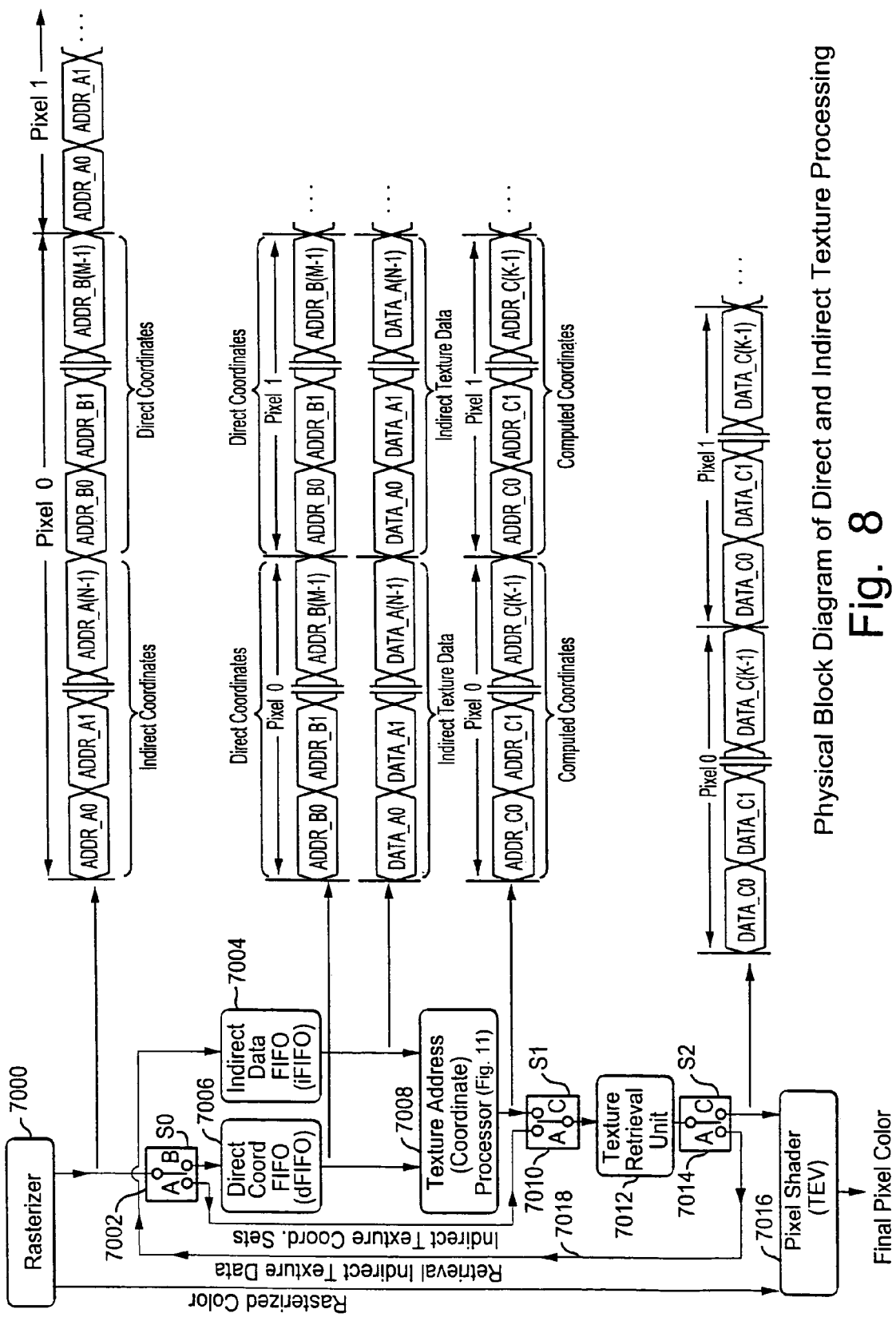
FIG. 8 is a block diagram illustrating an overview of an example physical configuration for indirect texture processing in accordance with the present invention.
Figure 9:
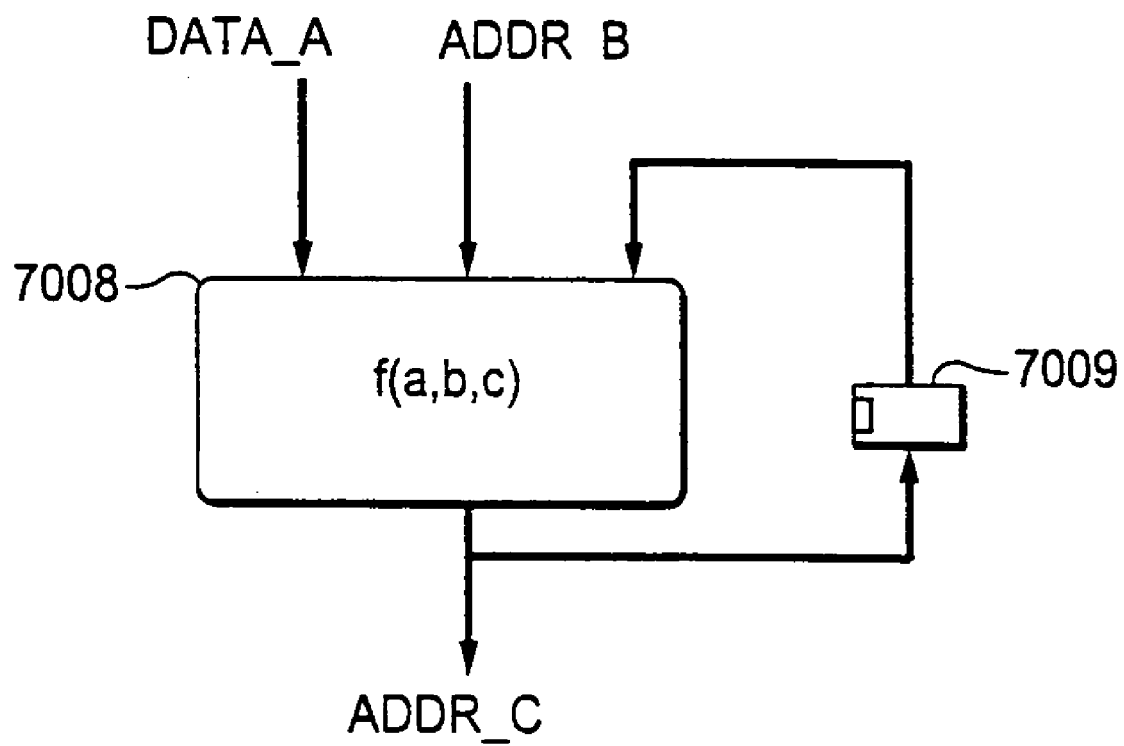
FIG. 9 is a block diagram illustrating a logical overview of the texture address (coordinate/data) processor operation.
Figure 10A:
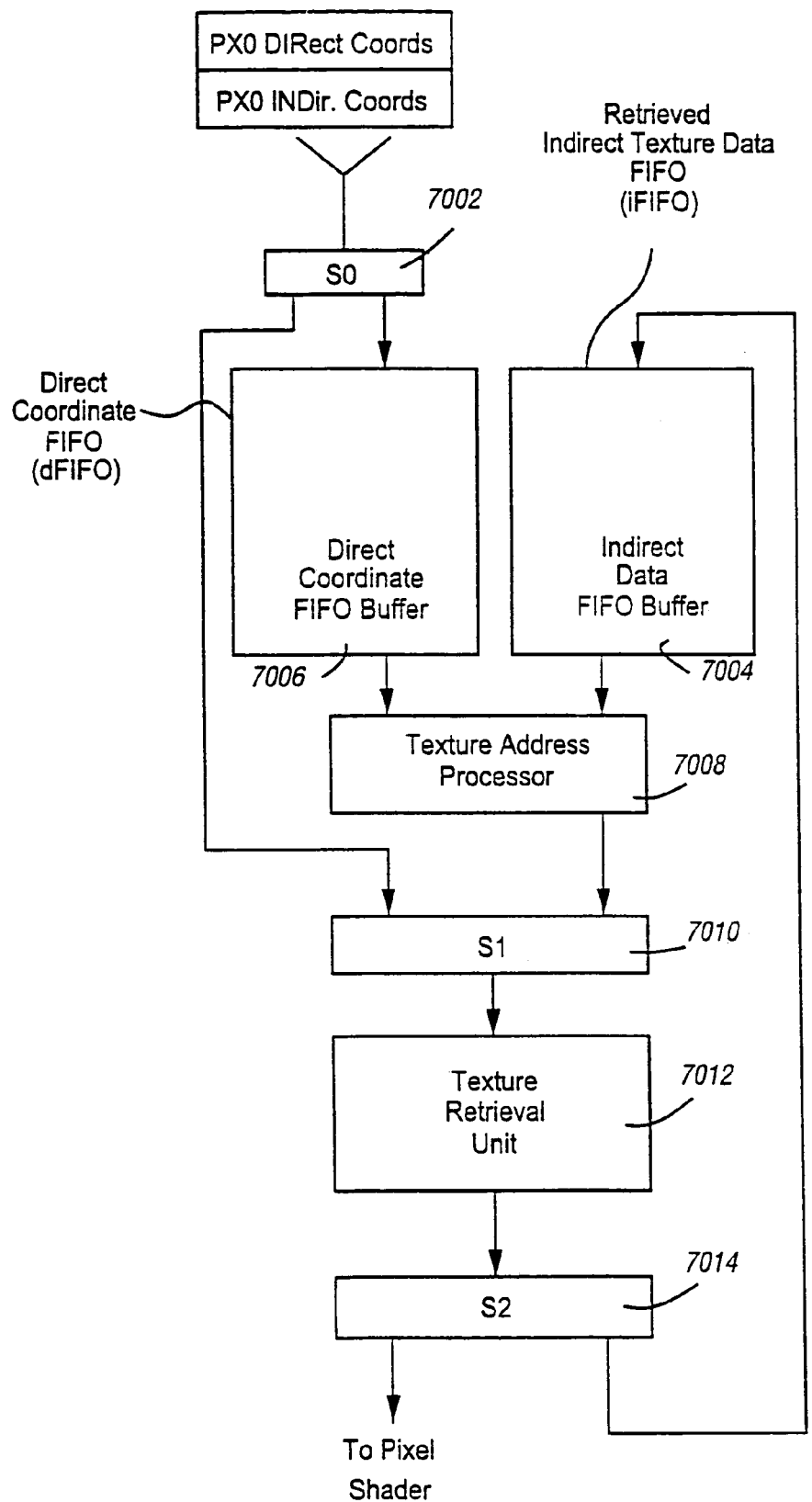
FIGS. 10A–10K are a series of block diagrams illustrating the relative progression of pixel direct coordinate data and pixel indirect texture data in the example texturing pipeline implementation as a result of interleaved direct and indirect texture processing.
Figure 10B:
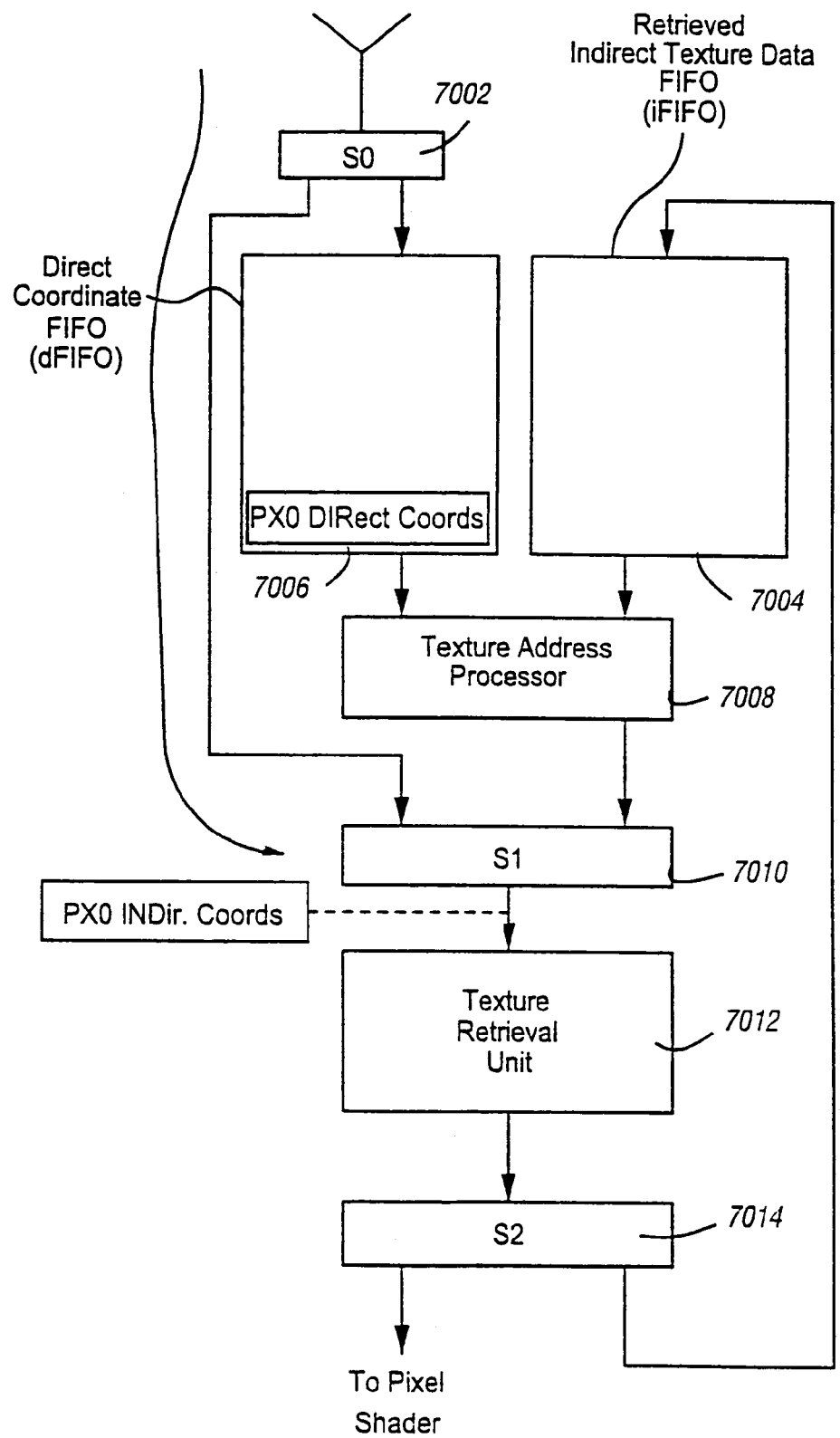
Figure 10C:
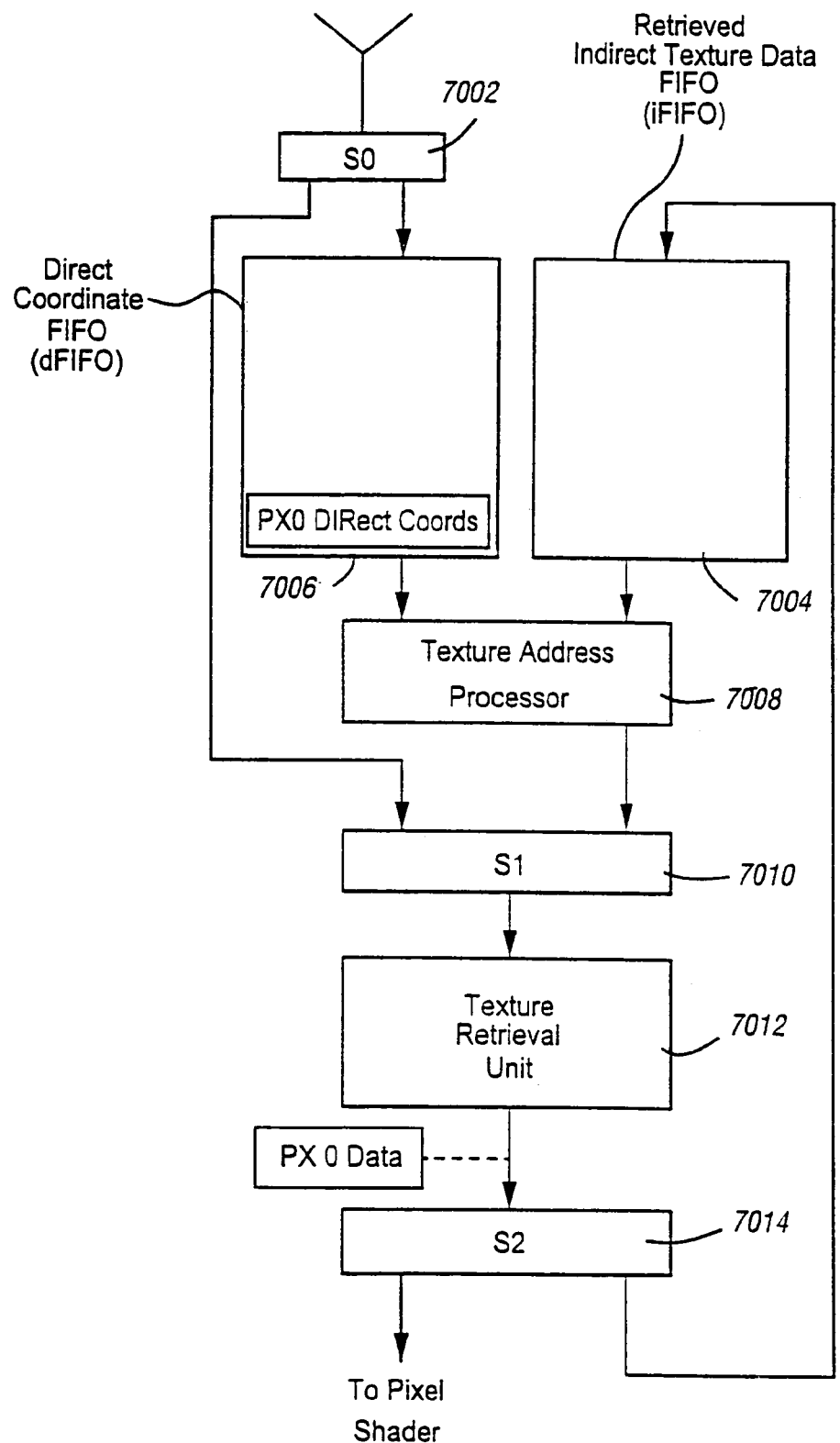
Figure 10D:
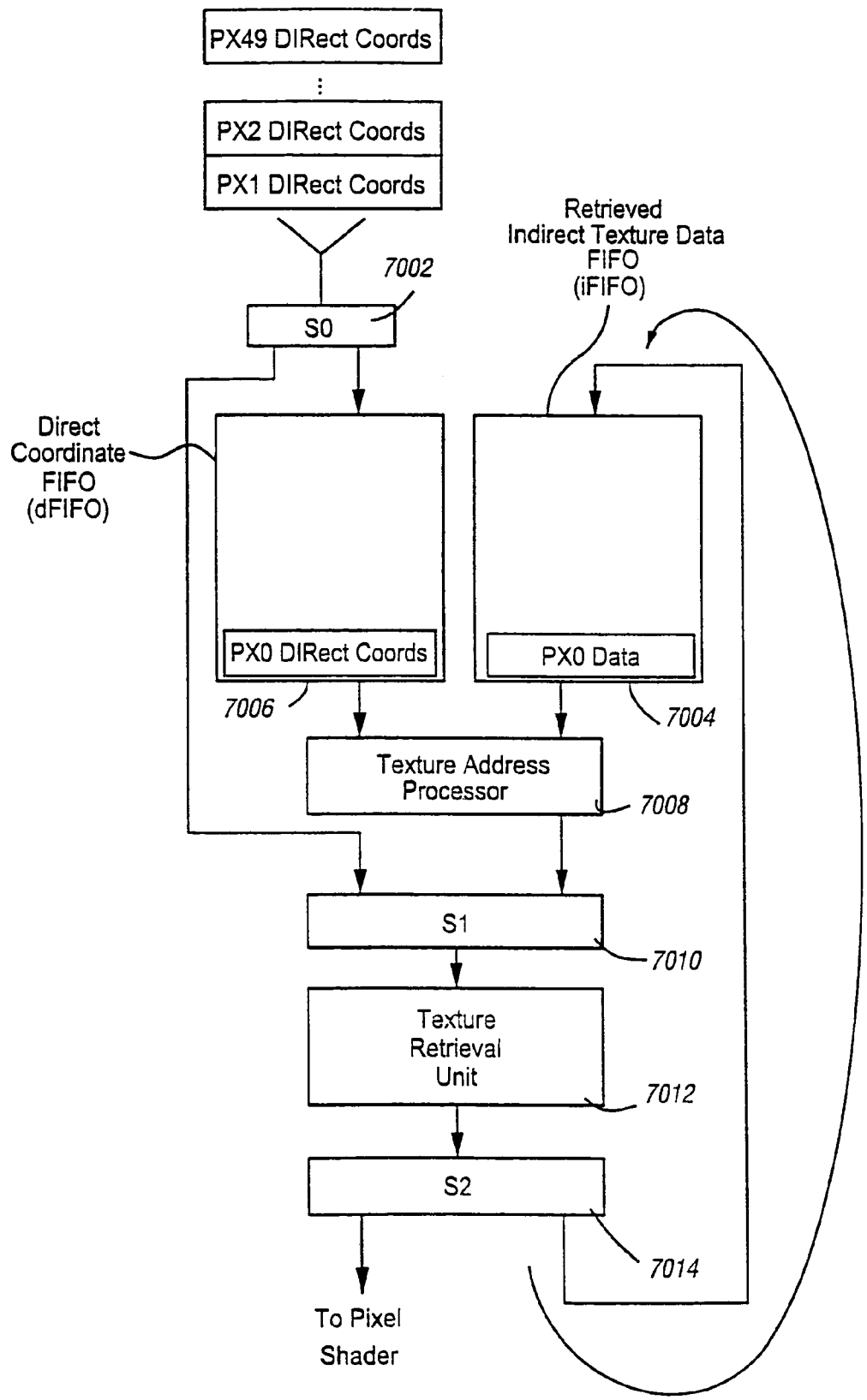
Figure 10E:
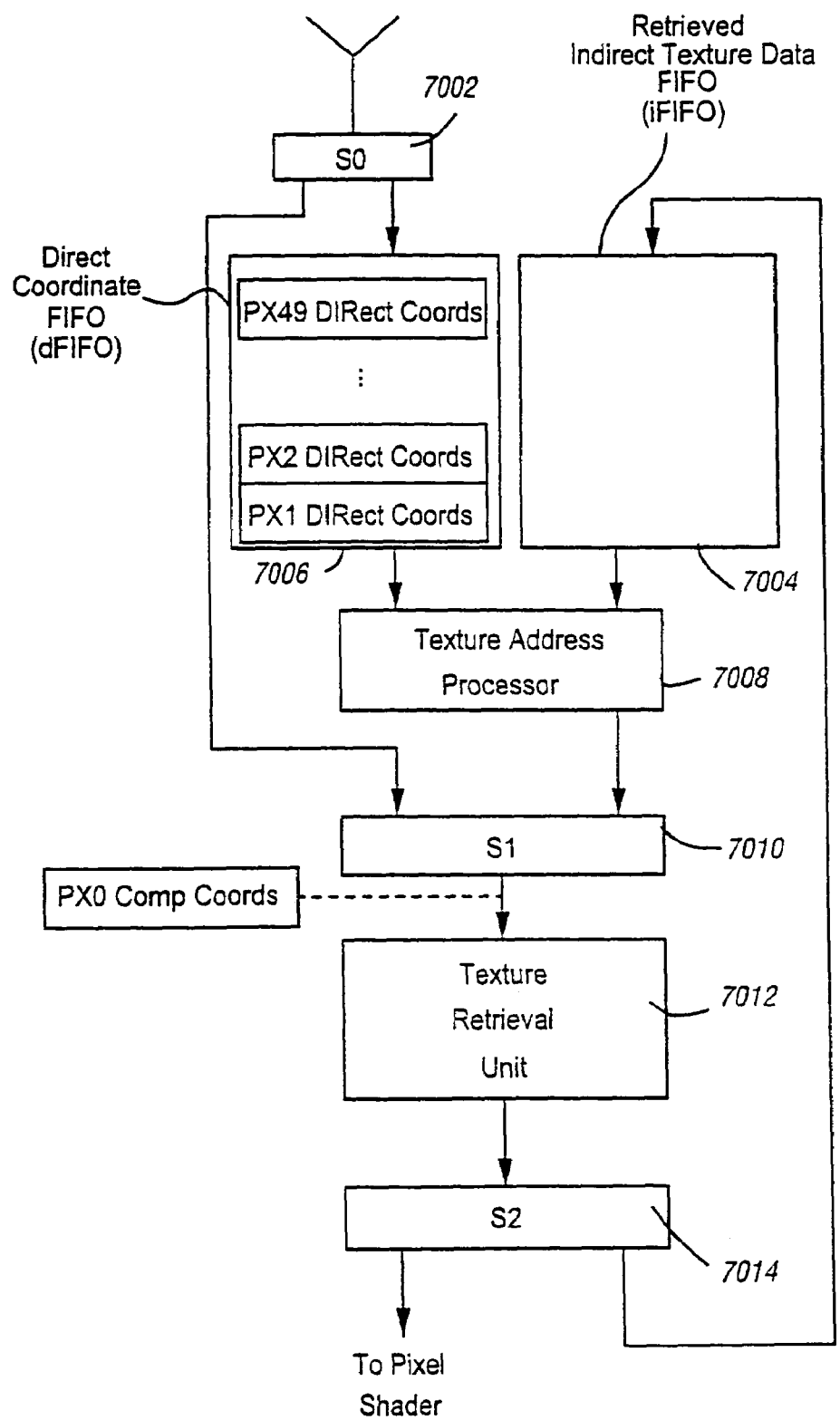
Figure 10F:
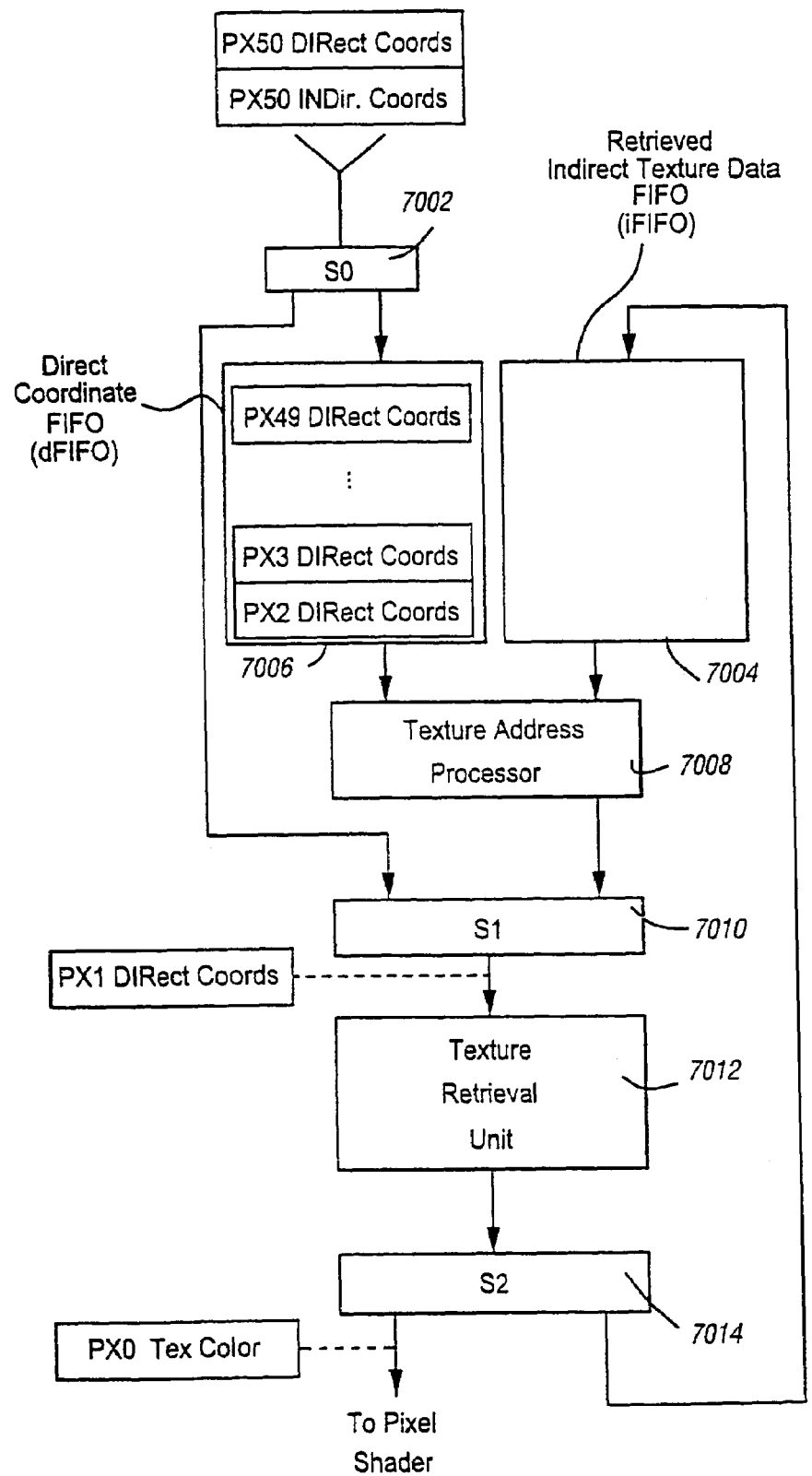
Figure 10G:
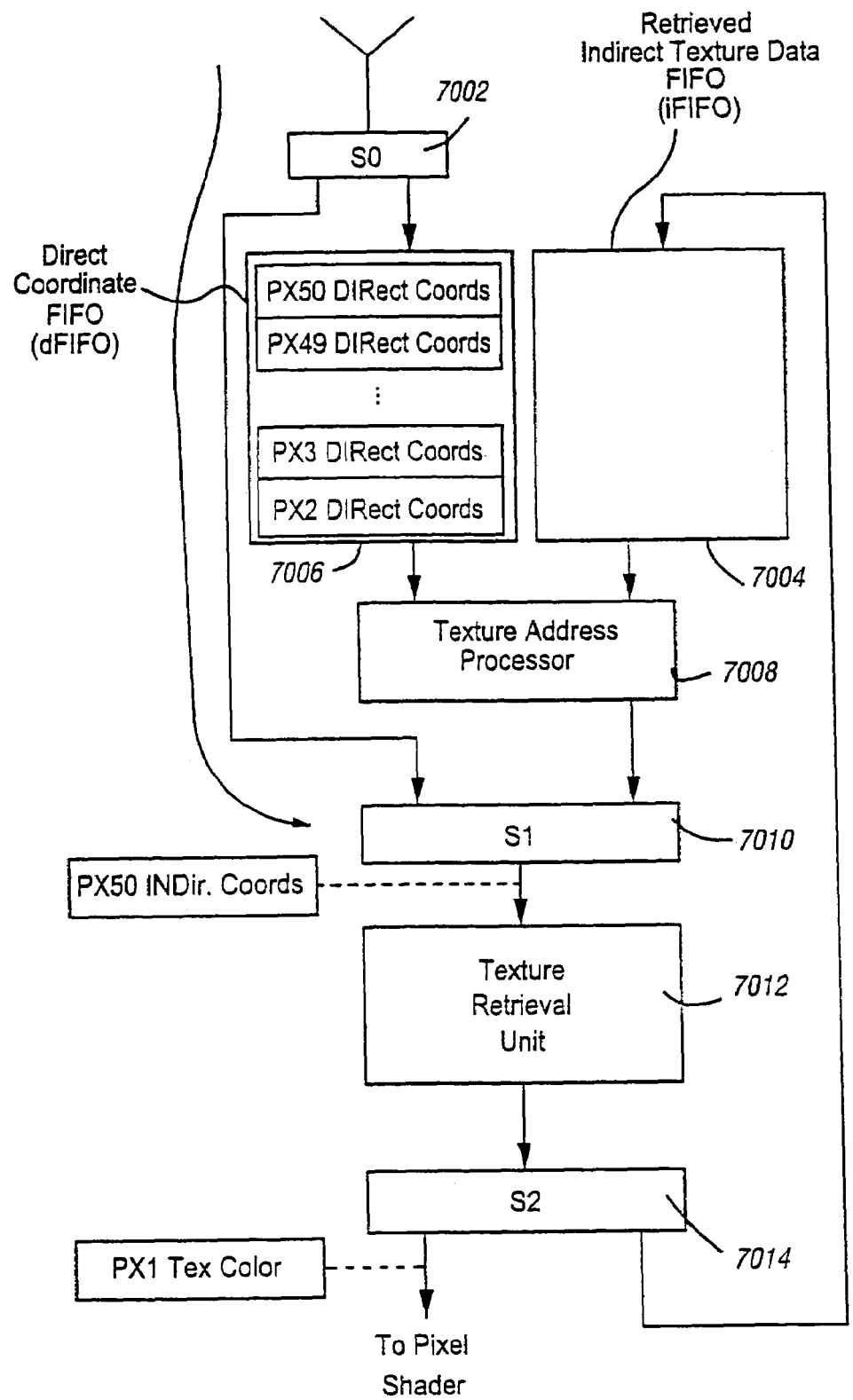
Figure 10H:
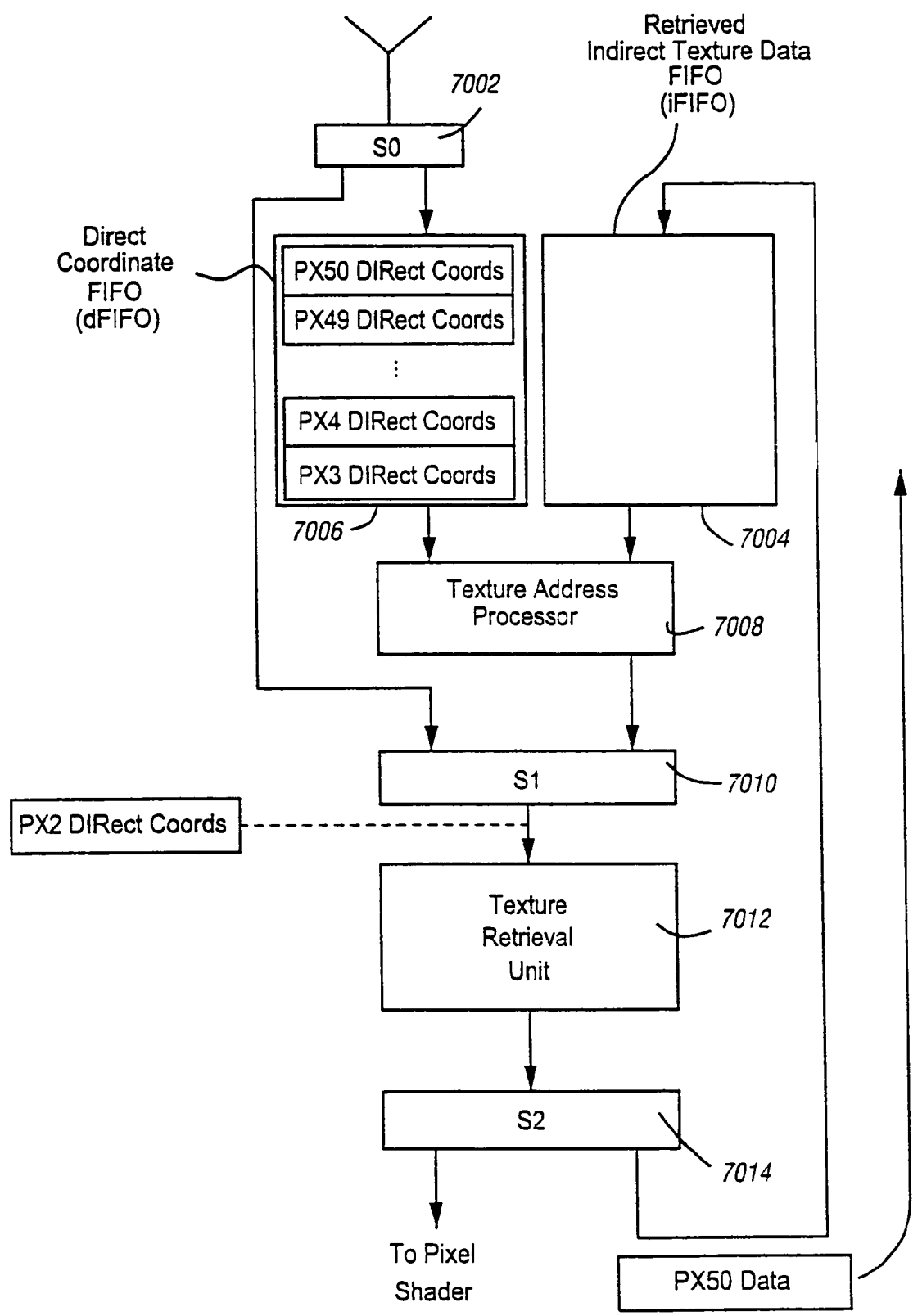
Figure 10I:
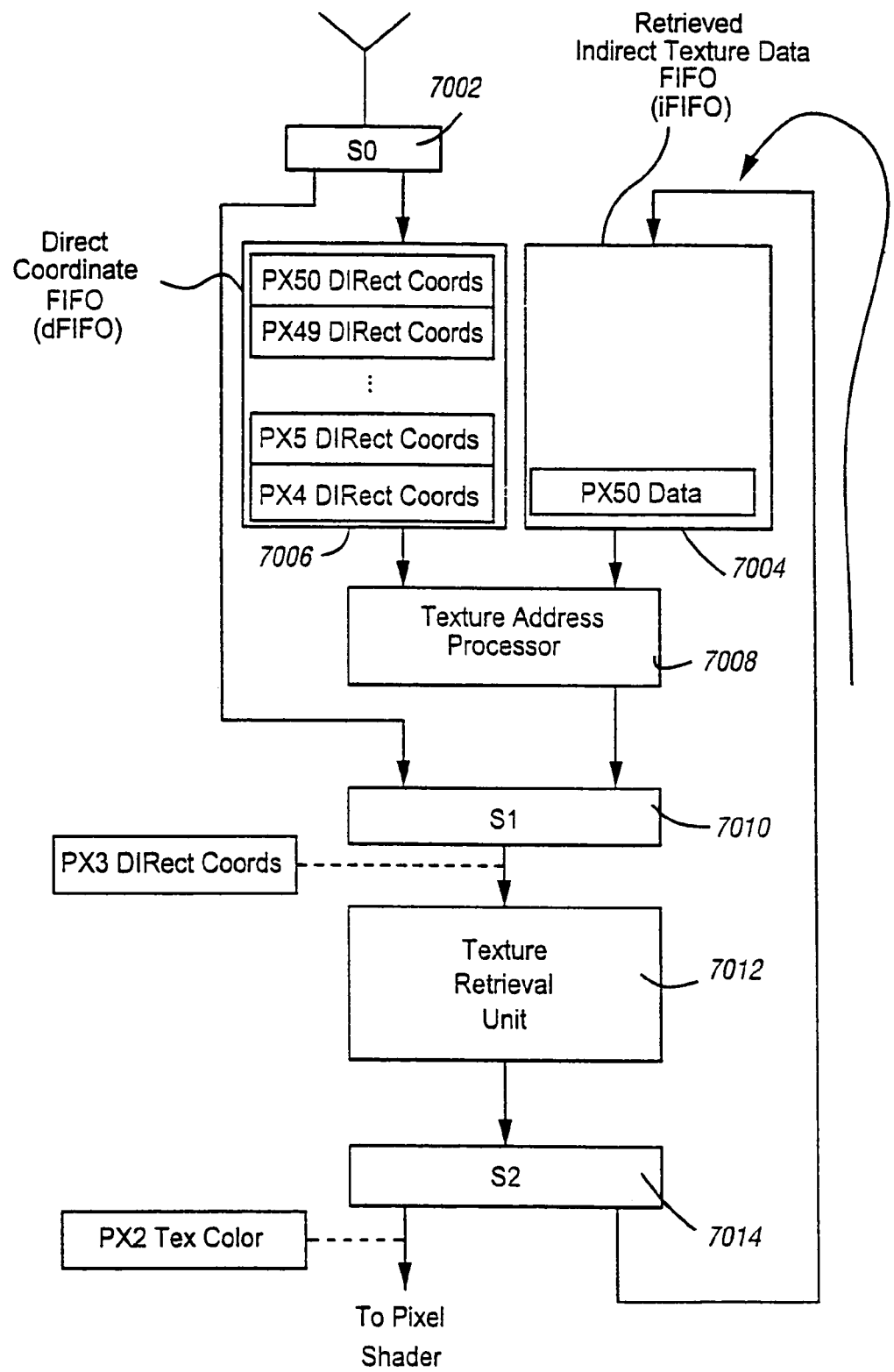
Figure 10J:
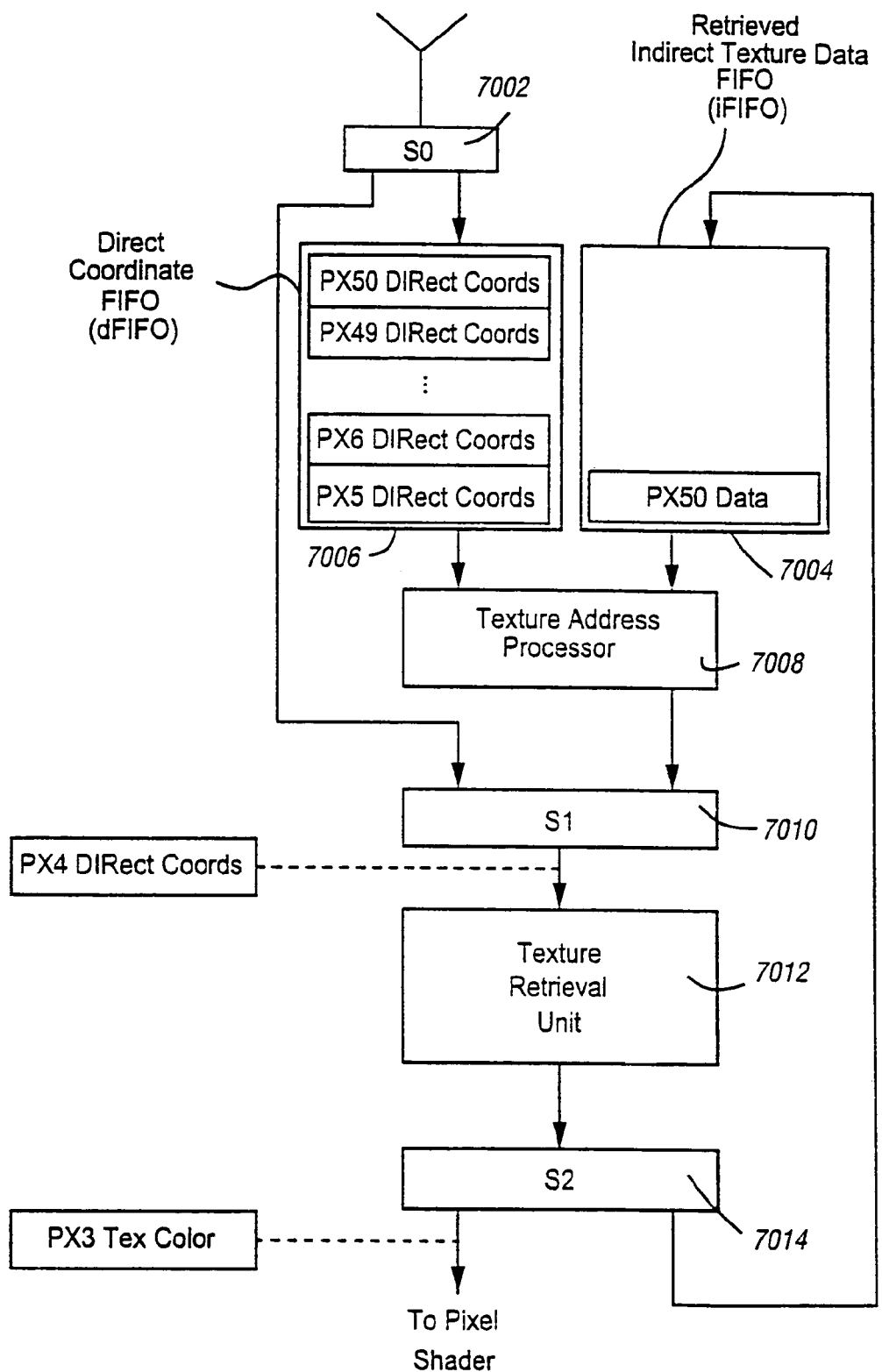
Figure 10K:
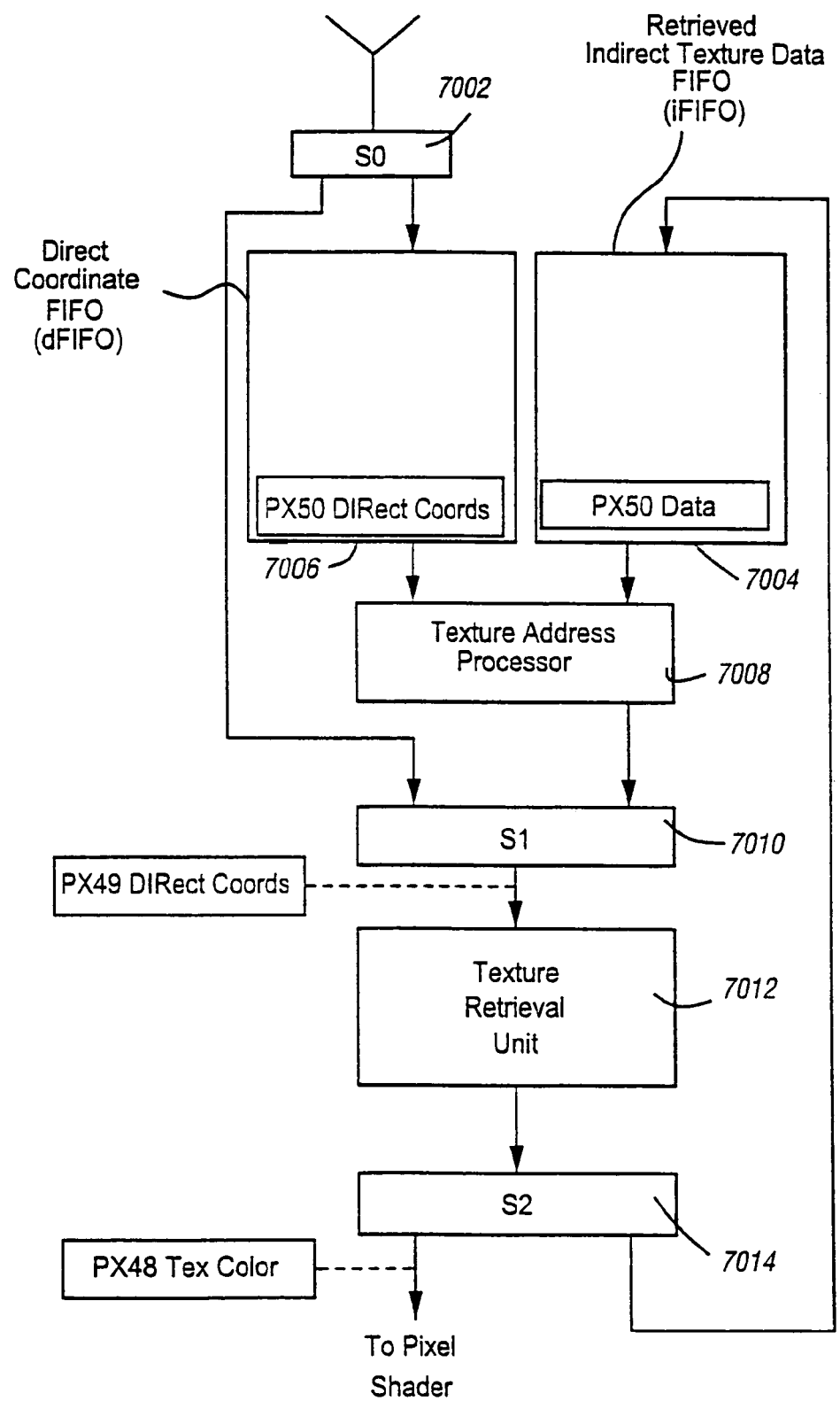
Figure 11:
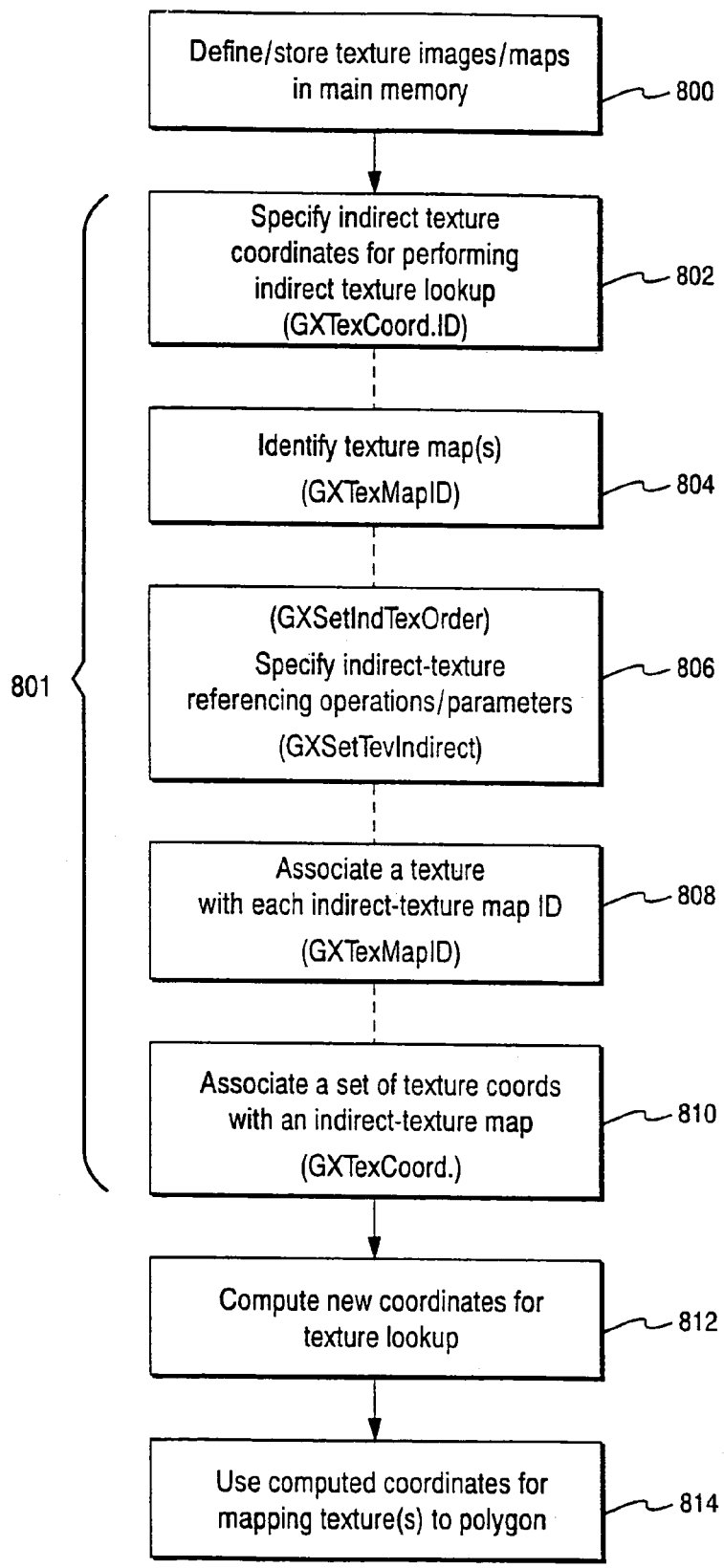
FIG. 11 is a flow chart illustrating example steps for implementing indirect texture processing in accordance with the present invention.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200*a* that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

a transform unit 300, a setup/rasterizer 400, a texture unit 500, a texture environment unit 600, and a pixel engine 700.

Transform unit 300 performs a variety of 2D and 3D transform and other operations 300*a* (see FIG. 5). Transform unit 300 may include one or more matrix memories 300*b* for storing matrices used in transformation processing 300*a*. Transform unit 300 transforms incoming geometry per vertex from object space to screen space; and transforms incoming texture coordinates and computes projective texture coordinates (300*c*). Transform unit 300 may also perform polygon clipping/culling 300*d*. Lighting processing 300*e* also performed by transform unit 300*b* provides per vertex lighting computations for up to eight independent lights in one example embodiment. Transform unit 300 can also perform texture coordinate generation (300*c*) for embossed type bump mapping effects, as well as polygon clipping/culling operations (300*d*).

Setup/rasterizer 400 includes a setup unit which receives vertex data from transform unit 300 and sends triangle setup information to one or more rasterizer units (400*b*) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500*a*) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500*b*), and indirect texture processing (500*c*).

FIGS. 6 through 17 illustrate example texture processing for performing regular (non-indirect) and indirect texture lookup operations. A more detailed description of the example graphics pipeline circuitry and procedures for performing regular and indirect texture look-up operations is disclosed in commonly assigned co-pending patent application Ser. No. 09/722,382, entitled "Method And Apparatus For Direct And Indirect Texture Processing In A Graphics System" and its corresponding provisional application Ser. No. 60/226,891, filed Aug. 23, 2000, both of which are incorporated herein by reference.

Texture unit 500 outputs filtered texture values to the texture environment unit 600 for texture environment processing (600*a*). Texture environment unit 600 blends polygon and texture color/alpha/depth, and can also perform texture fog processing (600*b*) to achieve inverse range based fog effects. Texture environment unit 600 can provide multiple stages to perform a variety of other interesting environment-related functions based for example on color/alpha modulation, embossing, detail texturing, texture swapping, clamping, and depth blending. Texture environment unit 600 can also combine (e.g., subtract) textures in hardware in one pass. For more details concerning the texture environment unit 600, see commonly assigned application Ser. No. 09/722,367 entitled "Recirculating Shade Tree Blender for a Graphics System" and its corresponding provisional application Ser. No. 60/226,888, filed Aug. 23, 2000, both of which are incorporated herein by reference.

Pixel engine 700 performs depth (z) compare (700*a*) and pixel blending (700*b*). In this example, pixel engine 700 stores data into an embedded (on-chip) frame buffer memory 702. Graphics pipeline 180 may include one or more embedded DRAM memories 702 to store frame buffer and/or texture information locally. Z compares 700*a'* can also be performed at an earlier stage in the graphics pipeline 180 depending on the rendering mode currently in effect (e.g., z compares can be performed earlier if alpha blending is not required). The pixel engine 700 includes a copy operation 700*c* that periodically writes on-chip frame buffer 702 to main memory 112 for access by display/video interface unit 164. This copy operation 700*c* can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Example Environment-Mapped Bump Mapping Procedures

Figure 18:
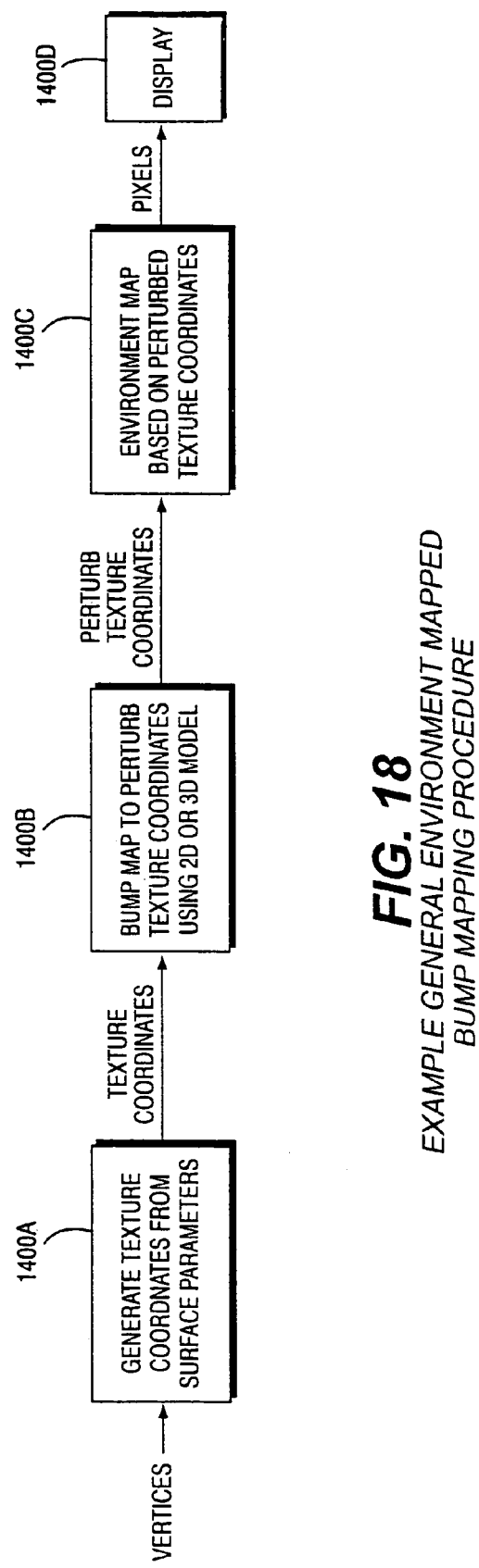
FIG. 18 shows an example environment mapped bump mapping process.

FIG. 18 shows an example general environment mapped bump-mapping procedure. At a high level of abstraction, the preferred implementation of the environment-mapped bump mapping procedure of the present invention generates texture coordinates from surface parameters such as the surface Normal and binormals (e.g., Normal and/or Tangent and Binormal vectors) (Block 1400A). These surface parameters can be provided by transform unit 300 based on lighting calculations or by main processor 110, for example.

Texture coordinates are generated based on the surface parameters, and an indirect bump map texture is used to offset (perturb) the resulting texture coordinates (block 1400B). The perturbed texture coordinates are then used to look up an environment texture map (block 1400C). The environment texture map may contain complicated lighting effects, or it may be, for example, a spherical reflection map of the environment or any other desired environment map or maps. The resulting image may then be further processed and displayed (block 1400D).

Environment-mapped bump mapping (EMBM) in accordance with the present invention is accomplished in a preferred implementation through the use of indirect texture processing as described in the above reference copending patent application. This allows multiple texture lookups in a single rendering pass using low cost hardware.

There are at least two ways to model surface perturbations in a bump map in the example described above. One way is to use a three-dimensional model (e.g., a sphere, toroid, etc.) that matches (or closely approximates) the surface geometry of the 3D object being mapped. In this approach, a bump map of the three-dimensional model of the object describes height differences in three dimensions (x, y, z) relative to the surface being mapped. These differences in three dimensions (which may be represented by partial derivatives in each of the three coordinates corresponding to s, t, u texture coordinates) can be converted into eye space, translated (e.g., in the case of object rotation)—and then used to perturb texture coordinates generated in the conventional fashion from a surface Normal to provide new texture coordinates for Gouraud-shaded bump mapping.

Another way is to model surface perturbations in a bump map is to use a two-dimensional (i.e., flat surface) model. In this approach, the model need not correspond precisely to the surface geometry of the 3D object being mapped. A bump map of the two-dimensional model can describe height differences in two dimensions (x, y) relative to the surface being mapped. These height differences in two dimensions, which can be represented by partial derivatives in x and y, may be stored in a texture memory as partial derivatives (dSdT) and accessed using s and t texture coordinates. These partial derivatives may then be used to scale texture mapping coordinates generated from the surface binormals (i.e., the Tangent and Binormal vectors) and those values and the texture coordinates generated from the surface Normal vector are combined to produce perturbed Normal vector texture coordinates for Gouraud-shaded bump mapping.

In the first example implementation, Normal vector perturbations are modeled in 3D (dXdYdZ) with respect to a particular geometric shape (e.g., sphere, toroid, etc.) and, during application program run-time, are matched to corresponding similar geometric surfaces and transformed into eye-space. This method has the advantage that it renders bump-mapped images very quickly because it requires few coordinate processing stages to compute. In the second example implementation, perturbations of the Normal are modeled with respect to a flat surface (dSdT) and during run time may be mapped onto arbitrary object surfaces. This second method of implementation is more versatile but requires more coordinate processing stages and additional binormal surface vector information to calculate the perturbed Normal texture coordinates (see, for example, the above referenced copending application regarding coordinate processing and TEV stages for performing indirect texture referencing operations).

Figure 19:
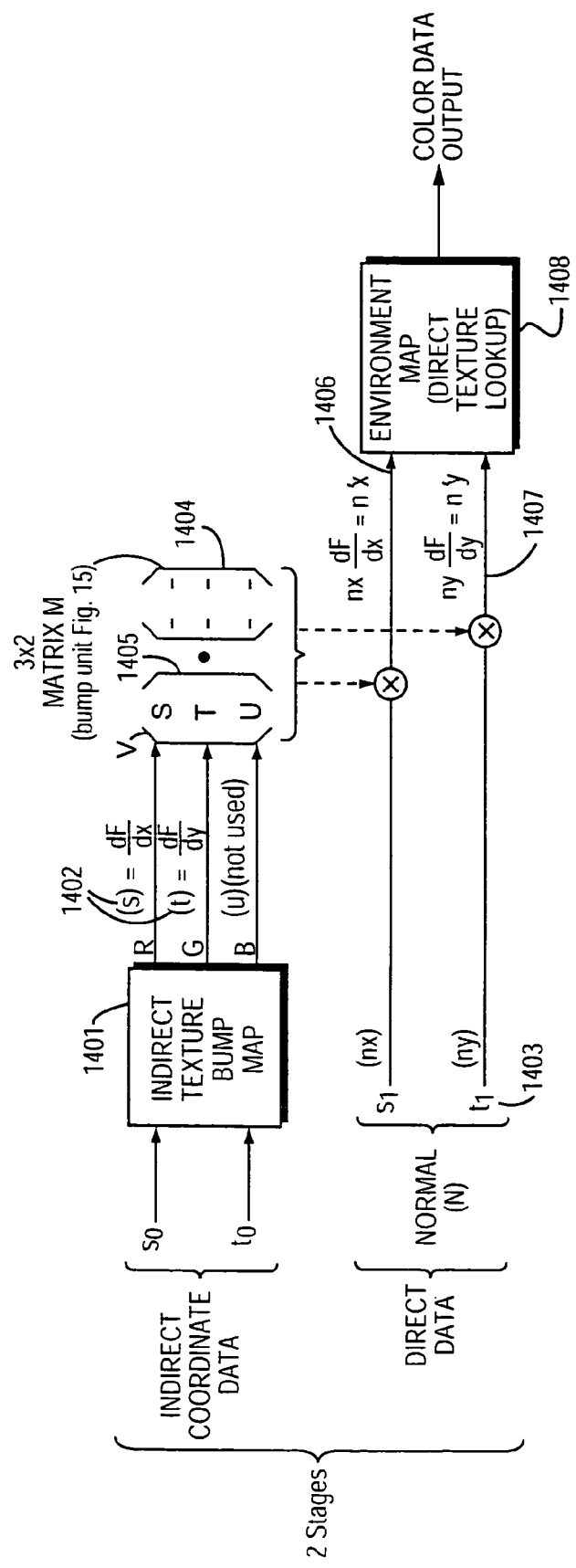
FIG. 19 is a logical block diagram illustrating an example process of environment-mapped bump mapping using Normal vector perturbations modeled in 3D (dXdYdZ)

Environment-Mapped Bump-Mapping Based on Perturbations Modeled in 3D (dXdYdZ):

FIG. 19 shows a logical block diagram illustrating an example process of environment-mapped bump mapping using Normal vector perturbations modeled in 3D (dXdYdZ). In one preferred example embodiment, environment mapping can be performed using a spherical reflection map. The environment-mapped bump-mapped dXdYdZ texture lookup that is performed is analogous to a perturbed Normal lookup into a spherical reflection map. (As an "indirect" operation, this is analogous to a texture warp operation using signed offsets.) Normal vector perturbations for environment mapped bump mapping are computed on a per-vertex basis. In this example, the indirect bump map 1401 contains precomputed Normal vector offsets in 3D model space (i.e., object space). A surface Normal vector at a vertex is initially rotated (i.e., converted) to eye-space. Texture coordinate data generated from the x and y eye-space components of the converted Normal vector are then scaled (multiplied) by offsets (i.e., partial derivative data dF/dx, dF/dy) obtained from the dXdYdZ bump map texture to generate a new set of Normal texture coordinates (i.e., perturbated texture coordinates n'x and n'y) for performing a texture lookup to an environment or light map.

Figure 15:
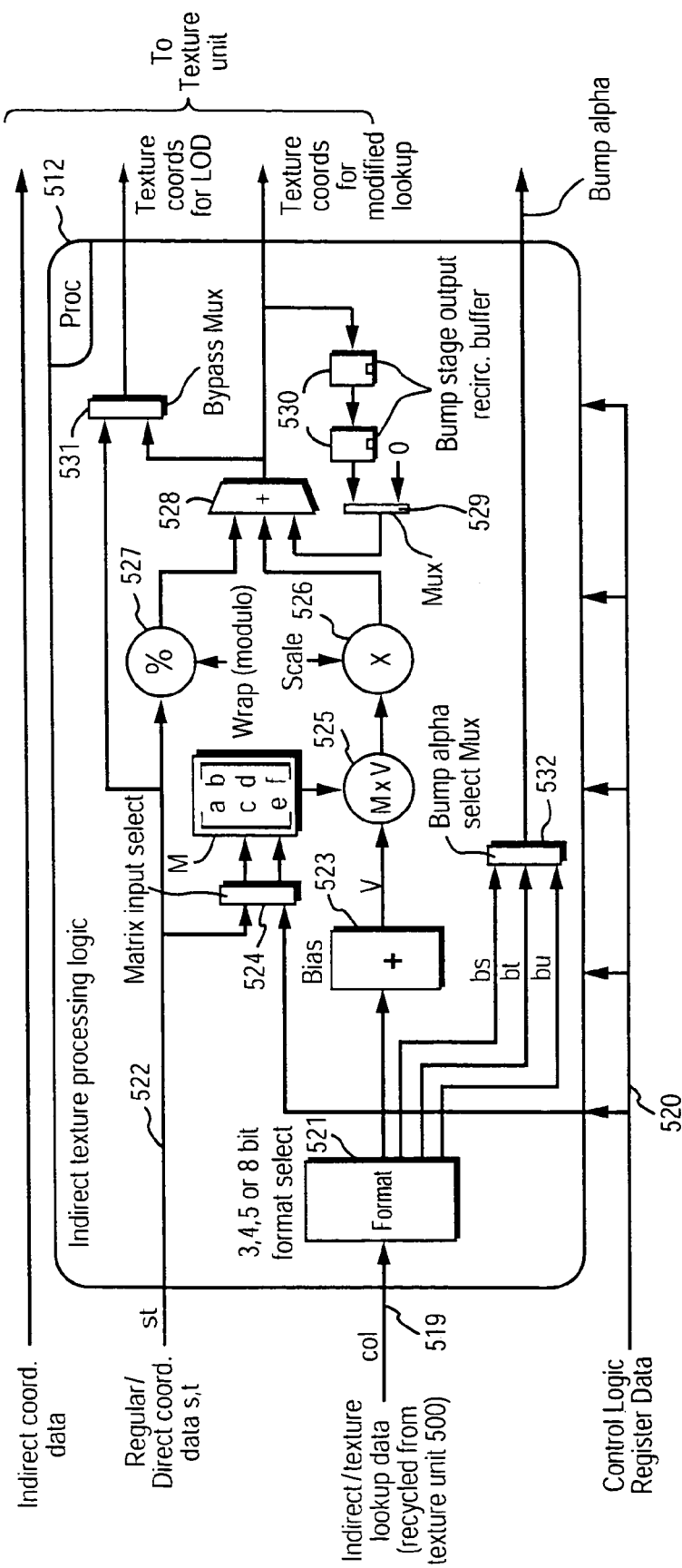
FIG. 15 is a block diagram showing a detailed example of the indirect texture lookup data/coordinate processing logic (proc) shown in FIG. 14.

As indicated in the logical diagram of FIG. 19, an indirect texture lookup operation is performed using indirect coordinate $s_0$, to and direct texture look-up is performed using coordinates $s_1$, $t_1$. As a result of the indirect texture look-up, offset data s, t and u (1402) is retrieved from the dXdYdZ bump map 1401 via, for example, the multi-bit R, G and B color channel lines over col bus 519 (FIG. 15). In this example, only the s and t offset data, corresponding to the partial derivatives dF/dx and dF/dy of the bump function F, is used in computing the perturbed normal component texture coordinates. During the next coordinate processing cycle/stage, texture coordinate input values $s_1$, $t_1$ (1403), generated from surface Normal vector components (i.e., nx and ny), are scaled (multiplied) by the retrieved s and t offset data 1402. For this example, the nx and ny ($s_1$ and $t_1$) input data is provided in the same manner as regular (non-indirect coordinates) to the bump processing unit 512 and is loaded into matrix M (1404) for multiplication by partial derivative offset data V (1405) from the indirect texture lookup. The resulting scaled coordinate products, n'x (1406) and n'y (1407), provide the effect of a perturbed normal and are used to perform an environment map lookup 1408. For the above example implementation, the 3×2 matrix M in bump processing unit 512 (FIG. 15) may be loaded with the appropriate matrix elements for effecting a transform from model space to eye-space and, if desired, rotation of the bump-mapped object about any of plural axes. The application program should set up a Normal-based-texture coordinate generation (i.e., an API texgen function) for the regular (non-indirect) coordinates $s_1$ and $t_1$.

Figure 20:
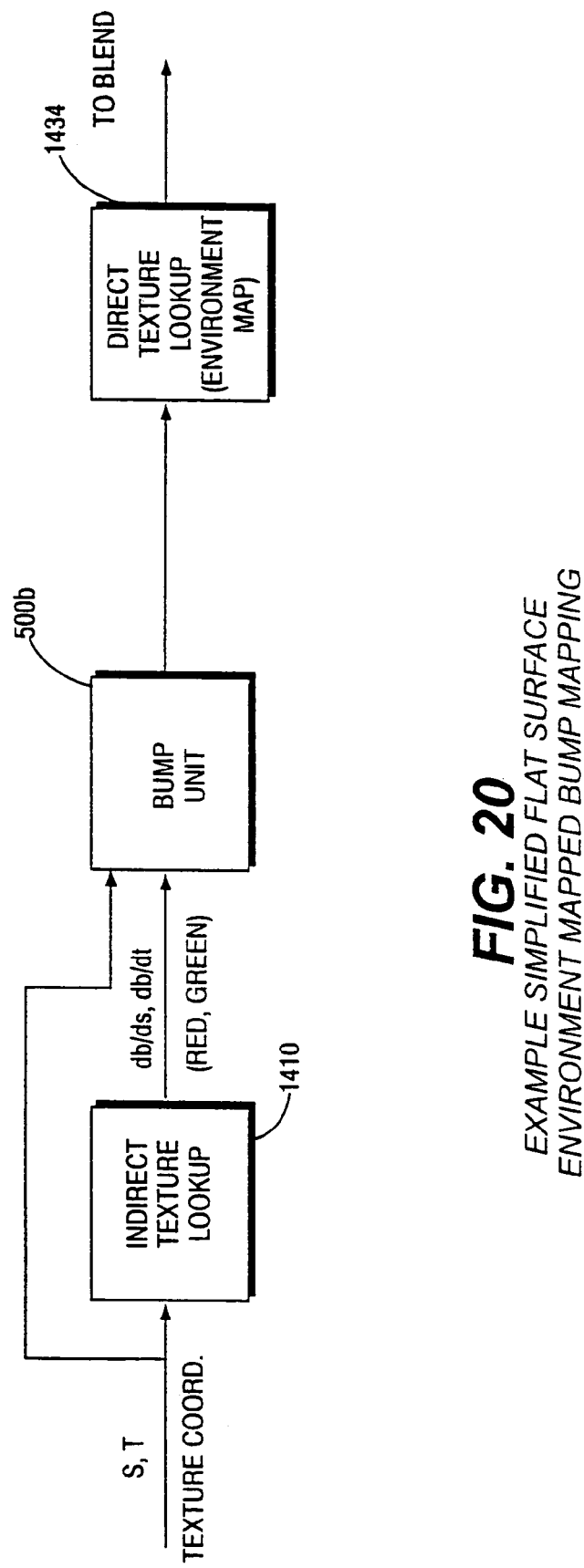
FIG. 20 is a simplified flat surface environment mapped bump mapping.
Figure 22:
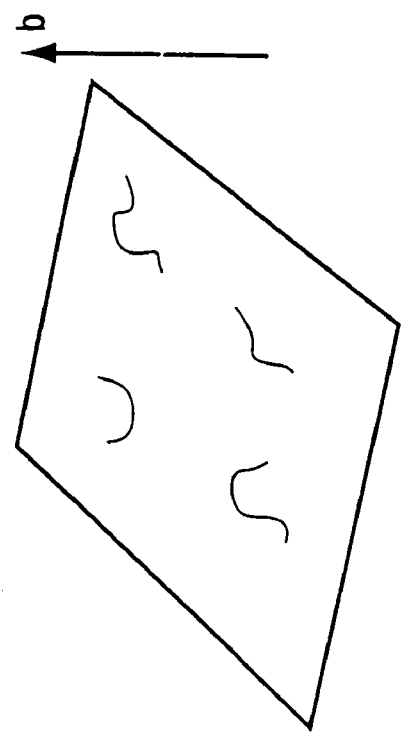
FIG. 22 shows an example flat surface bump map.
Figure 21:
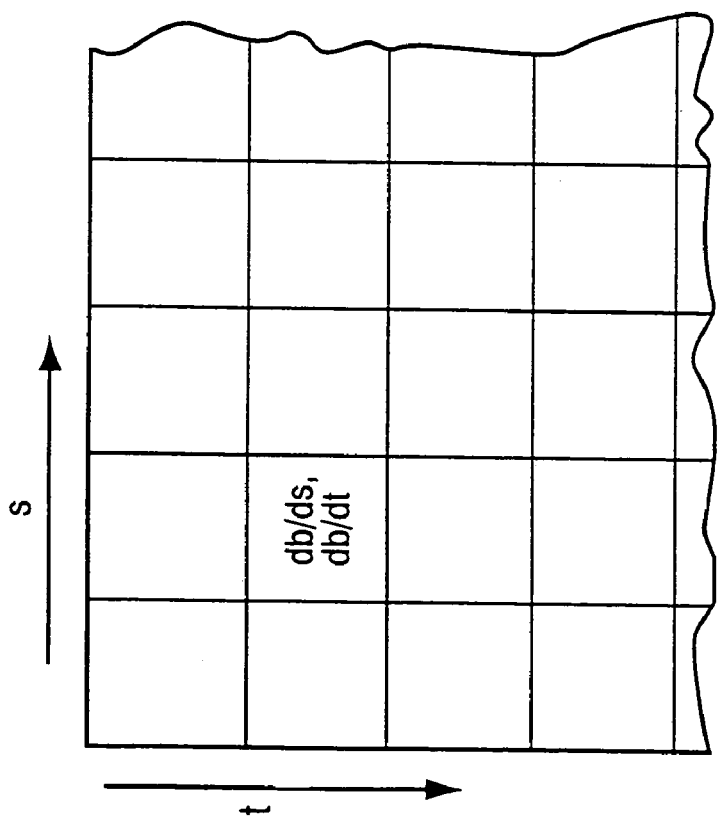
FIG. 21 shows an example flat surface bump map texture.

Environment-Mapped Bump-Mapping Based on Perturbations Modeled with Respect to a Flat Surface (dSdT):

FIG. 20 shows an example simplified flat surface environment mapped bump mapping operation. In this example, texture coordinates s and t, corresponding to a position on the surface being mapped are used to perform an indirect texture lookup 1410. The indirect texture specifies db/ds, db/dt partial derivatives representing height differences defined by a bump map function. These partial derivatives may be outputted by texture unit 500 via, for example, multibit red (R) and green (G) color channel lines over col bus 514 (FIG. 15). FIG. 21 shows an example bump map texture providing such partial derivatives, and FIG. 22 illustrates a corresponding bump map function.

The partial derivatives provided by the indirect texture lookup are supplied to bump unit 500b. FIG. 23 shows a simplified example of what bump unit 500b effectively accomplishes using these partial derivatives. Effectively, Bump unit 500b multiplies the object surface binormals (actually texture coordinates generated from the binormals) by the partial derivatives and then sums the results, i.e.:

(b0*db/ds)+(b1*db/dt), where b0 and b1 are the object surface binormals (i.e., Tangent and Bionormal vectors). Bump unit 500b then uses this result to effectively perturb the surface Normal (e.g., by summing). The resulting perturbed normal (actually perturbed texture coordinates) is then used for environment mapping 1434.

Figure 24:
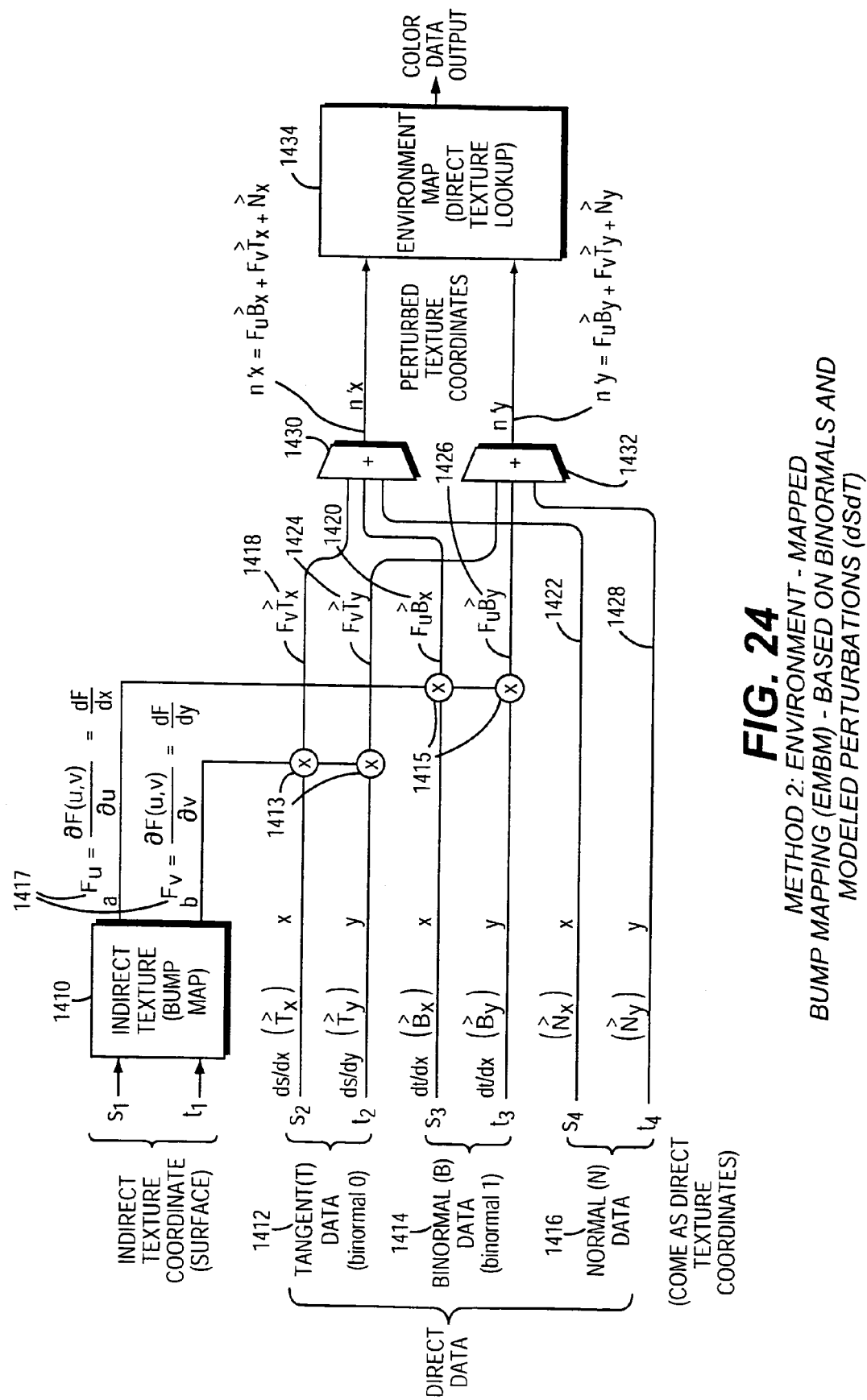
FIG. 24 is a logical block diagram illustrating an example process of environment-mapped bump mapping using Normal vector perturbations modeled with respect to a flat surface (dSdT)

FIG. 24 is a more detailed logical block diagram illustrating an example method of environment-mapped bump mapping using Normal vector perturbations modeled with respect to a flat surface (dSdT). In one example embodiment, the environment mapping is performed using a spherical reflection map. The environment mapped bump mapping dSdT texture lookup that is performed is analogous to a perturbed Normal lookup into the spherical reflection map. The Normal vector coordinate perturbations are computed on a per-vertex basis. These perturbations are based on the Tangent, Binormal and Normal vector generated texture coordinates ($s_2$, $t_2$), ($s_3$, $t_3$), ($s_4$, $t_4$) and partial derivative information obtained from an indirect texture bump map. For this implementation, the indirect bump map 1410 contains precomputed deltas for S and T (i.e., partial derivative information offsets), modeled with respect to a flat surface (dSdT). The surface Normal, Binormal and Tangent vectors per-vertex are rotated to eye-space and texture coordinates ($s_2$, $t_2$) 1412, ($S_3$, $t_3$) 1414, and ($S_4$, $t_4$) 1416 are generated from the x and y eye-space components of each vector (($T_x$, $T_y$), ($B_x$, $B_y$), ($N_x$, $N_y$)). The Tangent and Binormal generated texture coordinates ($s_2$, $t_2$) 1412 and ($s_2$, $t_3$) 1414 are scaled (multiplied) (1413, 1415) by pre-computed partial derivative offsets ($F_u$, $F_v$) (1417) retrieved during an indirect texture lookup to indirect texture bump map 1410. Resulting x-component coordinate products $F_u B_x$ (1418) and $E_v T_x$) (1420) are combined (added) (1430) with x-component coordinate, $N_x$ (1422), to provide a perturbed Normal x-component texture coordinate n'x. Likewise, the resulting y-component coordinate products $F_v T_y$ (1424) and $F_u B_y$ (1426) are combined (1432) with the y-component coordinate, $N_y$ (1428) to provide a perturbed Normal y-component texture coordinate n'y. The two perturbed Normal texture offset coordinates n'x and n'y are then used in performing a regular (non-indirect) texture lookup into one or more texture environment or light maps (1434).

Figure 25:
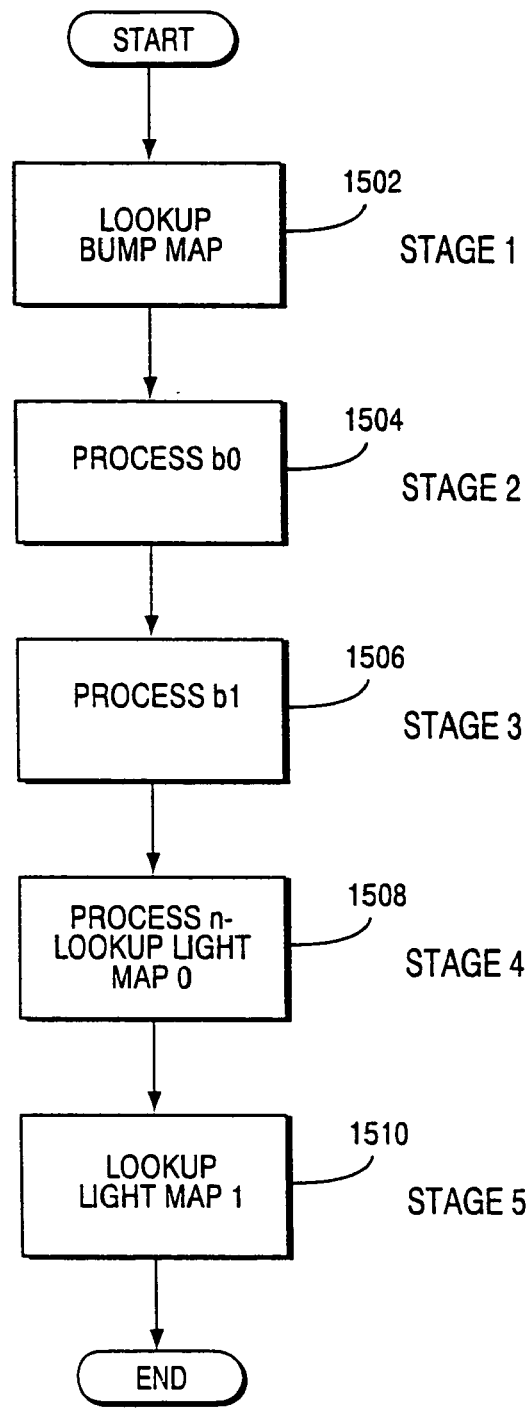
FIG. 25 shows an example process for environment mapped bump mapping modeled using the flat surface (dSdT) approach.

FIG. 25 shows example steps for performing environment mapped bump mapping using a flat surface model. In this example, a first stage looks up the bump map (block 1502). Second and third stages process the binormals (blocks 1504, 1506). A fourth stage processes the Normal and looks up light map 0 (for example, specular lighting) (block 1508). A fifth stage looks up light map 1 (for example, diffuse lighting) (block 1510). It is not necessary to have two light maps—different numbers of light maps could be used if desired.

Figure 26:
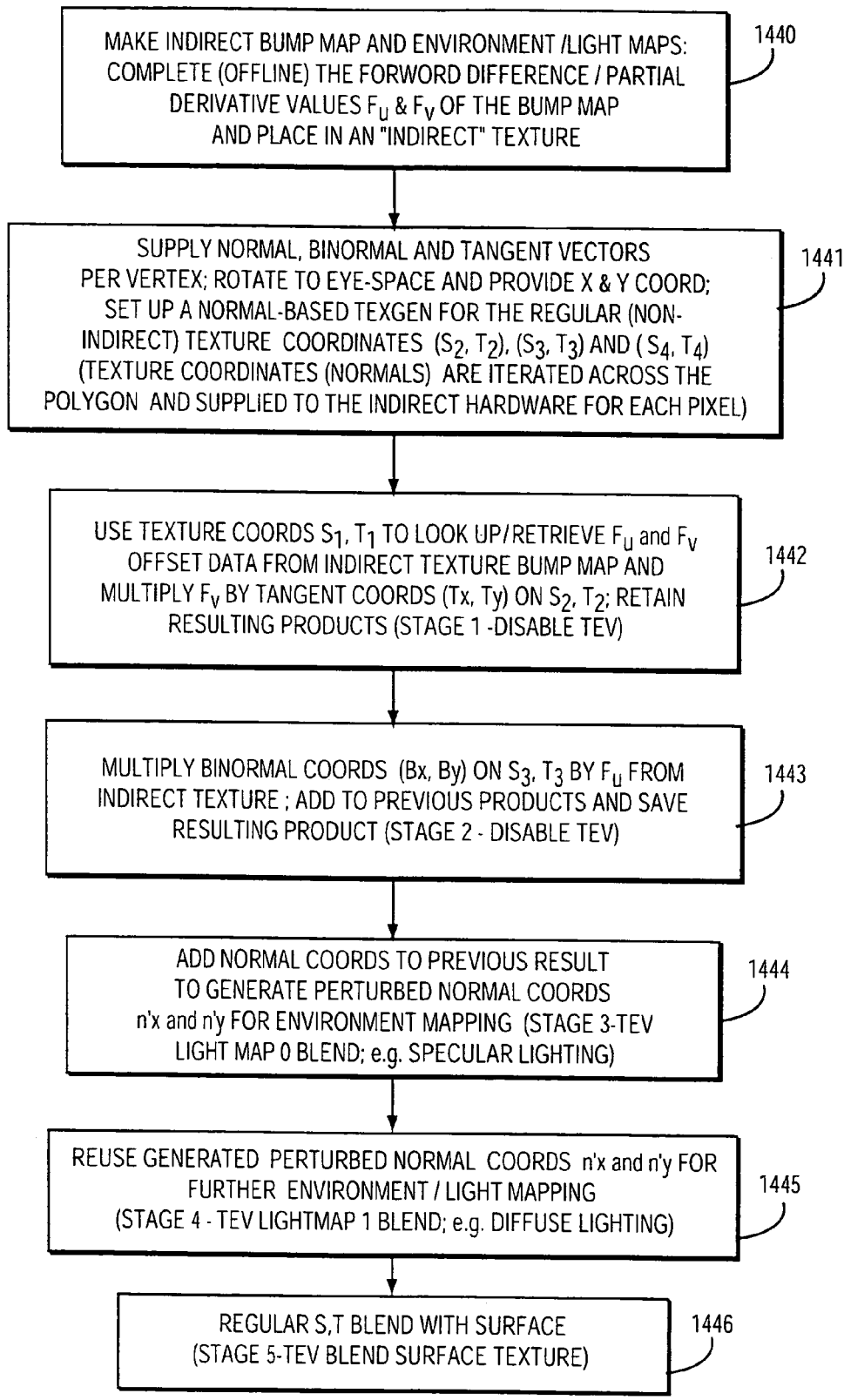
FIG. 26 is a flowchart of example steps performed for implementing the FIG. 24 embodiment.

FIG. 26 is a flowchart showing this overall procedure in one example implementation. Block 1440 creates or provides the bump map and environment light maps, and generates the partial derivatives (which may be dynamically calculated by the application running on main processor 110) for storing into an indirect texture.

Block 1441 supplies the Normal, Binormal and Tangent vectors per vertex (this can be performed by transform unit 300). In one example embodiment, these values can be separately indexed per vertex to compress the amount of data needed for bump mapping. All of the vectors can share one base pointer.

Block 1441 also can rotate the vectors to eye space, and provides x and y coordinates. This can be done by setting up a Normal-based texture generation for the regular (non-indirect) texture coordinates ($s_2$, $t_2$) ($s_3$, $t_3$), ($s_4$, $t_4$) in FIG. 24. The texture coordinates are iterated across the polygon and supplied to the indirect texture mapping hardware for each pixel (block 1441).

Block 1442 uses the texture coordinates $s_1$, $t_2$ to look up the partial derivative (height offset) data from the partial derivative bump map. These retrieved values are multiplied by the Tangent coordinates $s_2$, $t_2$ and the results are retained by the bump unit 500b. Block 1443 multiplies the Binormal coordinates $s_3$, $t_3$ by these same partial derivatives and added to the previous products. Block 1444 then adds the sum-of-products to the Normal coordinates $s_4$, $t_4$ to generated perturbed Normal coordinates for environment mapping. Block 1445 can reuse these values to look up any number of additional light or environment maps. The environment mapping are then blended with the surface illumination in a conventional manner (block 1446) and the results are displayed.

Figure 27:
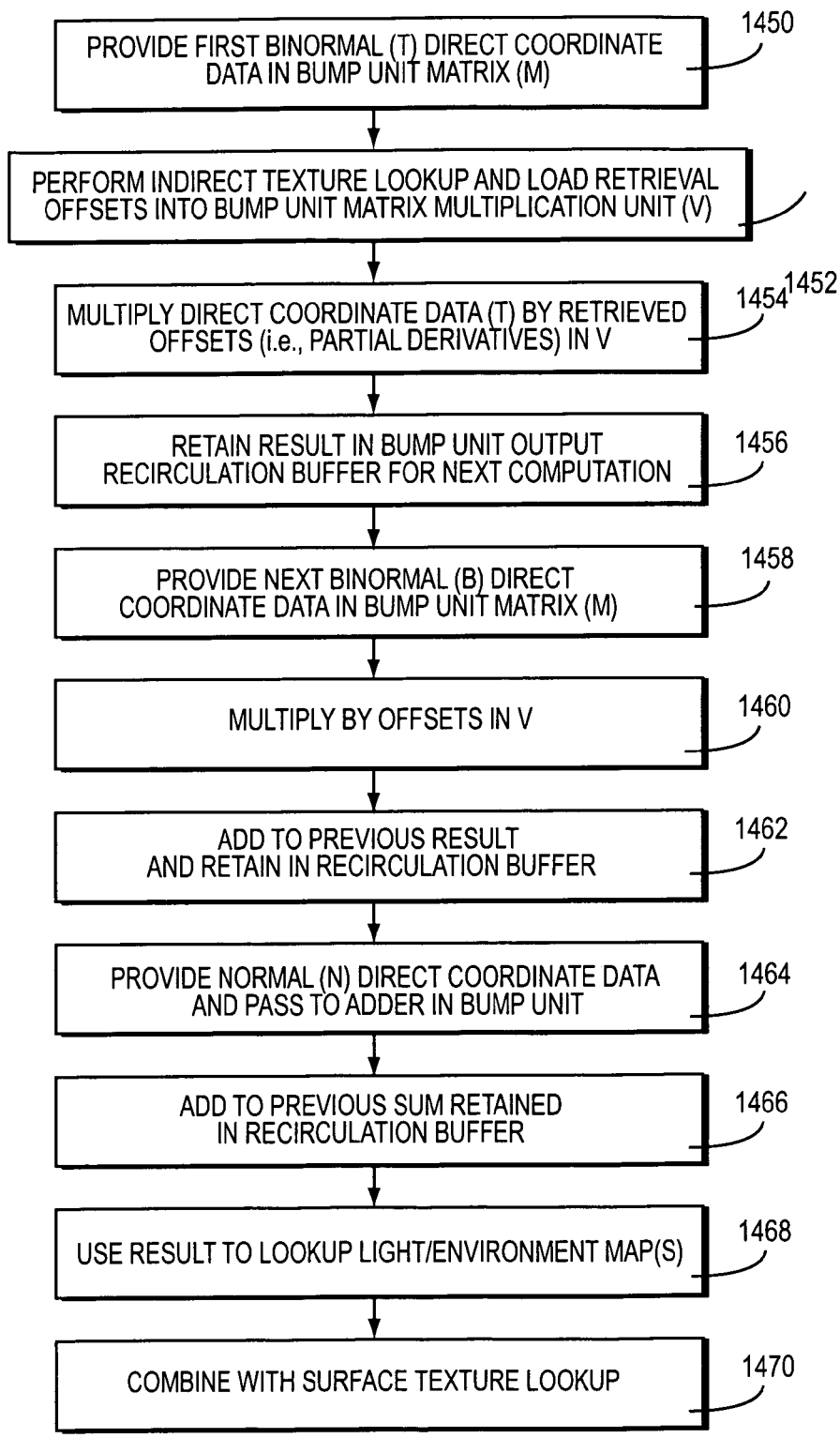
FIG. 27 is a more detailed flowchart of example steps for implementing the FIG. 24 embodiment.

FIG. 27 shows a more detailed flowchart of how the particular hardware implementation is stepped through the FIG. 26 process. The following table illustrates one example of the order of operations performed during successive processing stages for EMBM based on perturbations modeled with respect to a flat surface (dSdT) and performing multiple texture mappings:

| bump unit processing: | TEV Stages: |
|---|---|
| 1. Tangent vector (T): (binormal 0) AFv | (Disable texture access) |
| 2. Binormal vector (B): (binormal 1) AFu + previous result (recirculated) | (Disable texture access) |
| 3. Normal + previous result (recirculated): (N + Fv T + Fu B) | lookup to lightmap 0 (e.g., specular) |
| 4. Previous result (reuse) | lookup to lightmap 1 (e.g., diffuse) |
| 5. S, T (reuse previous result) | surface texture (lookup to environment texture) |

In the above example, TEV stages 3 through 5 would perform blending as follows:

$$lightmap0_{(specular)} + lightmap1_{(diffuse)} + \text{surface texture}$$

Theory of Operation

As explained above, bump mapping allows one to add realism to an image without using a lot of geometry. Basically, bump mapping modifies the shading of a polygon by effectively perturbing the surface normal on a per-pixel basis. The shading makes the surface appear bumpy, even though the underlying geometry is relatively flat. The following discussion briefly describes the basic mathematics of bump mapping:

Bump Mapping Mathematics:

In general, the "bumpiness" of a surface can be described by a 2D height field, also called a "bump map". The bump map is generally defined by a scalar difference F(u, v) between a flat surface P(u, v) and a desired bumpy surface P'(u, v) along the normal N at each point (u, v). Thus, the bump surface may be represented as:

$$P'(u,v) = P(u,v) + F(u,v)\overline{N}$$

Normally, P is modeled using polygons, and F is modeled as a 2D image using a paint program or other tool. The normal Vector N' at (u, v) can be calculated by the cross product of the partial derivatives of P' in u and v. For this discussion, the partial derivative terms are defined by the following simplified notation:

$$P_u = \frac{\partial P(u,v)}{\partial u},\ P_v = \frac{\partial P(u,v)}{\partial v},\ P'_u = \frac{\partial P'(u,v)}{\partial u},$$

$$P'_v = \frac{\partial P'(u,v)}{\partial v},\ F_u = \frac{\partial F(u,v)}{\partial u},\ F_v = \frac{\partial F(u,v)}{\partial v}$$

Accordingly, the partial derivatives of P'(u, v) can be computed using the chain rule from $(P'_u \times P'_v) = \overline{N}'$ and $P'(u,v) = P(u,v) + F(u,v)\overline{N}$ as follows:

$$P'_u = P_u + F_u \overline{N} + F\frac{\partial \overline{N}}{\partial u}$$

$$P'_v = P_v + F_v \overline{N} + F\frac{\partial \overline{N}}{\partial v}$$

If F is assumed to be sufficiently small, the last term in the above two equations can be approximated by zero and, thus, the partial derivatives may be represented as:

$$P_u' = P_u + F_u \overline{N} \text{ and}$$

$$P_v' = P_v + F_v \overline{N}$$

Taking the cross product gives the following expression for N':

$$\overline{N}' = P_u \times P_v + F_u(\overline{N} \times P_u) + F_v(\overline{N} \times P_v) + F_u F_v(\overline{N} \times \overline{N})$$

Since by definition, $$\overline{N} = P_u \times P_v \text{ and } \overline{N} \times \overline{N} = 0$$

the equation for N' can be simplified to:

$$\overline{N}' = \overline{N} + F_u(\overline{N} \times P_u) + F_v(\overline{N} \times P_v)$$

Using the notation of $\overline{T}$ for the tangent vector and $\overline{B}$ for the Binormal vector:

$$\overline{B} = \overline{N} \times P_u \text{ and } \overline{T} = \overline{N} \times P_v,$$

a perturbed Normal may be computed according to the following equation:

$$\overline{N}' = \overline{N} + F_u \overline{B} + F_v \overline{T}$$

The values Fu and Fv may be computed offline, for example, through "forward differencing" of the 2D bump map. Pu and Pv may be computed either directly from the surface definition, or from forward differencing applied to the surface parameterization. Forward differencing is a known conventional method which may be used to compute (approximate) the first derivative of a height field (bump map) in a given direction. For example, assuming that a one-dimensional bump map is represented as the height function F(s), the forward difference would be represented by the following:

$$F_1 = F(s) - F(s + \Delta s)$$

If, for example, the delta is one texel in s, and the width of the bump map is w, then the forward difference is (assuming s is normalized to map coordinates):

$$F_1 = F(s) - F\left(s + \frac{1}{w}\right)$$

If F were continuous, the above equations would approximate the first derivative of F. For a 2D bump map, a forward differencing operation may be performed by the following pseudo-code example:

```
For (t = 0; t < h; t++) {
    For (s = 0; s < w; s++) {
        tex00 = bump_imag(s,t);
```

-continued

```
        tex01 = bump_imag(s+1, t);
        tex10 = bump_imag(s, t+1);
        Fs = tex00 - tex01;
        Ft = tex00 - tex10;
    }
}
```

Figure 12:
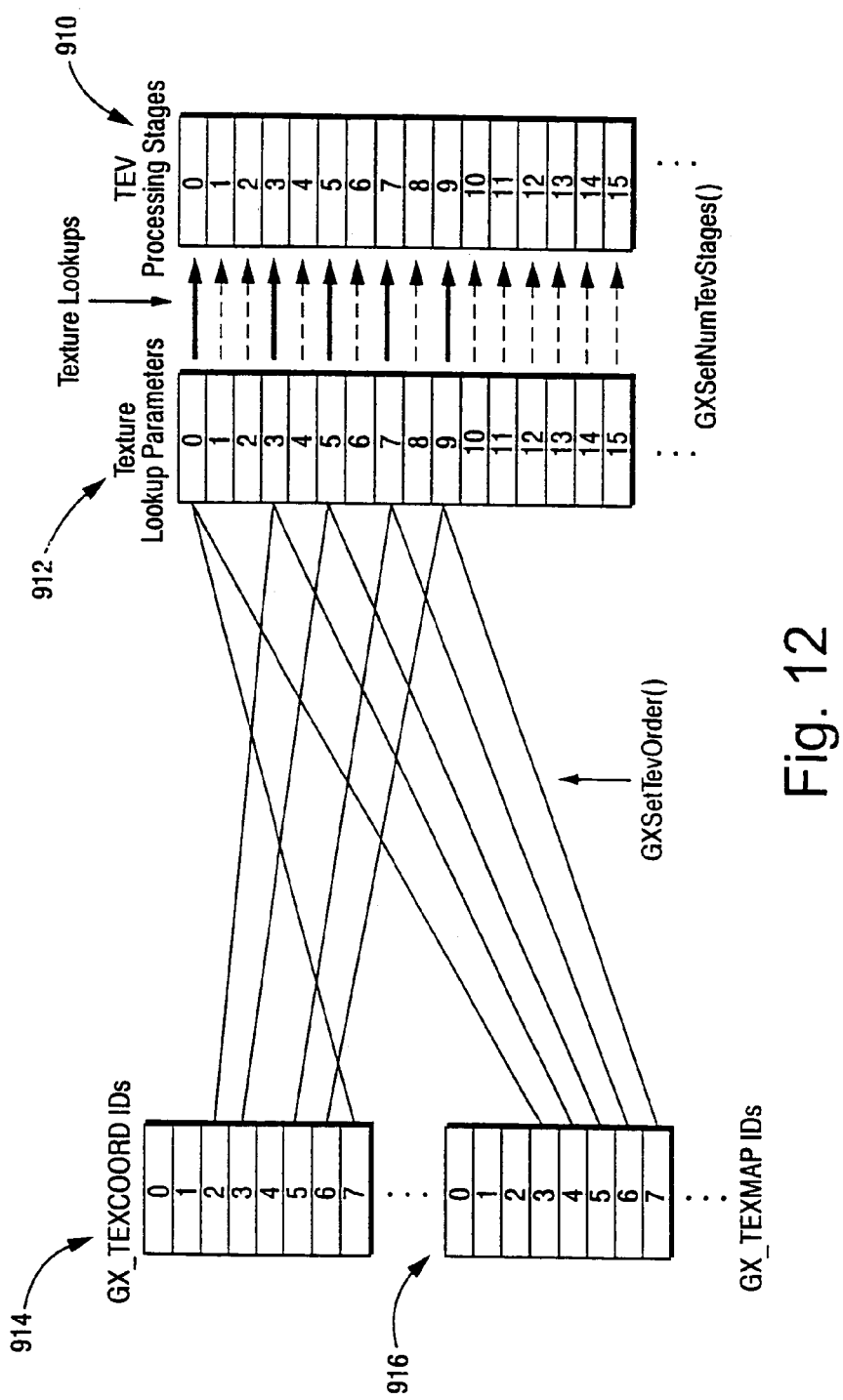
FIG. 12 is a functional operations diagram illustrating an example of regular (non-indirect) texture processing in accordance with the present invention.
Figure 13:
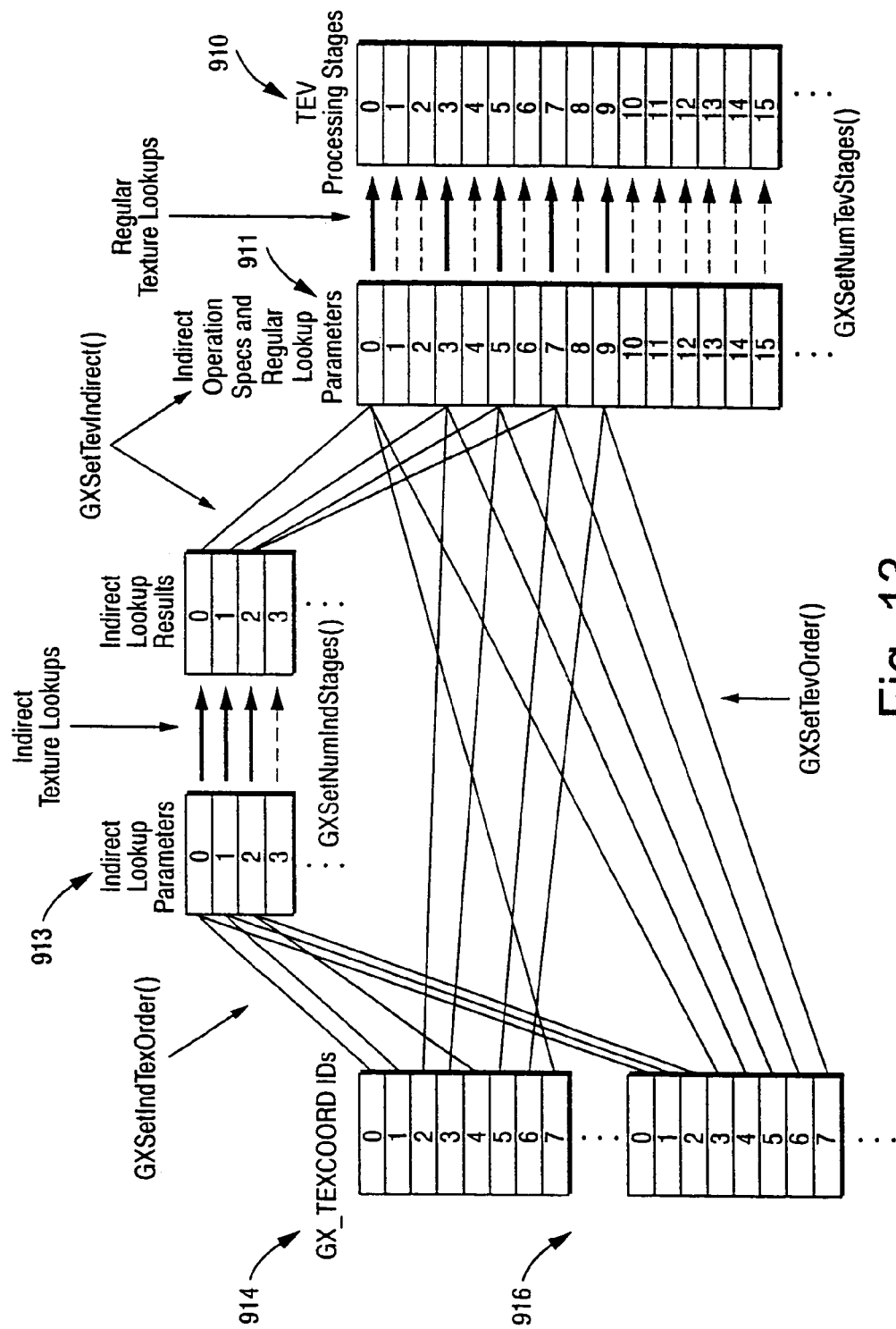
FIG. 13 is a functional operations diagram illustrating an example of both regular (non-indirect) and indirect texture processing in accordance with the present invention.
Figure 14:
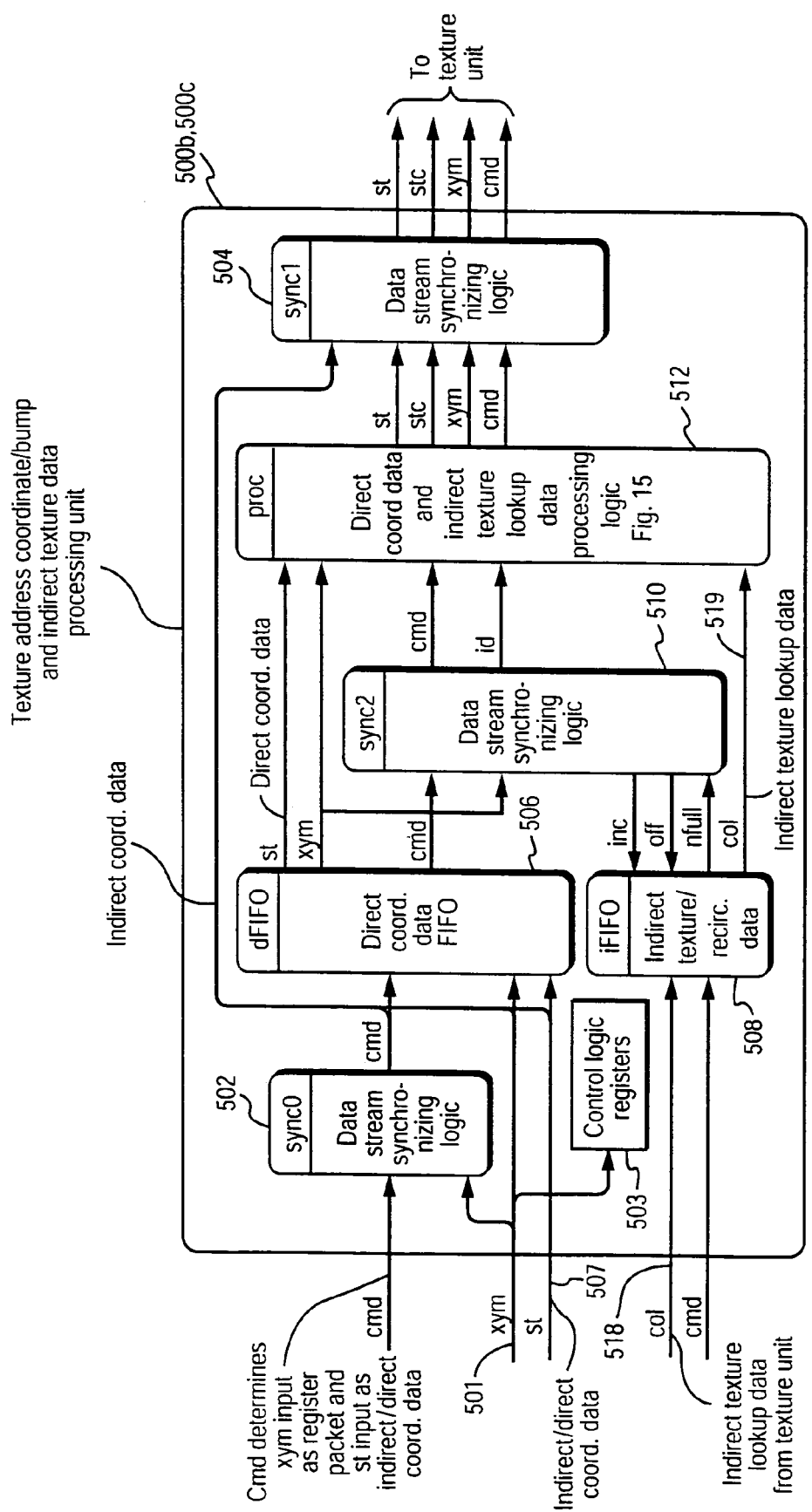
FIG. 14 is a block diagram showing a detailed example of the texture coordinate/bump processing unit shown in FIG. 5.

Example API Environment-mapped Bump-mapping Function Commands:

As shown in FIGS. 12–13, one or more graphics API functions are used to set up and initiate deviational indirect texture look-up operations. Example API functions for setting up indirect texture operations and parameters for performing environment-mapped bump-mapping may be defined as follows:

GXSetTevIndBumpXYZ

This function sets up an environment-mapped bump-mapped dXdYdZ texture indirect lookup. The indirect map specifies offsets in object (X, Y, Z) space. This kind of lookup requires only one TEV stages to compute. the indirect matrix should be loaded with a transformation for normals from object space to eye space. The surface geometry need only provide regular normals at each vertex.

Example Arguments:

| | |
|---|---|
| Tev_stage | The TEV stage that is being affected |
| Ind_stage | The indirect stage results to use with this TEV stage. |
| Matrix-sel | Indicates which indirect matrix and scale value to use to multiply the retrieved offsets. |

Example Usage:

```
void GXSetTevIndBumpXYZ(    GXTevStageID tev_stage,
                            GXIndTexStageID ind_stage,
                            GXIndTexMtxId matrix_sel );
```

GXSetTevIndBumpST

This function sets up an environment-mapped bump-mapped dSdT texture indirect lookup. The indirect map specifies offsets in (S, T) space. This lookup function requires 3 TEV stages to compute the offset texture coordinates. The resulting texture coordinates are available two stages after the one specified in the function call. The first two TEV stages should disable texture lookup. The third stage is where the lookup is actually performed. One may use an API GXSetTevIndRepeat function (described below) in subsequent TEV stages to reuse the computed texture coordinates for additional lookups. The surface geometry should provide Normal/Binormal/Tangent vectors at each vertex. This function makes use of the dynamic form of matrices (FIG. 16B) available in the bump processing unit (FIG. 15) for transforming the S and T offsets to be relative to the incoming regular S and T (which come from the object normals). A scale value provided by the bump unit should contain the size of the reflection map divided by 2 (and thus the reflection map should be a square power of 2). In this operation, the static offset matrix (FIG. 16A) used for the texture coordinate computation. Instead, one of two dynamic matrices (i.e., matrix A and matrix B of FIG. 16B) is used along with a scaling value. The application program should disable the first two TEV blending stages from texture look-ups.

Example Arguments:

| | |
|---|---|
| Tev_stage | The TEV stage that is being affected. |
| Ind_stage | The indirect stage results to use with this TEV stage. |
| Matrix_sel | Indicates which indirect matrix scale value to use to multiply the retrieved offsets. |

Example Usage:

```
void GXSetTevIndBumpSt (    GXTevStageID tev_stage,
                            GXIndTexStageID ind_stage,
                            GXIndTexMtxId matrix_sel );
```

Having used 3 TEV stages to compute a texture coordinate for an EMBM dSdT lookup, one can use the result to do more than one lookup to different texture maps in memory. For example, one may perform additional lookups for specular and diffuse lightmaps. In order to perform successive texture map lookups without taking 3 stages to compute each one, one may use the texture coordinate feedback feature of the present invention.

GXSetTevIndRepeat

This function is used when one wishes to use the same texture coordinates for one TEV stage as were computed in the previous stage. This is useful when the texture coordinates require more than one stage to compute, as is the case for GXSetTevIndBumpST operations.

Example Arguments:
tev_stage The TEV stage that is being changed.
Example Usage:
void GXSetTevIndRepeat (GXTevStageID tev_stage);

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands.

Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 28:
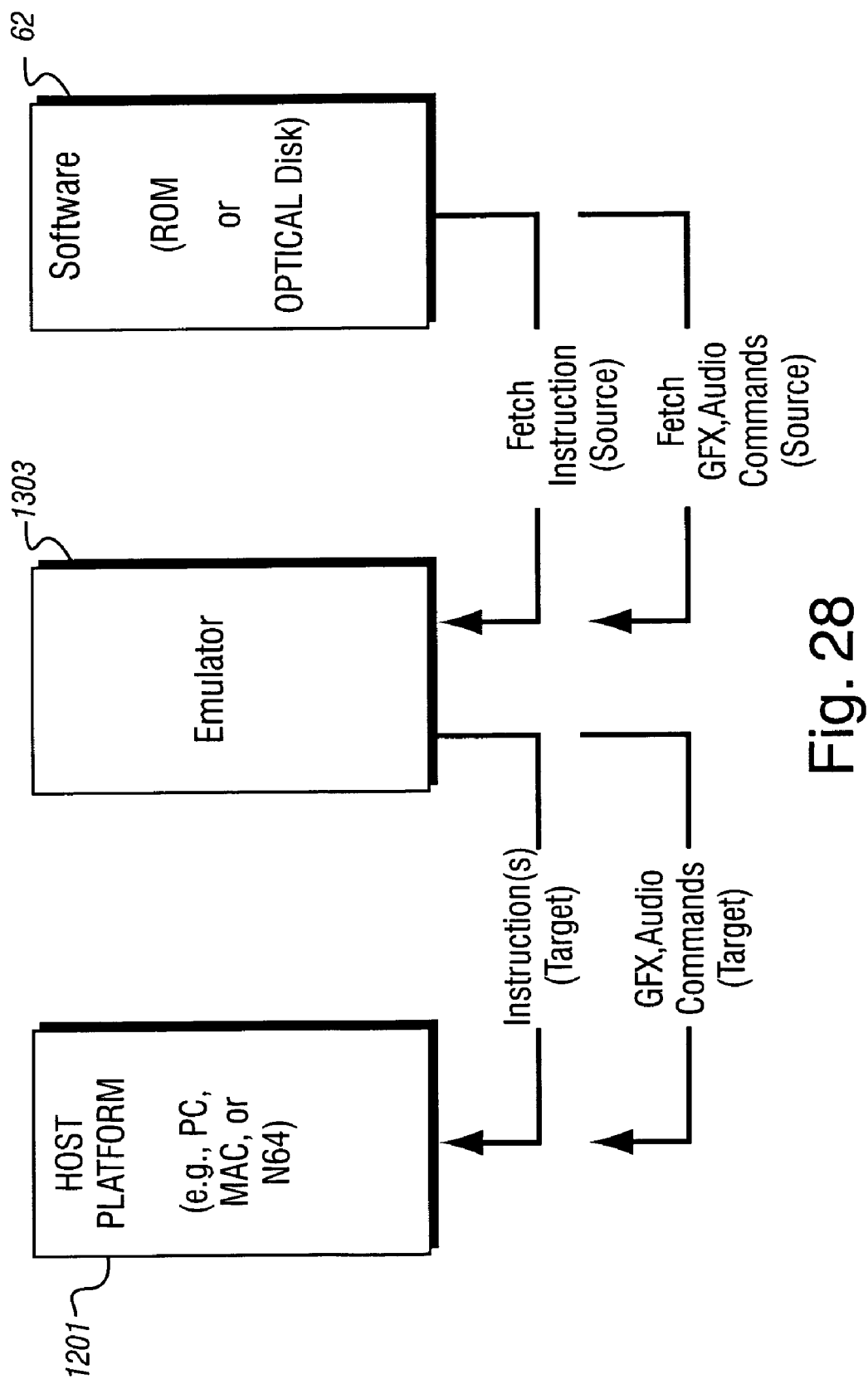

FIG. 28 illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

In the case where particular graphics support hardware within an emulator does not include the example environment-mapped bump-mapping and indirect texture referencing features and functions illustrated by FIGS. 6 through 27, the emulator designer has a choice of either:

translating the environment-mapped bump-mapping and indirect-texture referencing commands into other graphics API commands the graphics support hardware understands, or implementing environment-mapped bump-mapping and indirect-texture referencing in software with a potential corresponding decrease in performance depending upon the speed of the processor, or "stubbing" (i.e., ignoring) the environment-mapped bump-mapping and indirect-texture referencing commands to provide a rendered image that does not include effects utilizing environment-mapped bump-mapping and indirect-texture referencing.

While the logical diagrams of FIGS. 6 through 24 can be implemented entirely in software, entirely in hardware or by a combination of hardware and software, the preferred embodiment performs most of these calculations in hardware (e.g., using bump unit 500*b*) to obtain increased speed performance and other advantages. Nevertheless, in other implementations (e.g., where a very fast processor is available), some or all of the processing described herein may be implemented in software to provide similar or identical imaging results.

FIG. 29 illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1197 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referenced above are hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

What is claimed is:

1. In a graphics system including a processing pipeline that renders and displays images at least in part in response to polygon vertex data and texture image data stored in memory, an arrangement for implementing environment-mapped bump mapping in a single rendering pass, comprising:

texture memory for storing image data and bump mapping data;

texture retrieval circuitry for accessing and retrieving data stored in texture memory; and texture coordinate/bump processing circuitry coupled to the texture retrieval circuitry and configured to receive data retrieved from texture memory for generating a set of modified texture coordinates, said texture coordinate/bump processing circuitry including multiplication circuitry for performing at least scaling of texture coordinates and a storage buffer for saving a set of modified texture coordinates for reuse by the texture retrieval circuitry in accessing texels of at least an environment map image and/or one or more corresponding texture image data maps stored in texture memory multiple texture image data maps in the texture memory;

wherein the texture retrieval circuitry is responsive to a set of indirect texture coordinates to provide said texture coordinate/bump processing circuitry with data retrieved from the texture memory for use in generating said set of modified texture coordinates.

2. The arrangement for implementing environment-mapped bump mapping of claim 1 wherein the coordinate/bump processing circuitry includes matrix multiplication circuitry for performing space translation and scaling operations.

3. The arrangement for implementing environment-mapped bump mapping of claim 1 wherein the coordinate/ bump processing circuitry includes matrix multiplication circuitry capable of performing operations requiring at least a 3×2 matrix.

4. The arrangement for implementing environment-mapped bump mapping of claim 1 wherein the coordinate/ bump processing circuitry includes at least scaling and summing circuitry for computing values for a perturbed texture coordinate based at least in part on data obtained from a bump map stored in texture memory.

5. The arrangement for implementing environment-mapped bump mapping of claim 1 wherein the coordinate/ bump processing circuitry includes an output buffer for saving computed and/or modified texture coordinates for use by the texture retrieval circuitry in accessing multiple texture image data maps in the texture memory.

6. In a graphics system that renders and displays images at least in part in response to polygon vertex data and texture data stored in memory, said system capable of direct and indirect texture coordinate processing, a method [dXdYdZ] of environment-mapped bump mapping based on a bump map function modeled with respect to a 3D surface, comprising the steps of:

precomputing forward difference values of a surface bump function F(u, v) modeled with respect to a particular 3D surface and storing said values as a texture map in memory;

supplying, for each of the plural vertices, model-space data representing a surface Normal vector, converting said Normal vectors to eye-space;

generating texture coordinate values using only x and y eye-space vector components of said Normal vectors;

interpolating said texture coordinate values across a polygon of an object being rendered;

using said interpolated texture coordinates in an indirect mode of texture coordinate processing for looking up, in said texture map, a set of precomputed forward difference values of a surface bump function F(u, v) modeled with respect to a 3D surface;

computing a set of perturbed texture coordinates based on said interpolated texture coordinates and said set of precomputed forward difference values;

using said set of perturbed texture coordinates for performing a lookup in memory to a texel in an environment texture map; and using said texel to determine a pixel color.

7. The method of claim 6 wherein computing a set of perturbed texture coordinates includes transforming said bump map data from object space to eye space.

8. In a graphics system that renders and displays images at least in part in response to polygon vertex data and texture data stored in memory, said system capable of direct and indirect modes of texture coordinate processing wherein, in an indirect texture coordinate processing mode, stored texture data is retrieved and used for further texture coordinate processing, a dSdT method of environment-mapped bump mapping based on a bump map function modeled with respect to a flat surface, comprising the steps of:

supplying, for each of the plural vertices, model-space data representing a surface Normal vector, a Tangent vector and Binormal vector;

converting said Normal, Tangent vector and Binormal vectors to eye-space;

generating texture coordinate values using only x and y eye-space vector components of said Normal, Tangent vector and Binormal vectors;

interpolating said texture coordinate values across a polygon comprising a surface of an object being rendered for a pixel;

using interpolated texture coordinates of said Normal vector, in an indirect mode of texture coordinate processing, for looking up a set of precomputed forward difference values, $F_u$ and $F_v$, of a surface bump function $F(u, v)$ modeled in two dimensions with respect to a flat surface, wherein said precomputed forward difference values are stored as a texel in a texture data map stored in memory;

computing a set of perturbed texture coordinates based on said interpolated texture coordinates and said set of precomputed forward difference values;

using said set of perturbed texture coordinates for performing multiple lookups to a texel in a plurality of different color and/or image data maps stored as texture data in memory, wherein at least one data maps is a light map and at least one of said maps is an environment texture map; and blending texel color data from each of said multiple lookups to determine a pixel color.

9. The method of claim 8 wherein computing a set of perturbed texture coordinates includes transforming said bump map data from object space to eye space.

10. In a graphics system including a graphics processor that generates image information for display at least in part in response to stored texture images, said graphics processor including texture processing components coupled to a texture memory, said texture processing components performing texture mapping in response to applied texture coordinates, a method of performing environment-mapped bump mapping comprising:

storing environment image mapping data in said texture memory;

storing bump mapping data in said texture memory;

generating indirect texture coordinates;

using said indirect texture coordinates to retrieve said bump mapping data stored in texture memory;

generating computed texture coordinates based at least in part on retrieved bump mapping data; and using said computed texture coordinates to retrieve pixel color data from said environment image mapping data stored in said texture memory; and outputting retrieved pixel color data for use in rendering a graphics object having an environment-mapped bump-mapped texture.

11. The method of claim 10 wherein said generating computed texture coordinates comprises computing texture coordinate values based on said retrieved bump mapping data and at least one set of non-indirect texture coordinates.

12. The method of claim 10 wherein said generating computed texture coordinates comprises perturbing direct texture coordinates by said retrieved bump mapping data.

13. The method of claim 10 wherein said environment image mapping data comprises one or more light maps stored in texture memory.

14. The method of claim 10 wherein said environment image mapping data comprises at least one reflection map stored in texture memory.

15. The method of claim 10 wherein said environment image mapping data comprises at least one environment texture map stored in texture memory.

16. The method of claim 10 wherein said generating computed texture coordinates comprises computing a set of scaled texture coordinates.

17. The method of claim 10 wherein further comprising saving at least one set of said computed texture coordinates for reuse in subsequent processing stages.

18. In a graphics system, in a graphics pipeline, texture processing components coupled to a texture memory, said texture processing components performing texture mapping and environment-mapped bump mapping in response to applied texture coordinates, comprising:

texture coordinate processing circuitry for identifying indirect texture coordinates and receiving bump function difference data retrieved from a texture map stored in texture memory;

matrix multiplication circuitry for performing eye-space coordinate transformations on texture coordinate data; and buffer circuitry for saving computed texture coordinates.

* * * * *

UNITED STATES PATENT AND TRADEMARK OFFICE
CERTIFICATE OF CORRECTION

PATENT NO. : 7,205,999 B2  Page 1 of 1
APPLICATION NO. : 10/953436
DATED : April 17, 2007
INVENTOR(S) : M. Leather It is certified that error appears in the above-identified patent and that said Letters Patent is hereby corrected as shown below:

On the title page, insert the following:

Related U.S. Application Data:

(63) Divisional of Serial No. 09/722,381, filed November 28, 2000, issued as Patent No. 6,825,851, which claims benefit of 60/226,893, filed August 23, 2000.

Signed and Sealed this

Eighth Day of July, 2008

JON W. DUDAS
*Director of the United States Patent and Trademark Office*